United States Patent [19]

Tanaka et al.

[11] Patent Number: 5,790,862

[45] Date of Patent: Aug. 4, 1998

[54] RESOURCE ASSIGNING APPARATUS WHICH ASSIGNS THE VARIABLE IN A PROGRAM TO RESOURCES

[75] Inventors: Akira Tanaka, Kyoto; Junko Sayama, Settsu; Hiroshi Yukawa; Kensuke Odani, both of Kyoto, all of Japan

[73] Assignee: Matsushita Electric Industrial Co., Ltd., Kadoma, Japan

[21] Appl. No.: 618,453

[22] Filed: Mar. 14, 1996

[30] Foreign Application Priority Data

Mar. 16, 1995 [JP] Japan .................................. 7-057596

[51] Int. Cl.$^6$ .............................. G06F 9/40; G06F 9/46
[52] U.S. Cl. .................. 395/705; 395/674; 395/708; 395/709; 364/280.4; 364/280.5; 364/281.3; 364/262.4
[58] Field of Search ...................... 395/705, 708, 395/709, 674; 364/262.4, 280, 280.4, 259, 261.3, 280.5, 281.3

[56] References Cited

U.S. PATENT DOCUMENTS

| | | |
|---|---|---|
| 4,571,678 | 2/1986 | Chaitin . |
| 4,782,444 | 11/1988 | Munshi et al. ................. 395/709 |
| 5,249,295 | 9/1993 | Briggs et al. ................. 395/709 |
| 5,517,628 | 5/1996 | Morrison et al. ............... 395/581 |
| 5,634,059 | 5/1997 | Zaiki ......................... 395/706 |
| 5,642,512 | 6/1997 | Tanaka et al. ................. 395/705 |
| 5,684,994 | 11/1997 | Tanaka et al. ................. 395/705 |

FOREIGN PATENT DOCUMENTS 650121  4/1995  European Pat. Off. ......... G06F 9/45

OTHER PUBLICATIONS

"The Priority-Based Coloring Approach to Register Allocation", by F.C. Chow et al, 10872 ACM Transactions on Programming Languages and Systems, 12 (1990), Oct., No. 4, pp. 501–536.

"Register Allocation Via Coloring", by G.J. Chaitin et al., 10871 Computer Languages, 6 (1981), pp. 47–57.

(List continued on next page.)

*Primary Examiner*—Emanuel Todd Voeltz
*Assistant Examiner*—Cuong H. Nguyen
*Attorney, Agent, or Firm*—Price, Gess & Ubell

[57] ABSTRACT

A resource assigning apparatus which generates assignments which are combinations of variables and their respective live ranges, which investigates, for each assignment, other assignments with live ranges which interfere or which are continuous and which calculates assigning priority levels. Next, the assigning resource element determination unit assigns each assignment to an assignable resource element starting with the assignment with the highest priority level, in doing so taking into account the use cost which is the cost incurred by the parts of the program which use an assignment and the resource succession relations, thereby calculating a profit value which standardizes an evaluation of a reduction in transfer instructions in the object code and assigning assignments to resource elements with a lowest use cost and highest profit value. In this way, by thoroughly investigating the relations between assignments which allow assigning to a same resource element, a more optimal assigning result is attained.

51 Claims, 34 Drawing Sheets

OTHER PUBLICATIONS

"Design Considerations for IBM Personal Computer Professional FORTRAN, an Optimizing Compiler", by M.L. Roberts et al., 8204 IBM Systems Journal, 24 (1985) No. 1, pp. 49–60.

Triolet et al., "Direct Parallelization of Call Statements", Proceedings of the SIGPLAN 86 Symposium on Compiler Construction, SIGPLAN Notices, vol.21, No.7, pp. 176–185, Jul. 1986.

Val Popescu, et al., "The Metaflow architecture", IEEE Micro, vol. 11(3), pp. 10–13 and 63–73, Jun. 1991.

Yoshida, et al., "The Approach to Multiple Instruction Execution in the GMICRO/400 processor", IEEE Comput. Soc. Press, pp. 185–195, Nov. 1991.

Tomasulo, "An Efficient Algorithm for Exploiting Multiple Arithmetic Units", IBM Journal, vol.11, pp. 25–32, Jan. 1967.

Sohi, "Instruction issue logic for high-performance, interruptible, multiple functional unit, pipelined computers.", IEEE Trans. on Computers, vol. 39(3), pp. 349–359, Mar. 1990.

Lightner, et al. "The Metaflow Lightning chipset", IEEE Comput. Soc. Press, COMPCON Spring '91, pp. 13–18, Mar. 1991.

A.V. Aho et al.: Compilers Principles, Techniques and Tools, pp. 545–546, Addison–Wesley, 1986.

F.Chow et al.: Register Allocation by Priority–Based Coloring, Proceedings of the ACM SIGPLAN '84 Symposium on Compiler Construction SIGPLAN Notices vol. 19, No. 6, Jun. 1984.

D. Bernstein et al.: "Spill Code Minimization Techniques for Optimizing Compilers", SIGPLAN 1989, IBM Israel Science and Technology Technion City Haifa, Israel.

"Register Allocation" pp. 420–423 in Programming Gengo Shorikei, Masataka Sasa (Iwanami Books, Oct. 31, 1989) (with English translation).

Mori et al.: "A Register Allocation Method Applicable to Compound–Bank Organization and its Generalization", Y. Gakkai (Info Processing Society) vol. 30, No. 6, Jun. 1989 (w/Engl transl).

} else {

⑤     c=e−a;

⑥     d=a−e;

}

⑦ b=c;

⑧ e=b−d;

(1) SOURCE PROGRAM

FIG. 3C
PRIOR ART

```
t11 ⎧ mov   R0,mem      ⎫ ①
    ⎨ mov   R2,mem   ⎫
    ⎩ cmp   R2,#10   ⎬ ②
      jge   LBL1     ⎭
t12 ⎧ mov   R2,R0    ⎫ ③
    ⎩ add   R2,#20   ⎭
      mov   R1,R0    ⎫
      mov   R0,mem   ⎬ ④
      sub   R1,R0    ⎪
      jmp   LBL2     ⎭
LBL1:
t13 ⎧ mov   R2,R1    ⎫ ⑤
    ⎩ sub   R2,R0    ⎭
      sub   R0,R1    ⎫ ⑥
      mov   R1,R0    ⎭
     (mov   R2,R2) ← ERASABLE
                      ⑦
t14 ⎧ mov   R0,R2    ⎫
t15 ⎨ sub   R0,R1    ⎬ ⑧
    ⎩ mov   R1,R0    ⎭
```

FIG. 3B
PRIOR ART

| ASSIGNMENT | a  | b2 | c  | d  | e1 | e2 | b1  |
|------------|----|----|----|----|----|----|-----|
| REGISTER   | R0 | R2 | R2 | R1 | R1 | R0 | Mem |

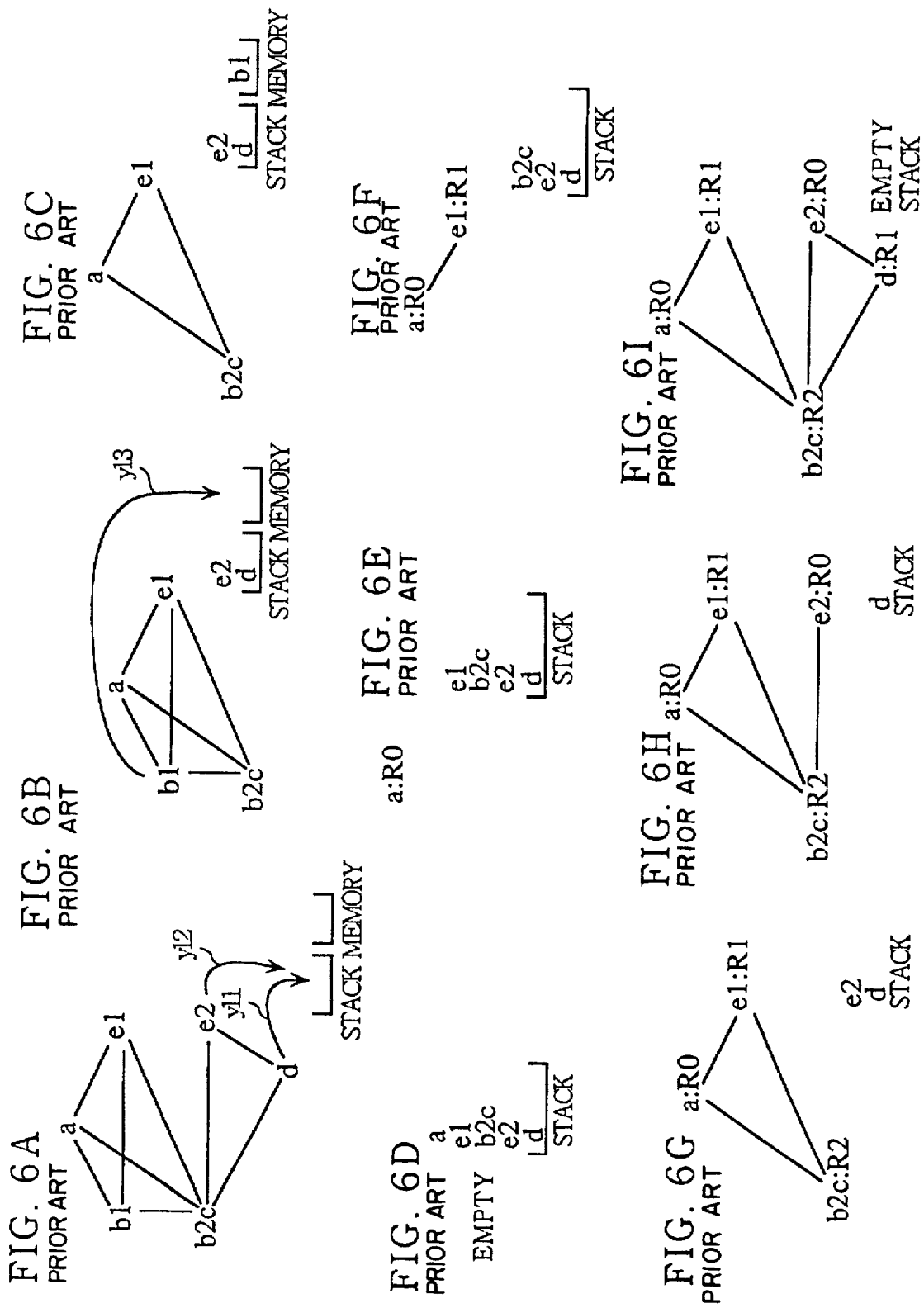

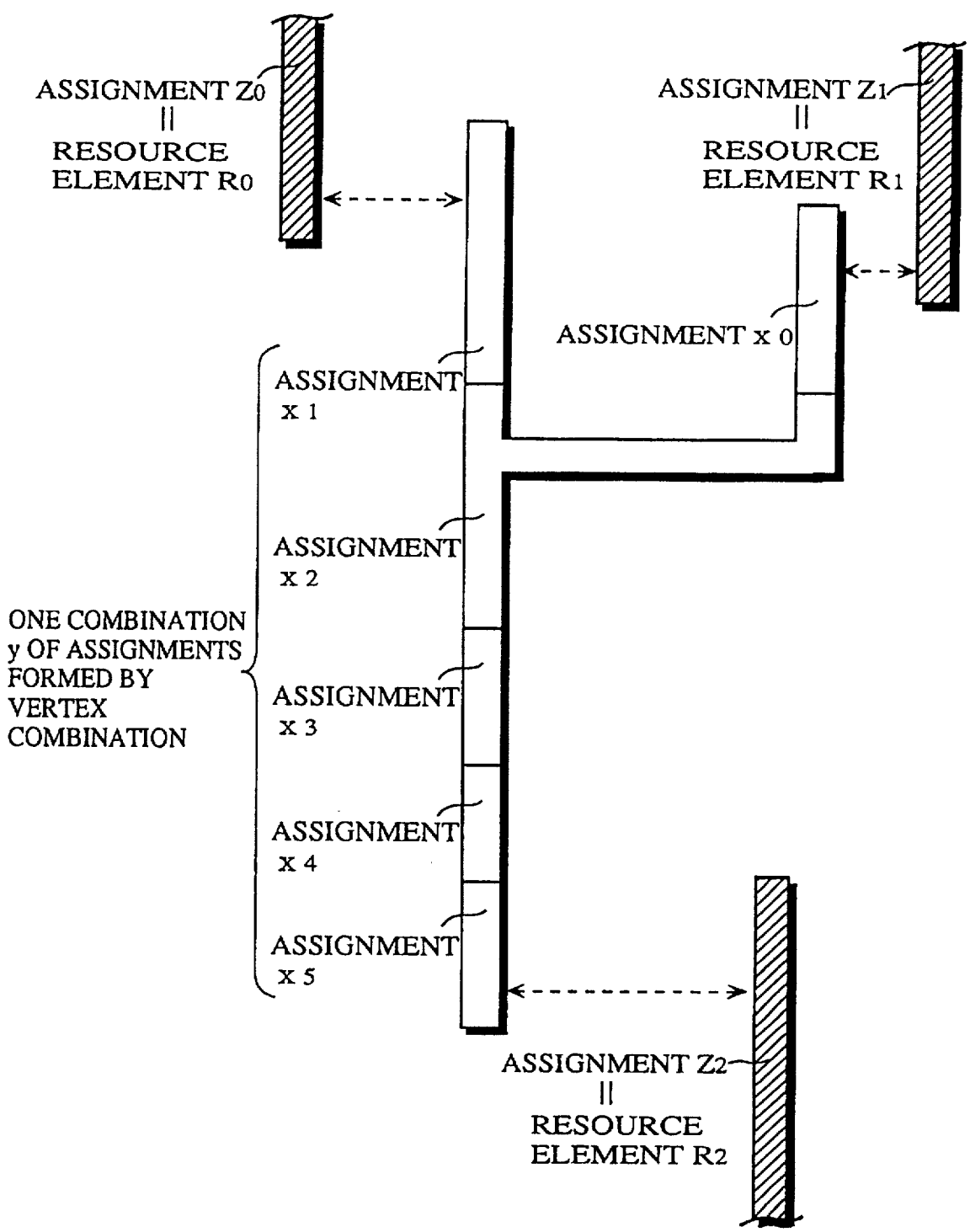

FIG. 24

| ASSIGNMENT (n10) | LIVE RANGE (n11) | LIVE RANGE LENGTH (n12) | USE INTERMEDIATE LANGUAGE INSTRUCTION GROUP (n13) | START POINT GROUP (n14) | END POINT GROUP (n15) | INTERFERING ASSIGNMENT GROUP (n16) | RESOURCE SUCCESSION ASSIGNMENT GROUP (n17) | ASSIGNING PRIORITY LEVEL (n18) |
|---|---|---|---|---|---|---|---|---|
| t35 | i2~i6 | 5 | i1,i5,i6 | i1 | i6 | t34,t1,a1,p1 | Pr1 | 0.6 |
| t34 | i3 | 1 | i2,i3 | i2 | i3 | t1 | t1,Pr2 | 2 |
| t1 | i4 | 1 | i3,i4 | i3 | i4 | t15 | t34,a1 | 2 |
| a1 | i5~i8,i29~i32 | 8 | i4,i8,i28,i32 | i4,i28 | i32 | t15,p1,t261,t266 | t2,a3,t265 | 0.75 |
| p1 | i6~i31 | 26 | i5,i27,i29,i30 | i5,i29 |  | t35,a1,t261,Fr1,t262,x1,x2,x3,a2,Ar12,Ar22,Fr2,t263,a1,Ar13,Ar23,Fr3,t264,t265,t266,Br1,Br2,Br3 |  | 0.27 |
| t261 | i7 | 1 | i6,i7 | i6 | i7 | p1,a1 |  | 2 |
| t262 | i11 | 1 | i10,i11 | i10 | i11 | p1 | Fr1,x1 | 4 |
| x1 | i12~i14 | 3 | i11,i12,i14 | i11 | i12,i14 | p1,x2,x3 | t262,x2 | 2 |
| x2 | i13~i24 | 6 | i12,i13,i20 | i12 | i20 | p1,x1,x3,x2,Ar12,Ar22,Fr2,t263,Br2 | a3 | 0.75 |
| x3 | i14,i15,i22~i26 | 7 | i13,i24 | i13 | i26 | p1,x1,x2,,a2,a3,Ar13,Ar23,Fr3,t264,Br3 | a3 | 0.57 |
| a2 | i15,i16,i17,i22 | 4 | i14,i15,i17,i22 | i14 | i17,i22 | p1,x2,x3,Ar12 | x1,Ar22,Ar13 | 2 |
| t263 | i20 | 1 | i19,i20 | i19 | i20 | p1,x2 | a3,Fr2 | 4 |
| a3 | i21,i27,i28 | 3 | i20,i26,i27,i28 | i20,i26 | i28 | p1,x2 | t263,t264,x2,x3,a1 | 2.67 |
| t264 | i26 | 1 | i25,i26 | i25 | i26 | p1,x3 | Fr3,a3 | 4 |
| t265 | i28 | 1 | i27,i28 | i27 | i28 | p1 |  | 4 |
| t266 | i31 | 1 | i30,i31 | i30 | i31 | p1 |  | 4 |
| t2 | i33 | 1 | i32,i33 | i32 | i33 |  | Fr4 | 2 |

FIG. 25

| ASSIGNMENT (n20) | LIVE RANGE (n21) | LIVE RANGE LENGTH (n22) | USE INTERMEDIATE LANGUAGE INSTRUCTION GROUP (n23) | START POINT GROUP (n24) | END POINT GROUP (n25) | INTERFERING ASSIGNMENT GROUP (n26) | RESOURCE SUCCESSION ASSIGNMENT GROUP (n27) | ASSIGNING RESOURCE ELEMENT (n28) |
|---|---|---|---|---|---|---|---|---|
| Pr1 | i1 | 1 | i1 | | i1 | Pr2 | t35 | A0 |
| Pr2 | i1,i2 | 2 | i2 | | i2 | Pr1,t35 | t34 | D0 |
| Ar1 | i9 | 1 | i8,i9 | i8 | i9 | p1 | a1 | D0 |
| Fr1 | i10 | 1 | i9,i10 | i9 | i10 | p1 | t62 | D0 |
| Ar12 | i17,i18 | 2 | i16,i18 | i16 | i18 | p1,x2,a2,Ar22 | | D0 |
| Ar22 | i18 | 1 | i17,i18 | i17 | i18 | p1,x2 | a2 | D1 |
| Fr2 | i19 | 1 | i18,i19 | i18 | i19 | p1,x2 | t63 | D0 |
| Ar13 | i23,i24 | 2 | i22,i24 | i22 | i24 | p1,x3,Ar23 | a2 | D1 |
| Ar23 | i24 | 1 | i23,i24 | i23 | i24 | p1,x3,Ar13 | | D0 |
| Fr3 | i25 | 1 | i24,i25 | i24 | i25 | p1,x3 | t64 | D0 |
| Fr4 | | | i33 | i33 | | | t2 | D0 |
| Br1 | i9 | 1 | i9 | i9 | i9 | p1 | | D0,D1,A0 |
| Br2 | i18 | 1 | i18 | i18 | i18 | p1,x2 | | D0,D1,A0 |
| Br3 | i24 | 1 | i24 | i24 | i24 | p1,x2 | | D0,D1,A0 |

FIG. 26A

| t262 | t263 | t264 | t265 | t266 | a3 | t1 | t34 | t261 | x1 | a2 | t2 | a1 | x2 | t35 | x3 | p1 | |
|------|------|------|------|------|----|----|----|------|----|----|----|----|----|----|----|----|---|
| D0 | YET | YET | YET | YET | YET | YET | YET | YET | YET | YET | YET | YET | YET | YET | YET | YET | (a) |
| D0 | D0 | YET | YET | YET | YET | YET | YET | YET | YET | YET | YET | YET | YET | YET | YET | YET | (b) |
| D0 | D0 | D0 | YET | YET | YET | YET | YET | YET | YET | YET | YET | YET | YET | YET | YET | YET | (c) |
| D0 | D0 | D0 | D1 | YET | YET | YET | YET | YET | YET | YET | YET | YET | YET | YET | YET | YET | (d) |
| D0 | D0 | D0 | D1 | A0 | YET | YET | YET | YET | YET | YET | YET | YET | YET | YET | YET | YET | (e) |
| D0 | D0 | D0 | D1 | A0 | D0 | YET | YET | YET | YET | YET | YET | YET | YET | YET | YET | YET | (f) |
| D0 | D0 | D0 | D1 | A0 | D0 | D0 | YET | YET | YET | YET | YET | YET | YET | YET | YET | YET | (g) |
| ≈ | ≈ | ≈ | ≈ | ≈ | ≈ | ≈ | ≈ | ≈ | ≈ | ≈ | ≈ | ≈ | ≈ | ≈ | ≈ | ≈ | |
| D0 | D0 | D0 | D1 | A0 | D0 | D0 | D0 | A0 | D0 | D2 | D0 | D0 | D3 | A0 | A1 | A2 | (h) |

FIG. 26B

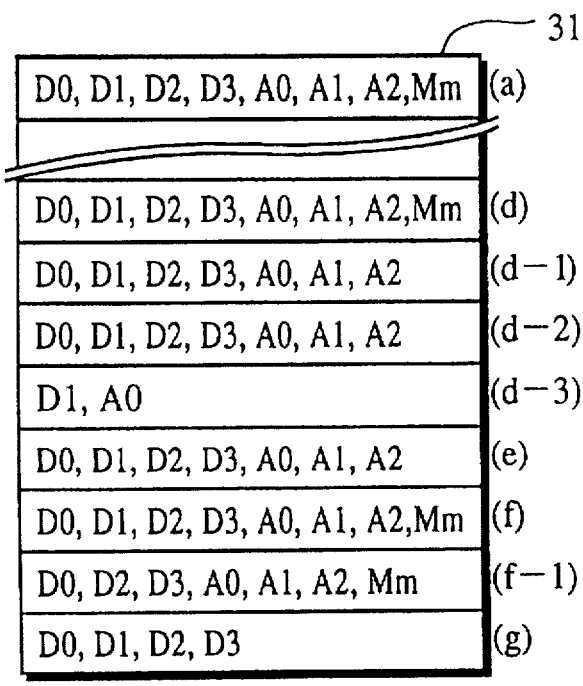

FIG. 27A

| OP | OPR1 | OPR2 | RESULT | WORK | COST | |
|---|---|---|---|---|---|---|
| ADDITION | Dn¦An¦IM | Dm¦Am¦IM | SAME LEFT¦SAME RIGHT | - | 1 | (a) |
| | Dn¦An¦IM | Dm¦Am¦IM | DIFFERENT¦YET | - | 2 | (b) |
| | Dn¦An | Mm¦YET | SAME LEFT | d1¦a1 | 2 | |
| | Dn¦An¦IM | Mm¦YET | SAME RIGHT¦YET | d1¦a1 | 3 | (l) |
| | Dn¦An¦IM | Mm¦YET | DIFFERENT | - | 3 | |
| | Mm¦YET | Dn¦An | SAME RIGHT | d1¦a1 | 2 | |
| | Mm¦YET | Dn¦An¦IM | SAME LEFT¦YET | d1¦a1 | 3 | (f) |
| | Mm¦YET | Dn¦An¦IM | DIFFERENT | - | 3 | (m) |
| | Mm¦YET | Mm¦YET | SAME LEFT¦SAME RIGHT¦YET DIFFERENT¦ | d2¦a2¦d1.a1 | 4 | (k) |
| SUBTRACTION | Dn¦An | Dm¦Am¦IM | SAME LEFT | - | 1 | |
| | Dn.K¦An.K | Dm¦Am | SAME RIGHT | - | 2 | |
| | Dn.N¦An.N | Dm¦Am | SAME RIGHT | d1¦a1 | 3 | |
| | Dn¦An | Dm¦Am¦IM | DIFFERENT¦YET | - | 2 | |
| | IM | Dm¦Am | SAME RIGHT | d1¦a1 | 3 | |
| | IM | Dm¦Am | DIFFERENT¦YET | - | 2 | |
| COMPARISON | Dn¦An¦IM | Dn¦An¦IM | - | - | 1 | |
| | M | YET | - | - | 2 | |
| | Dn¦An¦IM | | | | | |
| SUBSTITUTION | Dn | Dn | - | - | 0 | (c) |
| | An | An | - | - | 0 | (d) |
| | Dn¦An | Dm¦Am | - | - | 1 | (h) |
| | Dn¦An | Mm¦IM¦YET | - | - | 2 | (e) |
| | Mm | Dm¦Am | - | - | 2 | |
| | Mm | Mm | - | d1¦a1 | 4 | |
| INDIRECT REFERENCE | Dn¦An | Am | - | - | 1 | |
| | Dn¦An | Dm | - | - | 2 | |
| | Mm¦YET | Am | - | d1¦a1 | 2 | (i) |
| | Mm¦YET | Dm | - | d1¦a1 | 3 | (j) |
| | Mm¦YET | Mm¦YET | - | d1,a1¦a2 | 3 | |
| | Dn¦An | Mm¦YET | - | a1 | 2 | (g) |
| | Dn | Dm | - | a1 | 2 | |

FIG. 27B

| D0 | D1 | D2 | D3 | A0 | A1 | A2 | Mm | |
|---|---|---|---|---|---|---|---|---|
| 2 | 3 | 3 | 3 | 3 | 3 | 3 | 5 | (a) |
| 5 | 5 | 5 | 5 | 5 | 5 | 5 | 7 | (d) |

FIG. 28A

| D0 | D1 | D2 | D3 | A0 | A1 | A2 | Mm | |
|---|---|---|---|---|---|---|---|---|
| 0 | 0 | 0 | 0 | 0 | 0 | 0 | 0 | (d) |
| 0 | 0 | 0 | 0 | 0 | 0 | 0 | 0 | (d-1) |
| 0 | 0 | 0 | 0 | 0 | 0 | 0 | 0 | (d-2) |
| 0.27 | 0.27 | 0 | 0 | 0.27 | 0 | 0 | 0 | (d-3) |
| 0.27 | 1.61 | 0 | 0 | 1.61 | 0 | 0 | 0 | (d-4) |

| D0 | D1 | D2 | D3 | A0 | A1 | A2 | Mm | |
|---|---|---|---|---|---|---|---|---|
| 0 | 0 | 0 | 0 | 0 | 0 | 0 | 0 | (d) |
| 0 | 0 | 0 | 0 | 0 | 0 | 0 | 0 | (d-1) |
| -1 | -1 | 0 | 0 | -1 | 0 | 0 | 0 | (d-2) |
| 0 | 0 | 0 | 0 | 0 | 0 | 0 | 0 | (d-3) |
| 0.25 | 0 | 0 | 0 | 0 | 0 | 0 | 0 | (d-4) |
| 0.50 | 0 | 0 | 0 | 0 | 0 | 0 | 0 | (d-5) |
| 0.25 | -0.25 | 0 | 0 | -0.25 | 0 | 0 | 0 | (d-6) |
| 0 | -0.5 | 0 | 0 | -0.5 | 0 | 0 | 0 | (d-7) |

| | |
|---|---|
| EMPTY | (d) |
| (A1,t265,1,(D0,D1,D2,D3,A0,A1,A2)) | (d-1) |
| EMPTY | (d-2) |
| EMPTY | (d-3) |
| (A2,p1,1,(D0,D1,D2,D3,A0,A1,A2)) | (d-4) |
| EMPTY | (d-5) |
| (A3,a3,1,(D0,D1,D2,D3,A0,A1,A2)) | (d-6) |
| EMPTY | (d-7) |
| (A4,t263,4,(D0,D1,D2,D3,A0,A1,A2))<br>(A5,t264,4,(D0,D1,D2,D3,A0,A1,A2))<br>(A6,x2,4,(D0,D1,D2,D3,A0,A1,A2))<br>(A7,x3,4,(D0,D1,D2,D3,A0,A1,A2)) | (d-8) |
| (A5,t264,4,(D0,D1,D2,D3,A0,A1,A2))<br>(A6,x2,4,(D0,D1,D2,D3,A0,A1,A2))<br>(A7,x3,4,(D0,D1,D2,D3,A0,A1,A2)) | (d-9) |
| (A6,x2,4,(D0,D1,D2,D3,A0,A1,A2))<br>(A7,x3,4,(D0,D1,D2,D3,A0,A1,A2)) | (d-10) |
| (A7,x3,4,(D0,D1,D2,D3,A0,A1,A2)) | (d-11) |
| EMPTY | (d-12) |

| 53 | |
|---|---|
| EMPTY | (d) |
| t265 | (d-1) |
| EMPTY | (d-2) |
| p1 | (d-3) |
| EMPTY | (d-4) |
| a3 | (d-5) |
| a3, t263 | (d-6) |
| a3, t263, t264 | (d-7) |
| a3, t263, t264, x2 | (d-8) |
| a3, t263, t264, x2, x3 | (d-9) |

FIG. 29B

| 54 | |
|---|---|
| EMPTY | (d) |
| EMPTY | (d-1) |
| EMPTY | (d-2) |
| Ar11,Fr1,Ar12,Ar22,Fr2,Ar13,Ar23,Fr3,Br1,Br2,Br3,t262,t263,t264 | (d-3) |
| EMPTY | (d-4) |
| EMPTY | (d-5) |
| Ar12,Ar22,Fr2,t263,Br2 | (d-6) |
| Ar12,Ar22,Fr2,t263,Br2 Ar13,Ar23,Fr3,t264 | (d-7) |

FIG. 29C

| 55 | |
|---|---|
| p1,a3 | (d) |
| a3 | (d-1) |
| EMPTY | (d-2) |

FIG. 30A

| AR | DR | Mm | |
|---|---|---|---|
| 0 | 0 | 0 | (d) |
| 5 | 5 | 0 | (d−1) |
| 0 | 0 | 0 | (d−2) |
| −1.89 | −2.43 | 0 | (d−3) |
| −52.62 | −53.16 | 0 | (d−4) |

| AR | DR | Mm | |
|---|---|---|---|
| 0 | 0 | 0 | (d) |
| 2 | 0 | 0 | (d−1) |
| 5 | 0 | 0 | (d−2) |
| 5 | 5 | 0 | (d−3) |
| 0 | 0 | 0 | (d−4) |
| 7 | 0 | 0 | (d−5) |
| 7 | 9 | 0 | (d−6) |
| 0 | 0 | 0 | (d−7) |
| 11 | 0 | 0 | (d−8) |
| 11 | 11 | 0 | (d−9) |
| 13 | 11 | 0 | (d−10) |
| 13 | 13 | 0 | (d−11) |
| 19 | 19 | 0 | (d−12) |

| | |
|---|---|
| EMPTY | (d) |
| (rA1, t265, 1) | (d−1) |
| EMPTY | (d−2) |
| EMPTY | (d−3) |
| (rA2, p1, 1) | (d−4) |
| EMPTY | (d−5) |
| (rA3, a3, 1) | (d−6) |
| EMPTY | (d−7) |
| (rA4, x2, 4) (rA5, x3, 4) | (d−8) |
| (rA5, x3, 4) | (d−9) |
| EMPTY | (d−10) |

```
extern int f1(int);
extern int f2(int, int);
extern int f3(int, int);
int f(int * p, int a);
{
        int  a1, a2, a3, a4;
        int  *p1;

a1 = (a+3) * 5 ;

for(p1 = p; *p1  ! = 0; p1 ++)
        * {
                a2 =  f1(a1) + 7;

if(a2 >  11)
                {
                        a3 = f2(13, a2) + 17;
                }
                else
                {
                        a3 = f3(a2, 19) + 23;
                } a1 = a3 + ( * p1) ;

} a4 = a1 * 29 + 31;

return a4;

}
```

(1) INTERMEDIATE LANGUAGE PROGRAM (2) LIVE RANGES (2) LIVE RANGES

RESOURCE ASSIGNING APPARATUS WHICH ASSIGNS THE VARIABLE IN A PROGRAM TO RESOURCES

BACKGROUND OF THE INVENTION

1. Field of the Invention

The present invention relates to a resource assigning apparatus which assigns the variables in a program to resources such as registers and memory, to be used by a compiler which compiles a program written in a high-level language into a machine language program.

2. Description of the Related Art

In recent years there have been great improvements in information processing devices with embedded microprocessors which are flexible enough to manage the needs of a variety of users. The software side of the development of such information processing devices has sought the greatest possible reductions in hardware cost (measured in terms of memory size) and the greatest possible improvements in processing speed. This has involved the complete removal of redundant transfer instructions and the maximum possible utilization of microprocessor functions such as addressing mode when developing programs in assembly language. However, since the syntax rules for the assembly language are the instruction system of the processor itself, this leads to very low efficiency in program development and to problems regarding the portability of source files. As a result, attention has been increasingly focussed on the use of high-level programming languages for the development of software for embedded microprocessors in order to increase the efficiency of program development.

By using high-level programming languages, the programmer can express such processes as the storage, operation and transfer of numerical values as operations (steps) which use variables as their operands. Since variables can be freely defined by the programmer, and are used only according to necessity, the programmer is free to write the program according to his/her desires and needs. When these programs (known as source programs) are compiled, they are converted into machine language programs which can be readily understood by the CPU in the computer. Operations in such machine language programs are expressed as machine language instructions which use registers and memory as operands, so that during compiling it becomes necessary to assign the variables in the source program to the registers and memory. This assigning process is known as the resource assigning process. By optimally executing this resource assigning process, the code size of the machine language program produced can be reduced to a minimum, with the execution time of the generated program also being optimized.

The following is a definition of the terms to be used in describing conventional resource allocation devices.

Definition/Reference/Use of a Variable

The setting of a value of a variable is called a "definition" and a use of a set value of a variable is called a "reference". Here, a definition or a reference of a variable in the program is also referred to as a "use" of the variable.

Intermediate Instruction

An intermediate language is a set of code which enables smooth processing when a compiler converts the code of a source program. One step in the intermediate language code is referred to as one intermediate instruction. Intermediate language instructions can be of three- or four-variable format, for example, and provide the basis for the generation of final object code. Here also, the set of intermediate instructions generated by converting a source program is called the intermediate program.

Live Range

The live range, in its widest sense, refers to the range for which the stored value of a variable is valid, while in its narrowest sense, it refers to the range of the program from the step in which a value is substituted into a variable to the step in which this substituted value is used. Here, the live range is expressed as the set of intermediate instructions within the aforementioned range. The intermediate instruction which defines the value of a variable is the start point of the live range, while the final intermediate instruction out of the intermediate instructions which refer to this set value is the end point of the live range. Here, in determining from the sets of intermediate instructions whether live ranges interfere with one another, the coincidence of the end point of one live range with the start point of another is set as not constituting interference between two live ranges.

FIG. 1 shows one example of an intermediate instruction program and the corresponding live ranges (this program is generated by converting the source program shown in FIG. 3A). The live ranges are shown by vertical lines s1, s2, and s3 in FIG. 1. The start point and the end point are expressed in the drawing by the points p1, p2, p3, p4 etc., In FIG. 1, there are two start points for each of the variables c and d, but this is because variables c, d are defined in terms of the two processes p2 and p2 in the decision statement "if (b>=10) {process p1} else {process p2}".

Assignment

The assignment for a resource can be simply the taking of a variable but, since assigning can be performed using different resource elements for each respective live range when there are several live ranges for one variable, this specification takes an assignment as comprising a combination of one variable and one live range. As can be seen with the variable b in FIG. 1A, when one variable has a number of live ranges, these live ranges are expressed as separate assignments b1, b2 etc. so as to distinguish between them.

Here, the "definition", "reference" and "use" of a variable in an assignment are respectively referred to as the "definition", "reference" and "use" of the assignment which includes that variable. In the same way, the intermediate instructions which define an assignment or refer to an assignment are respectively referred to as "definition intermediate instructions" and "reference intermediate instructions", with both kinds being referred to in general as use intermediate instructions.

Assigning Priority Level

This is the parameter for deciding the order in which assignments are assigned to resources.

There are several methods for evaluating this assigning priority level. An example of an assigning priority level calculation based on the activity ratio of the assignment is given below as {numerical equation 1}.

{numerical equation 1} assigning priority level=activity ratio=(number of intermediate instructions using an assignment)/length of live range When an intermediate instruction using this assignment is inside a loop process, the loop-nesting depth level may also be used in this calculation of assigning priority level, as shown in the example below.

assigning priority level=activity ratio=total loop-nesting depth level of loops including use intermediate instructions/length of live range.

Resource Element

This refers to the smallest unit among the elements in computer hardware to which an assignment can be assigned.

Buffers for temporarily storing a value, individual registers, memory elements of a single address in the memory are all examples of this. The number 0 register, the number 1 register, the memory at address 100 and the memory at address 101 are all separate resource elements.

Resource

This refers to a group of resource elements which perform the same function.

As one example, resources can consist of memory and registers. Registers can be subdivided in terms of function into address registers [AR], data registers [DR], global registers and local registers. Additionally, memory can be subdivided in terms of fulfilling the functions of high-speed memory and low-speed memory. If it is possible to subdivide the resource elements in this way into groups which perform the same function, then each of these subdivisions becomes a separate resource.

Interference Graph

The interference graph is a graph to show pictorially the interference between the live ranges of two or more assignments.

The interference graph has the assignments as its vertices, and shows the assignments (vertices) where the live ranges interfere as joined together by edges (lines).

Degree of Vertex

The number of edges joining one vertex in the interference graph.

FIG. 2 shows the construction of a compiler. This compiler is comprised of a syntax analysis apparatus 11, an optimizing apparatus 12, a resource assigning apparatus 63, and a code generation apparatus 14. The following is an explanation of the different components of this compiler with reference to FIG. 1, to the construction in FIG. 2, and to FIGS. 3A, 3B and 3C.

The syntax analysis apparatus 11 executes the lexical analysis, the syntax analysis and the semantic analysis for the source program stored as a file in the storage apparatus (not shown in the figure), and converts the source program into an intermediate program. As one example, it converts the source program in FIG. 3A into the intermediate program shown in FIG. 1.

The optimizing apparatus 12 executes the optimizing of the intermediate program with the object of minimizing the program size and the process execution time of the finally-generated the machine language program. Since the details of this optimizing process are not the gist of this invention, they have been omitted, so that only the aspects which are especially related to resource assigning will be explained.

The optimizing operation includes a basic block conversion operation, control flow analysis, and data flow analysis. Basic block conversion refers to the dividing of the program to be processed into basic blocks.

This is a simplified explanation of this division process. First of all, the optimizing apparatus 12 refers to the first intermediate instruction, instructions which are the destinations of an unconditional or a conditional jump, and instructions which are directly before or after an unconditional or a conditional jump and regards these instructions as the leaders. Then the optimizing apparatus 12 extracts all of the program steps from one leader to the next leader or to the end of the program. The set of instructions obtained by this extraction process is known as a basic block, and becomes the processing unit of the following processes.

The control flow analysis analyses the control flow between all of the basic blocks.

The data flow analysis analyses where values are substituted into each variable and where each variable is used within each separate block. By referring to the results of these analyses, the live ranges of the variables are obtained.

The resource assigning apparatus 63 is an algorithm for assigning resources which assigns the assignments in the intermediate program to the registers and memory using a graph coloring method by means of graph degeneration. The graph coloring method by means of graph degeneration is an algorithm which executes the color classification of every vertex in the interference graph using approximately the least necessary number of colors, according to the principle where, in color classifying, vertices which are joined by an edge are painted using a different color. The assignments in the program shown in FIG. 3A are assigned to the resource elements by the resource assigning process shown in FIG. 3B. In these drawings, the assignment a shown in FIG. 3A is shown as being assigned to resource element R0, while assignment b2 is shown as being assigned to resource element R2.

The code generation apparatus 14 executes the machine language instruction conversion for every intermediate instruction in the intermediate program, converting this intermediate program into a machine language program (shown in FIG. 3C) that can be understood by the target machine. The machine code program which is the result of this conversion by the code generation apparatus 14 is called the object program. The machine language instructions in this object program and the corresponding intermediate instructions in the program of FIG. 1 are shown by the symbols (1), (2), (3), (4) etc. in FIG. 3C. In the above machine language instruction conversion, the resource assigning results shown in FIG. 3B are used as the machine language instruction operands. Also the transfer instructions in the drawing t11, t12, t13, t14, t15 etc. are generated by the code generation apparatus 14 so that the processing of every step in the intermediate program shown in FIG. 1 can be achieved by machine language instructions. Here, depending on the results of the resource assigning, it can be the case that several of these transfer instructions will no longer be necessary. As one example, it can be seen that in FIG. 3C, since in (7) assignments b2 and c are both assigned to the same register, the generation of a transfer instruction is no longer necessary.

The following is an explanation of the resource assigning apparatus 63. The details of the resource assigning process using the graph coloring method mentioned above are described by the following documents.

[1] A. V. Aho, R. Sethi, J. D. Ullman; "Compilers Principles, Techniques and Tools" Addison-Wesley, 1986

[2] Chaitin.; "Register allocation and spilling via graph coloring", U.S. Pat. No. 4,571,678, Feb. 18, 1986.

[3] Frederick Chow, John Hennessy; "Register Allocation by Priority-based Coloring", Computer Systems Laboratory, Stanford University.

[4] David Bernstein, . . . Ron Y. Pinter; "Spill code minimization techniques of optimizing compilers", SIGPLAN 1989, IBM Israel Science and Technology Technion City Haifa, Israel.

[5] Masataka Sasa; "Programming Gengo Shorikei", Register Assignment p420–p423, Iwanami Books.

[6] Mori et al.: "A Systematic Register Assigning Method for a Composite Bank Construction and its General Implementation" Johoshori Gakkai (Information Processing Society) Vol.30, No.6, Jun. 1989.

The construction of the aforementioned resource assigning apparatus 63 is shown in FIG. 4. As shown in FIG. 4, the resource assigning apparatus 63 is comprised of an assignment generation unit 71 for generating the assignments in accordance with the process results of the optimizing apparatus 12, an assignment storage unit 72 for storing the assignments generated by the assignment generation unit 71, a priority level calculator 73 for calculating the priority level of every assignment stored in the assignment storage unit 72 by means of the equation given above as {numerical equation 1} as well as storing the results, a live range information storage unit 74 for storing information about the live ranges, as shown in FIG. 1, for every assignment and the information as to how these live ranges interfere, an expansion unit 75 for expanding all of the assignments stored in the storage unit 72 in the interference graph, a buffer 76 for expansion by the expansion unit 75, a stack 77 for piling up all the assignments once they have been expanded by the expansion unit 75, a control unit 80 for executing the resource assigning by means of the graph coloring method according to graph degeneration, and a storage unit 78 for storing the assigning result in the form shown in FIG. 3B.

FIGS. 5A, 5B, and 6A through 6I are drawings for illustrating the graph coloring method according to graph degeneration. The following is an explanation of the operational process of the resource assigning apparatus 63 with reference to these drawings. Here, the number of registers for which assigning is possible is given as 3, with the assignments which cannot be assigned to these registers being assigned to the memory.

The aforementioned expansion unit 75 expresses the assignments shown in FIG. 1 and the interference between the live ranges of these assignments in an interference graph, as shown in FIG. 5A. In this kind of interference graph, the extent to which a live range of an assignment interferes with the live ranges of other assignments is shown as the number of edges which emerge from a vertex. Also, as shown in FIG. 5B, when the start point and end point of live ranges coincide in the same step (assignments b2 and c in FIG. 1), then the control unit 80 combines the corresponding vertices, as shown in FIG. 5B, in order to regard them as one assignment and hence simplify the interference graph (see FIG. 5B, b2c). After accomplishing the simplification, then the modulation of the vertices is executed. The degree of vertex is referred to as being low for vertices with under 3 registers and as being high for vertices with a same number as the number of registers or more. This modulation of degree is used as the formation condition in graph degeneration. The graph degeneration, as indicated by the arrows y11, y12 in FIG. 6A, is carried out so that the vertices of low degree are removed in order of priority value as calculated in (numerical equation 1), from lowest to highest priority level, with the assignment of the removed vertices being piled up in the stack area in last in, first out order. The result of the removal of e2 and d and the transformation of the interference graphs shown in FIGS. 5A and 5B is shown in FIG. 6B.

Since all the vertices in FIG. 6B are of high degree, the above formation condition is not satisfied. As a result, the assignment having the lowest priority level out of these vertices, b1, is assigned to the memory and is removed as shown by the arrow y13 in the drawings. By removing b1, the interference graph is transformed as shown in FIG. 6C, so that, once again, the above formation condition is satisfied. Graph degeneration is again repeated for the state shown in FIG. 6C, and all of the assignments are piled up in the stack, as shown in FIG. 6D. After this piling up process has been completed, the resource assigning process is executed. First, as shown in FIG. 6E, assignment a is retrieved from the top of the stack and is assigned to register R0. Next, as shown in FIGS. 6F and 6G, assignments e1 and b2c are taken from the top of the stack and are assigned to registers R1 and R2 as shown in FIGS. 6E and 6F. The following assignments e2 and d interfere with the live range of b2c, but, since they do not interfere with the live ranges of assignments a and e1, then e2 is assigned to the lowest number register R0 for which assignment is possible, as shown in FIG. 6H, while assignment d is assigned to register R1, as shown in FIG. 6I. By means of this kind of assignment process, assignments whose live ranges interfere with each other can be assigned to different registers.

The above assignments a, b2, c, d, e1, e2, and b1 are all assigned to resource elements by the resource assigning process, but, for high-level languages such as C language, there are registers for which the combination with assignments is already decided. These registers are used to improve the efficiency of function call operations, and are known as argument registers, return value registers and broken registers.

Argument registers are registers for transferring arguments when there is a function call. Assignments used as arguments in the intermediate program are assigned to these argument registers.

Return value registers are registers for returning the return value of the function call. Assignments used for returning the return value in the intermediate program are allocated to these return value registers.

Broken registers are registers for assigning the assignments for which it is not necessary to store and restore the stored values at the start and end of the function call. The object of these broken registers is to reduce the overheads of a function call. When such a function call is executed, there is the possibility that the content of every register will be changed according to the process within the called function, so that before or after the function call, it will be necessary to store and restore the content of the registers. These storing and restoring functions for every register increase the overheads of the function call. However, by setting beforehand the broken registers for which storing and restoring are unnecessary and assigning the assignments which do not include function calls in their live ranges to the broken registers, the number of storing and restoring operations can be minimized.

However, for resource assigning apparatuses constructed according to the prior art, there has been the problem that resource allocation can increase execution time and the memory size of the object program. This will be explained with reference to FIG. 7. In this drawing, the vertical lines show the live ranges of the assignments, with the lines shown as thick white lines showing the assignments which are yet to be assigned, and the thick shaded lines showing the assignments which have been assigned. Here, parts of the vertical lines representing assignments x0, x1, and x5 run parallel with the vertical lines representing assignments z0, z1 and z2, showing that the live ranges of these assignments interfere with one another.

In the example shown in FIG. 7, assignments whose live ranges follow on one after the other can be combined (assignments x0, x1, x2, x3, x4, x5) so as to form one vertex as described above, this being the assignment y. This combined assignment y has a live range which interferes with the live range of the assignment z0 which has already been assigned to the resource element R0, with the live range of the assignment z1 which has already been assigned to the resource element R1, and with the live range of the assignment z2 which has already been assigned to the resource element R2. If its live range interferes with those of assignments which have already been assigned in this way, then it is not possible to assign assignment y to any resource element which has been assigned one of these assignments (in other words, to any of resource elements R0, R1 and R2). This results in the assignment y which consists of the assignments x0, x1, x2, x3, x4, x5 being assigned to the memory, so that intermediate instructions which use any of these assignments as operands are converted into machine language instructions which take memory addresses as operands. Machine language instructions which take the memory as operands are usually of low operational speed and take up a large amount of memory space, increasing the execution time and memory size of the object program.

Additionally, when the resources are split up into 3 or more functions, then there is the problem in that resource assigning cannot be achieved in accordance with the functions of the resources, which has a detrimental effect on the execution speed and memory size of the object program.

The Mori et al. treatise mentioned above teaches the assigning of resources after first referring to the cost of accessing each of the different kinds of register when there are a number of registers of different classes such as address registers and data registers. In this treatise, the basic conception, "In C language, all assignments storing pointer-type variables are assigned to the address registers" is given. However, such address-type assignments can also include assignments which are used several times in addition and subtraction and which to a small extent include indirect reference of the memory. Such assigning will lead to the uniform assigning of assignments to the address register, even for a target machine which includes a data register which can execute such addition and subtraction at high speed, thereby creating a large number of transfer instructions from the address register to the data register in the object program, resulting in an increase in the memory size and execution time of the object program.

For the above reasons, it can be seen that assigning in accordance with only the necessary cost of assigning registers sorted merely in terms of class can result in the generation of a large number of transfer instructions.

There has also been the problem of not be able to execute resource assigning using the stored values of the argument registers, the return value registers and the broken registers as they are. These registers are originally set so that function calls can be executed efficiently.

The graph coloring method is an approximate algorithm for executing the most suitable color classification of the vertices in the interference graph. Since the argument registers, the return value registers and the broken registers are resource elements to which assignments are assigned before the execution of the algorithm, then these registers are regarded as colored vertices in the interference graph. In order to realize resource assigning which can use the stored values of the argument registers, return value registers and the broken registers as they are, then it becomes necessary to build the colored vertices into the interference graph and to execute a coloring process using that color for other vertices if it is valid, although this leads to deviation of the limits of the graph coloring method. For the above reason, it is normally necessary to prepare separately the argument registers, the return value registers and the broken registers as assignable registers so that they may be used. Therefore, to use the stored values of the argument registers, the return value registers and the broken registers, a transfer instruction for the register used for assigning becomes necessary. Once this kind of transfer instruction becomes necessary, the necessary memory size and the execution time of the object program have to be increased by the amount used by this instruction.

The effect of the aforementioned problems can be regarded as being of an insignificant level when there is an abundant supply of registers. However, when there are only a limited number of registers, such as with many embedded microprocessors, or when there are a small number of registers of several different kinds which fulfill different functions, then the effect of these problems becomes significant.

The first object of the present invention is to provide a resource assigning apparatus which is able to assign assignments to resource elements in order of priority ranking and, by limiting as much as possible the generation of transfer instructions, can restrict as far as possible the memory size and execution time needed by an object program.

The second object of the present invention is to provide a resource assigning apparatus which can achieve a "smart" assigning wherein assignments whose loop-nesting depth level is deep can be prioritized and assigned to registers, with remaining assignments with progressively shallower loop-nesting depth levels being distributed among these registers.

The third object of the present invention is to provide a resource assigning apparatus which can achieve a "smart" assigning wherein assignments whose frequency of use is high can be prioritized and assigned to registers, with remaining assignments with progressively lower frequencies of use being distributed among these registers.

The fourth object of the present invention is to provide a resource assigning apparatus which can execute resource assigning with a detailed understanding for assignments of the distance from, the running into of live ranges with, and interference with assigned assignments.

The fifth object of the present invention is to provide a resource assigning apparatus which can execute assigning of assignments making fullest use of the separate functions of the resources included in a microprocessor.

The sixth object of the present invention is to provide a resource assigning apparatus which can achieve a "smart" assigning wherein assigning of assignments which are pre-determined by an operator can be performed to resources such as argument registers, return value registers and broken registers.

SUMMARY OF THE INVENTION

The first and fourth objects of the present invention are achieved by a resource assigning apparatus to be used by a compiler which compiles a program written in a high-level language into a machine language program, wherein the resource assigning apparatus generates a plurality of assignments, each of which is a combination of a variable in the program written in the high-level language and a live range, and assigns the generated assignments in order to resource elements of hardware resources such as registers and memory, the resource assigning apparatus comprising: a profit/loss value calculation unit for calculating, for each resource element, a profit/loss value which shows a degree of suitability of a resource element for a next assignment to be assigned, based on a positional relationship between live ranges of any assignments which have already been assigned and a live range of the next assignment; an assigning unit for assigning the next assignment to any of the resource elements based on a value of the profit/loss value calculated for each resource element; and a control unit for repeatedly activating the profit/loss value calculation unit and the assigning unit until every assignment has been assigned.

By means of this construction, assignments in groups of assignments which have positional relationships such that their live ranges are continuous have their profit/loss values increased in accordance with the extent of the live range length, with any assignments in such a group having a live range which interferes with a live range of an already assigned assignment being assigned to a different resource element as the assigned assignment with which there is interference, so that resource assigning is performed with consideration to the positional relationship between live ranges and so that assignments whose live ranges are continuous will not be uniformly assigned in all cases. Accordingly, the assigning state of the surrounding assignments influences the next resource assigning to be executed, which results in a greater reduction in the number of transfer instructions.

Also, the resource assigning apparatus may further comprise a positional relationship determination unit for determining the positional relationships between all of the assignments in the program written in the high-level language, wherein the positional relationship determination unit may include: an interfering relation determination unit for determining whether the live range of the next assignment interferes with a live range of any assignment which has already been assigned to a resource element; and an assigned-next continuation determination unit for determining whether the live range of the next assignment is continuous with a live range of any assignment which has already been assigned to a resource element, wherein the profit/loss value calculation unit may include a first increase unit for increasing, when the assigned-next continuation determination unit determines that the live range of the next assignment is continuous with an assigned assignment, a profit/loss value of the resource element to which the assigned assignment has been assigned in accordance with an extent of a live range length from the assigned assignment to the next assignment, and wherein the assigning unit may determine not to assign the next assignment to a resource element which has been assigned an assignment determined by the interfering relation determination unit to have a live range which interferes with the live range of the next assignment, and instead determines to assign the next assignment to a resource element, out of all resource elements which have not been determined to have an interfering live range, which has a highest profit/loss value.

Also, the positional relationship determination unit may further include: a first assigned assignment interference detection unit for detecting an unassigned assignment whose live range interferes with a live range of any assigned assignment; an unassigned-next continuation determination unit for determining whether the live range of the unassigned assignment detected by the first assigned assignment interference detection unit is continuous with the live range of the next assignment; and a first reduction unit for reducing, when it is determined by the unassigned-next continuation determination unit that the live ranges are continuous, a profit/loss value of a resource element which has been assigned an assigned assignment detected as interfering with the unassigned assignment, in accordance with an extent of live range length from the unassigned assignment detected by the first assigned assignment interference detection unit to the next assignment.

By means of this construction, by reducing the profit/loss value for a resource element which has been assigned an assignment which, from the viewpoint of the assignment to be assigned, causes a loss, the assigning state of the surrounding assignments is made to influence the next resource assigning to be executed, which results in a greater reduction in the number of transfer instructions.

Also, when a plurality of unassigned assignments are determined by the first assigned assignment interference detection unit, the unassigned-next continuation determination unit may determine whether a live range of any of the plurality of unassigned assignments determined by the first assigned assignment interference detection unit is continuous with the live range of the next assignment.

By means of this construction, the multiple reduction of the profit/loss values of resource elements which have been assigned assignments by the detection of unassigned assignments, leading to relatively low evaluations of such elements, can be avoided.

The second and third objects of the present invention are achieved by a resource assigning apparatus which may further include a priority level storage unit for storing a priority level corresponded to each assignment, the priority level reflecting at least one of a frequency of use of an assignment in the program and a loop-nesting depth level of a live range of an assignment, wherein the profit/loss value calculation unit and the assigning unit determine which assignment is a next assignment in order of priority levels stored in the priority level storage unit.

By means of this construction, assigning to resource elements is executed in order of the frequency of use or loop-nesting depth level of assignments, so that resource assigning is performed taking into account the positional relationships between live ranges, frequency of use and loop-nesting depth level of assignments, leading to an improvement in the quality of the object program.

Also, the positional relationship determination unit may further include: a next assignment interfering assignment detection unit for detecting, when there is a plurality of resource elements whose profit/loss values calculated by the profit/loss value calculation unit are of a same value, any unassigned assignments whose live range interferes with the live range of the next assignment; and an unassigned-assigned continuation determination unit for determining whether a live range of an assignment detected by the next assignment interfering assignment detection unit is continuous with the live range of an assigned assignment, wherein the profit/loss calculation unit may further include: a priority level detection unit for detecting a priority level of an assignment detected by the next assignment interfering assignment detection unit; a first extent calculation unit for calculating an extent of live range length from the unassigned assignment detected by the next assignment interfering assignment detection unit to the assigned assignment determined by the unassigned-assigned continuation determination unit to have a live range which continues with a live range of the detected unassigned assignment; and a second reduction unit for multiplying the priority level detected by the priority level detection unit by the extent of live range length calculated by the first extent calculation unit and for reducing a profit/loss value of a resource element to which the determined assigned assignment is assigned in accordance with a multiplication result.

By means of this construction, by reducing the profit/loss value for a resource element which has been assigned an assignment which, from the viewpoint of the assignment to be assigned, causes a loss, the assigning state of the surrounding assignments is made to influence the next resource assigning to be executed, which results in a greater reduction in the number of transfer instructions.

Also, the positional relationship determination unit may further include: a second assigned assignment interference detection unit for detecting an unassigned assignment whose live range interferes with a live range of any assigned assignment; and an unassigned-unassigned continuation determination unit for determining whether a live range of an unassigned assignment detected by the next assignment interfering assignment detection unit is continuous with a live range of an unassigned assignment detected by the second assigned assignment interference detection unit, and wherein the profit/loss value calculation unit may further include: a second extent calculation unit for calculating an extent of live range length from an unassigned assignment detected by the next assignment interfering assignment detection unit to the unassigned assignment detected by the second assigned assignment interference detection unit to have a live range which interferes with a live range of an assigned assignment; and a second increase unit for multiplying the priority level detected by the priority level detection unit by the extent of live range length calculated by the second extent calculation unit and for increasing a profit/loss value of a resource element to which the detected assigned assignment is assigned in accordance with a multiplication result.

By means of this construction, by increasing the profit/loss value for a resource element which has been assigned an assignment which, from the viewpoint of the assignment to be assigned, causes a profit, the assigning state of the surrounding assignments is made to influence the next resource assigning to be executed, which results in a greater reduction in the number of transfer instructions.

Also, when a plurality of unassigned assignments are determined by the second assigned assignment interference detection unit, the unassigned-unassigned continuation determination unit may determine whether any unassigned assignment, out of the determined plurality of unassigned assignments, has a live range which is continuous with the live range of the next assignment.

By means of this construction, the multiple reduction of the profit/loss values of resource elements which have been assigned assignments by the detection of unassigned assignments, leading to relatively low evaluations of such elements, can be avoided.

Also, the resource assigning apparatus may further include a profit/loss value storage unit for storing each resource element corresponded with an initial value of a profit/loss value, wherein the first and second increase units may increase a profit/loss value of each resource element stored in the profit/loss value storage unit and the first and second reduction units may reduce a profit/loss value of each resource element stored in the profit/loss value storage unit.

By means of this construction, the profit/loss values of each resource element stored by the profit/loss value storage unit are increased by the first and second increase units and reduced by the first and second reduction units. As a result, the profits and losses caused for each resource element can be objectively evaluated even when a resource element has been assigned assignments which cause a profit for an assignment to be assigned and assignments which cause a loss for an assignment to be assigned, so that more precise resource assigning can be achieved. Here, since the profit/loss value storage unit stores each resource element corresponded with an initial value of the total profit/loss value for each resource element, if some resource elements have been assigned assignments which cause a loss, the profit/loss value of resource elements which have not been assigned an assignment will be given a higher estimation. In this way, assigning to a resource element which has not been assigned an assignment can be achieved.

The fifth object of the present invention is achieved by a resource assigning apparatus which may further include: an estimation unit for estimating what will happen to a total value, which expresses at least one of a number of execution cycles and a code size of all definition instructions in which the next assignment is defined and use instructions in which the assignment is used, when assigning to resource elements belonging to each resource by calculating estimated values for the total value for pairings of the next assignment and each resource element; and a resource element singular/plural determination unit for comparing estimated values which are a result of estimating for each resource element and determining whether a plurality of resource elements have a lowest estimated value or whether only one resource element has a lowest estimated value, wherein, when the resource element singular/plural determination unit determines that only one resource element has a lowest estimated value, the assigning unit may assign the next assignment to the resource element determined to have the lowest estimated value, while when the resource element singular/plural determination unit determines that a plurality of resource elements have a lowest estimated value, the assigning unit may assign the next assignment to a resource element out of the plurality of resource elements with a lowest estimated value which has a highest profit/loss value.

By means of this construction, switching is performed between using the estimated value and the profit/loss value, so that when the estimated value is used, code size and execution time can be reflected by assignments so that detailed cost information for the instructions of the microprocessor can be effectively put to use, meaning that a favorable selection of a resource element for assigning an assignment can be made out of resources which are split up between three or more functions. By using the present compiler to develop programs for embedded microprocessors which are equipped with a plurality of resources which have different functions, an object program which puts the different functions available in the microprocessor to good use can be achieved.

Also, the estimation unit may include: an instruction pattern output unit for outputting an instruction pattern, which is information which uses an instruction format of machine language instructions and which expresses definition instructions and use instructions of an assignment in a program, for every definition instruction and use instruction of the assignment in the program; a cost storage unit for storing a cost showing at least one of a number of execution cycles and a code size of definition instructions and use instructions when resource elements of each resource are used as each operand in a machine language instruction, corresponded to each instruction pattern obtained as an output from the instruction pattern output unit; and a cost totalling unit for retrieving a cost from the cost storage unit corresponding to the output instruction pattern, for totalling retrieved costs for each resource element and for setting the totalled costs as estimated values.

By means of this construction, then in converting the definition instructions and use instructions of an assignment into machine language instructions, a precise judgement of which resource's resource element is most suitable for assigning can be made, so that an object program which puts the different functions available in the microprocessor to good use can be achieved.

Also, the resource assigning apparatus may further include a prediction unit for predicting, when a profit/loss value calculated by the profit/loss value calculation unit for resource elements belonging to a plurality of resources have a same value, a resource element which when used for assigning the next assignment allows a most favorable assigning of all unassigned assignments which have a lower priority level than the next assignment, wherein the assigning unit may assign the next assignment to the resource element predicted by the prediction unit.

By means of this construction, when the calculated profit/ loss values of assigned resource elements belonging to a number of different resources have a same value, since the assigning unit assigns the assignment to be assigned to a resource element judged to be suitable for all of the assignments of lower priority levels, a more precise selection of resource element can be made when the merits of resource elements cannot be evaluated by profit/loss values alone. As a result, the assignments of lower priority levels can be assigned so as to reduce the code size/execution time of the definition instructions and use instructions included therein. Furthermore, by assigning to such a resource element, this resource element can be succeeded when assigning a next assignment, so that it becomes more likely that all of the assignments whose live ranges are continuous with one another can be assigned to a same resource element.

Also, the prediction unit may include: a first lower order assignment detection unit for detecting all unassigned assignments which have a live range which is continuous with the live range of the next assignment and which also have a priority level lower than a priority level of the next assignment; a first estimation unit for estimating what will happen to a total value, which expresses at least one of a number of execution cycles and a code size of all definition instructions in which the next assignment is defined and use instructions in which the assignment is used, when assigning each assignment detected by the first lower order assignment detection unit to each resource element, by calculating estimated values for the total value for pairings of each assignment detected by the first lower order assignment detection unit and each resource element; a first live range length calculation unit for calculating a continuous length of live range for each assignment detected by the first lower order assignment detection unit, the length of live range being between the next assignment and each assignment detected by the first lower order assignment detection unit; a first weighting unit for weighting the estimated value calculated by the first estimation unit for pairings of each detected assignment and each resource element using the calculated length of live range; a first totalling unit for totalling estimated values weighted by the first weighting unit for each resource element; and a first optimal resource element determination unit for determining that a resource element, which when used for assigning the next assignment allows a most favorable assigning of all unassigned assignments which have a lower priority level than the next assignment, is a resource element which has a lowest total value totalled by the first totalling unit, wherein a resource element determined as a determination result of the first optimal resource element determination unit is set as a prediction result of the prediction unit.

By means of this construction, evaluation is performed based on the distance of the unassigned assignment from the assignment to be assigned and on the size of the estimated value of the code size and the execution time of definition instructions and reference instructions of assignments of lower priority which are assigned after the assignment to be assigned and whose live ranges are continuous with each other, so that the execution time and/or code size of definition instructions and reference instructions of assignments which assignments close to the assignment to be assigned are given a higher estimation and the execution time and/or code size of definition instructions and reference instructions of assignments which assignments far to the assignment to be assigned are given a lower estimation. As a result, there is an increase in the probability that assignments whose live ranges are continuous can be assigned to the same resource element. This leads to an estimation of resource elements which enables a reduction in code size and execution time for lower order assignments.

Also, the prediction unit may further include: a second lower order assignment detection unit for detecting, when a plurality of resource elements are determined by the first optimal resource element determination unit to be most favorable, unassigned assignments which have a live range which interferes with the live range of next assignment and unassigned assignments which have a live range which is continuous with a live range of an assignment which has a live range which interferes with the live range of the next assignment; a second estimation unit for estimating what will happen to a total value, which expresses at least one of a number of execution cycles and a code size of all definition instructions in which each detected assignment is defined and use instructions in which each assignment is used, when assigning each unassigned assignment detected by second lower order assignment detection unit to each resource element, by calculating estimated values for the total value for pairings of each assignment detected by the second lower order assignment detection unit and each resource element; a second live range length calculation unit for calculating a continuous length of live range for each assignment detected by the second lower order assignment detection unit, the length of live range being between an unassigned assignment whose live range interferes with the live range of the next assignment and an assignment which has a live range which is continuous with the live range of the unassigned assignment whose live range interferes with the live range of the next assignment; a second weighting unit for weighting the estimated value calculated by the second estimation unit for pairings of each unassigned assignment detected by the second lower order assignment detection unit and each resource element using the length of live range calculated for each assignment by the second live range length calculation unit and the priority value of each assignment; a second totalling unit for totalling the estimated values of each assignment weighted by the second weighting unit for each resource element; and a second optimal resource element determination unit for determining that a resource element, which when used for assigning the next assignment allows a most favorable assigning of all unassigned assignments which have a lower priority level than the next assignment, is a resource element which has a highest total value totalled by the second totalling unit.

Also, the first and second weighting units may perform weighting using an extent of live range length of "1" when the live range lengths between assignments calculated by a respective one of the first live range length calculation unit and the second live range length calculation unit is "0", and the first and second weighting units may calculate a reciprocal of a live range length and perform weighting using the calculated reciprocal as an extent of live range length when the lengths of live range between assignments calculated by a respective one of the first live range length calculation unit and the second live range length calculation unit is not "0".

By means of the above construction, since evaluation is performed based on a comparison of the estimated costs of the execution time and/or code size of definition instructions and use instructions of assignments which have a lower priority level than the assignment to be assigned and whose live ranges interfere as well as on a distance from the unassigned assignment to the assignment to be assigned, a reliable evaluation of the resource elements can be performed so as to reduce the execution time and/or the code size of the lower order assignments.

Also, the resource assigning apparatus may further include a cost storage unit for storing a plurality of instruction patterns, each being information which uses an instruction format of machine language instructions and which expresses definition instructions and use instructions of an assignment in a program, and for storing a cost showing at least one of a number of execution cycles and a code size of definition instructions and use instructions of an assignment in the program when resource elements of each resource are used as each operand in a machine language instruction, corresponded to each instruction pattern, wherein the first estimation unit may include: a first instruction pattern output unit for retrieving instruction patterns corresponding to all definition instructions and use instructions for an unassigned assignment detected by the first lower order assignment detection unit and outputting the retrieved instruction patterns; and a first cost totalling unit for retrieving a cost from the cost storage unit corresponding to the output instruction patterns, for totalling the retrieved costs for each resource element and setting the totalled costs as estimated values, wherein the second estimation unit may include: a second instruction pattern output unit for retrieving instruction patterns corresponding to all definition instructions and use instructions for an unassigned assignment detected by the second lower order assignment detection unit and outputting the retrieved instruction patterns; and a second cost totalling unit for retrieving a cost from the cost storage unit corresponding to the output instruction patterns, for totalling the retrieved costs for each resource element and setting the totalled costs as estimated values.

Also, an instruction pattern may include information showing whether a storage location of an operation result coincides with either operand in an operation or whether the storage location of an operation result is completely different, and a cost of instruction patterns where a storage location coincides with either operand may be lower than a cost of instruction patterns where a storage location does not coincide with either operand.

Also, an instruction pattern may include information showing whether or not a corresponding use instruction is an end point of a live range, and a cost of instruction patterns where the corresponding use instruction is the end point of the live range may be lower than a cost of instruction patterns where the corresponding use instruction is not the end point.

By means of the above construction, when converting the definition instructions and use instructions of an assignment into machine language instructions, a precise judgement of which resource's resource element is most suitable for assigning can be made, so that a reliable evaluation of the resource elements can be performed so as to reduce the execution time and/or the code size of the lower order assignments.

The sixth object of the present invention can be achieved by a resource assigning apparatus which may further include: a reserved assignment detection unit for detecting assignments which are to be assigned to a predetermined resource element from the program; and a reserved resource element storage unit for storing resource elements to which the assignments detected by the reserved assignment detection unit should be assigned; wherein the assigning unit may assign the assignments detected by the reserved assignment detection unit to the resource elements to which the assignments should be assigned, before assigning an assignment with a highest priority level to any of the resource elements.

Here, other assignments can be assigned to the argument registers, the return value registers and the broken registers, so that resource assigning can be performed so as to allow the stored values of the argument registers, the return value registers and the broken registers to be used as they are. This enables greater reductions in the number of transfer instructions.

Also, the resource assigning apparatus may further include a live range continuation relation group storage unit storing all assignments in the program corresponded to live range continuation relation groups made up of all assignments whose live range ends at start point of a live range of an arbitrary assignment in the program and all assignments whose live range starts at an end point of the arbitrary live range, wherein the assigned-next continuation determination unit may include: a first determination unit for referring to the live range continuation relation group for the next assignment and determining whether there are any assigned assignments in the corresponding live range continuation relation group; a second determination unit for retrieving, when the first determination unit determines that there are no assigned assignments, another assignment in the corresponding live range continuation relation group, for referring to a corresponding live range continuation relation group for the retrieved assignment and determining whether there are any assigned assignments in the corresponding live range continuation relation group; and a control unit for repeatedly activating the second determination unit until the second determination unit determines that there is an assignment, wherein the profit/loss calculation unit may include: a totalling unit for totalling a live range length of the assignments determined by the assigned-next continuation determination unit; and a reciprocal calculation unit for calculating a reciprocal of a total of a live range length of the next assignment and the live range length totalled by the totalling unit and for setting a calculation result as an extent of live range length.

By means of this construction, a reciprocal of the sum of the live range length totalled by the totalling unit and the live range length of the assignment to be assigned is calculated and since this reciprocal is set by the reciprocal calculation unit as the extent of live range, resource assigning can be performed so as to reflect the total live range length, enabling greater reductions in the number of transfer instructions.

Also, a start point and an end point of a live range may be expressed as instruction position information and the resource assigning apparatus may further include: a start/end point storage unit for storing each assignment in the program corresponded with instruction position information for a start point of a live range and instruction position information for an end point of the live range; a first grouping unit for referring to the start/end point storage unit, for detecting, out of all assignments, an assignment where the instruction position information for a start point of a live range coincides with the instruction position information for an end point of a live range of an arbitrary assignment in the program, and for setting a detected assignment and the arbitrary assignment in the program in a same live range continuation relation group; a second grouping unit for referring to the start/end point storage unit, for detecting, out of all assignments, an assignment where the instruction position information for an end point of a live range coincides with the instruction position information for a start point of a live range of an arbitrary assignment in the program, and for setting a detected assignment and the arbitrary assignment in the program in a same live range continuation relation group; and a writing unit for writing into the live range continuation relation group storage unit an assignment in the program corresponded to any live range continuation relation groups to which the assignment belongs, the groups being grouped by one of the first grouping unit and the second grouping unit.

By means of this construction, assignments in the program and live range continuation groups grouped by the first and second grouping units are corresponded together by the writing unit in the live range continuation group storage unit, so that judgements of whether there is or is not succession of live ranges can be more efficiently made.

The objects can also be achieved by a resource assigning apparatus to be used by a compiler which compiles a program written in a high-level language into a machine language program, wherein the resource assigning apparatus assigns a plurality of assignments, which are a combination of a variable in the program written in the high-level language and a live range, in order to resource elements of hardware resources such as registers and memory, the resource assigning apparatus comprising: an assignment storage unit for storing assignments in the program, each assignment being corresponded to a priority level; a first resource element assigning unit for retrieving an assignment with a highest priority level in the assignment storage unit and assigning the assignment with the highest priority level to any of the resource elements; an assignment retrieval unit for retrieving from the assignment storage unit an assignment which has a priority level which comes in order directly after a priority level of an assignment which has just been assigned; a following assignment interfering assignment detection unit for detecting any assignments with a live range which interferes with a live range of the assignment retrieved by the assignment retrieval unit; a resource element detection unit for detecting resource elements which have been assigned assignments detected by the following assignment interfering assignment detection unit; an assignment-resource element detection unit for detecting all assignments which have been assigned to any resource element which has not been detected by the resource element detection unit; a profit continuation assigned assignment determination unit for determining every assignment which has a live range which is continuous with a live range of the assignment retrieved by the assignment retrieval unit, out of the assigned assignments detected by the assignment-resource element detection unit; a first profit/loss value calculation unit for calculating a profit/loss value, which is a value showing appropriateness of assigning a next assignment to a resource element to which an assignment has already been assigned, based on an extent of live range length from an assignment determined by the profit continuation assigned assignment determination unit to the assignment retrieved by the assignment retrieval unit, for each resource element assigned an assignment determined by the profit continuation assigned assignment determination unit; a totalling unit for totalling the calculated profit/loss values for each resource element determined by the assignment-resource element detection unit; a second resource assigning unit for assigning the assignment retrieved by the assignment retrieval unit to a resource element with a highest total value totalled by the totalling unit; and a control unit for repeatedly activating the assignment retrieval unit until every assignment has been assigned.

By means of this construction, the assignment to be assigned is assigned to the already assigned resource element which has a highest profit value, so that in the process assigning assignments to resource elements, a precise judgement of the state of resource elements for a particular assignment can be made. This results in a decrease in the number of transfer instructions between the memory and registers and between different registers, so that improvements in the program size and execution time of the object machine language program can be made. When performing resource assigning for a target machine equipped with only a limited number of registers, the improvements in program size and execution time of the object machine language program are especially remarkable.

Also, the resource assigning apparatus may further include: a first non-interfering non-continuous assigned assignment determination unit for determining assignments whose live range is not continuous with a live range of an assignment retrieved by the assignment retrieval unit nor interferes with the live range of the assignment retrieved by the assignment retrieval unit, out of the assigned assignments detected by the assignment-resource element detection unit; a profit continuation unassigned assignment determination unit for detecting an assignment whose live range is continuous with a live range of the assignment retrieved by the assignment retrieval unit and which is an unassigned assignment whose live range interferes with a live range of the assignment determined by the first non-interfering non-continuous assigned assignment determination unit; a second profit/loss value calculation unit for calculating a profit/loss value of a resource element assigned an assigned assignment detected by the first non-interfering non-continuous assigned assignment determination unit, based on an extent of live range length from an unassigned assignment detected by the profit continuation unassigned assignment determination unit to the assignment retrieved by the assignment retrieval unit; and a first subtraction unit for subtracting a profit/loss value calculated by the second profit/loss value calculation unit from the profit/loss value for an appropriate resource element totalled by the totalling unit, wherein the second assigning unit may assign the assignment retrieved by the assignment retrieval unit to a resource element with a highest profit/loss value after a profit/loss calculated by the second profit/loss value has been subtracted by the first subtraction unit.

By means of this construction, reducing the profit/loss values enables a lower evaluation of resource elements which have been assigned assignments which are positioned so as to generate a loss for the assignment to be assigned. As a result, the assigning state of the surrounding assignments is made to influence the next resource assigning to be executed, which results in a greater reduction in the number of transfer reductions.

Also, the resource assigning apparatus may further include: an interfering assignment continuation assigned assignment determination unit for determining assignments whose live range is continuous with an assignment retrieved by the following assignment interfering assignment detection unit, out of assigned assignments detected by the assignment-resource element detection unit; a third profit/loss calculation unit for calculating a profit/loss value of a resource element assigned an assigned assignment determined by the interfering assignment continuation assigned assignment determination unit, based on an extent of live range length from an assigned assignment detected by the interfering assignment continuation assigned assignment determination unit to an assignment detected by the following assignment interfering assignment detection unit; and a second subtraction unit for subtracting a profit/loss value calculated by the third profit/loss value calculation unit from the profit/loss value for an appropriate resource element totalled by the totalling unit, wherein the second assigning unit may assign the assignment retrieved by the assignment retrieval unit to a resource element with a highest total value after a profit/loss calculated by the third profit/loss value has been subtracted by the second subtraction unit.

By means of this construction, reducing the profit/loss values enables a lower evaluation of resource elements which have been assigned assignments which are positioned so as to generate a loss for the assignment to be assigned. As a result, the assigning state of the surrounding assignments is made to influence the next resource assigning to be executed, which results in a greater reduction in the number of transfer reductions.

Also, the resource assigning apparatus may include: a second non-interfering non-continuous assigned assignment determination unit for determining assignments whose live range is not continuous with a live range of an assignment detected by the following assignment interfering assignment detection unit nor interferes with the live range of the assignment detected by the following assignment interfering assignment detection unit, out of the assigned assignments detected by the assignment-resource element detection unit; an interfering assignment continuation unassigned assignment determination unit for determining assignments whose live range is continuous with a live range of an assignment detected by the following assignment interfering assignment detection unit and which are unassigned assignments whose live range interferes with a live range of an assigned assignment determined by the second non-interfering non-continuous assigned assignment determination unit; a fourth profit/loss calculation unit for calculating a profit/loss value of a resource element assigned an assigned assignment determined by the second non-interfering non-continuous assigned assignment determination unit, based on an extent of live range length from an assignment determined by the interfering assignment continuation unassigned assignment determination unit to an assignment detected by the following assignment interfering assignment detection unit; and first addition unit for adding a profit/loss value calculated by the fourth profit/loss value calculation unit from the profit/loss value for an appropriate resource element totalled by the totalling unit, wherein the second assigning unit may assign the assignment retrieved by the assignment retrieval unit to a resource element with a highest total value after a profit/loss calculated by the fourth profit/loss value has been added by the second addition unit.

By means of this construction, increasing the profit/loss values enables a higher evaluation of resource elements which have been assigned assignments which are positioned so as to generate a profit for the assignment to be assigned. As a result, the assigning state of the surrounding assignments is made to influence the next resource assigning to be executed, which results in a greater reduction in the number of transfer reductions.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIGS. 3A, 3B and 3C are figures showing the operational process of the compiler;

FIGS. 6A, 6B, 6C, 6D, 6E, 6F, 6G, 6H, and 6I are drawings showing the progression of the graph degeneration of the interference graph;

FIG. 7 is a drawing showing the problems caused by combining vertices;

FIG. 24 is a figure showing an example of the stored content of the assignment storage unit 21;

FIG. 25 is also a figure showing an example of the stored content of the assignment storage unit 21;

FIG. 26A is a figure showing an example of the transition of the stored content of the assigning status table;

FIG. 26B is a figure showing an example of the stored content of the assigning candidate resource element storage unit 31;

FIG. 27A shows an example of the calculated cost table;

FIG. 27B shows an example of the transition in the use cost storage unit 35;

FIG. 28A is a figure showing an example of a transition in the stored content of the profit storage unit 37;

FIG. 28B is a figure showing an example of a transition in the stored content of the profit/loss storage unit 56;

FIG. 28C is a figure showing an example of a transition in the stored content of the tracker storage unit 52;

FIG. 29A is a figure showing an example of a transition in the stored content of the processed assignment storage unit 53;

FIG. 29B is a figure showing an example of a transition in the stored content of the preset loss assignment storage unit 54;

FIG. 29C is a figure showing an example of a transition in the stored content of interfering assignment storage unit 55;

FIG. 30A is a figure showing an example of a transition in the stored content of resource classified cost storage unit 40;

FIG. 30B is a figure showing an example of a transition in the stored content of resource classified total cost storage unit 505;

FIG. 30C is a figure showing an example of the transition in the stored content of the tracker storage unit 504;

FIG. 32 is a figure showing an example of a program written in a high-level language;

DESCRIPTION OF THE PREFERRED EMBODIMENT

First, an explanation of several of the expressions to be used in the embodiment will be made.

Loop-nesting depth level

Figure 33:
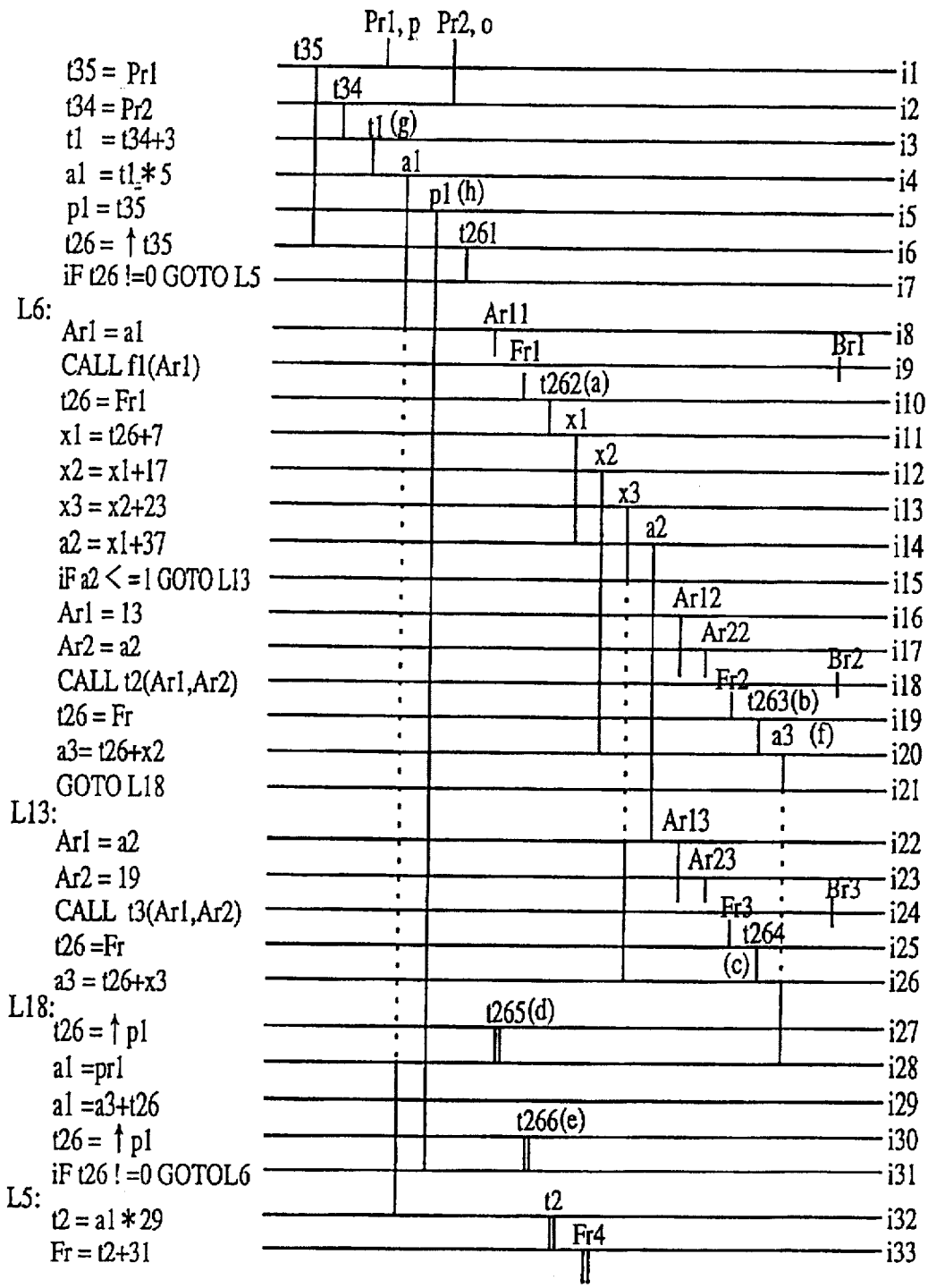
FIG. 33 is a figure showing the intermediate code corresponding to the example program and the live ranges of the assignments.

Loop-nesting depth level refers to the depth of the loop-nesting level of a loop, so the loop-nesting depth level of an intermediate instruction means the nesting level of the loop present in the intermediate instruction. As one example, the loop-nesting depth level of the intermediate instruction i1 in FIG. 33 is 1. As another example, the loop-nesting depth level of the intermediate instruction i8 is 2 since it is the jump destination of intermediate instruction i31.

Multiple Resource

This refers to a resource such as memory which compared to other resources has a great number of resource elements, and therefore shows a resource which does not exert a great influence on the generated code no matter which resource elements are assigned assignments.

Assigning Resource

A group of resource elements or a multiple resource to which an assignment can be assigned. Normally, one assignment is assigned to one assigning resource, but, as was described above, since one resource is a group of resource elements which fulfill a same purpose, when an assignment is assigned to a multiple resource R, this means that the assignment will be assigned to any one of the resource elements belonging to R.

Resource Element (broad definition)

This refers to elements in a resource. Unless specified, this broad definition of resource element is used throughout.

Resource Succession Relations

Resource succession relations refers to when an assignment can succeed another in being assigned to a resource element. Here, a successor assignment can be assigned to the same resource element as the previously assigned assignment, which leads to a reduction in the transfer instructions generated by the code generation device. Additionally, resource elements which have been assigned can be opened to other assignments in this way. This kind of resource succession relations are shown in the program by the continuation of live ranges. In other words, if the intermediate instruction s1 is at the end point of the live range of the assignment y and this intermediate instruction s1 is at the start point of the live range of the assignment x, then it can be seen that assignments x and y exhibit resource succession relations. However, if there is coincidence between a start point and an end point but it is clearly impossible to reduce the generation of transfer requests by assigning both to the same resource element, this is not considered a resource succession relation.

For example, if the intermediate instruction s1: x=y is the start point of the live range of the assignment x and the end point of the live range of the assignment y and the assignments x and y are assigned to the same resource element, then a transfer instruction from y to x will be unnecessary. Accordingly, assignment x and assignment y exhibit resource succession relations.

Here, if the target machine has a microprocessor of 2-address format, then when storing the results of calculations as operands (when the operation result is stored in the operand from which subtraction is performed in a subtraction operation for the target machine), for the intermediate instruction s2: z=x−w, the start point of the live range of assignment z is intermediate instruction s2, so that when the end point of the live range of assignment x is intermediate instruction s2, assignments x and z exhibit resource succession relations. Accordingly, the assigning of assignments x and z to the same resource element will result in the avoidance of an unnecessary transfer instruction. However, when intermediate instruction s2 is also the end point of the live range of assignment w, the assigning of z to the same resource element as assignment w will on the other hand increase the number of transfer instructions so that assignment z and assignment w do not exhibit resource succession relations.

Here, when assignments A and $A_1$, assignments $A_1$ and $A_2$, ...., assignments $A_{n-2}$ and $A_{n-1}$, and assignments $A_{n-1}$ and $A_n$ all exhibit resource succession relations, then assignments A and $A_n$ are said to exhibit indirect resource succession relations. For the example above, in intermediate instructions s1 and s2, assignments y and z can be seen to have indirect resource succession relations via assignment x.

Use Cost Value

The use cost value, for an example when the assignment x is to be assigned, is a value which shows how the code size and execution time of the intermediate instructions are affected when assignment x is assigned to each of the various resources. The relationship between intermediate instructions and use cost values will be explained with reference to the use cost calculation examples shown in FIGS. 19 and 20.

Figure 19:
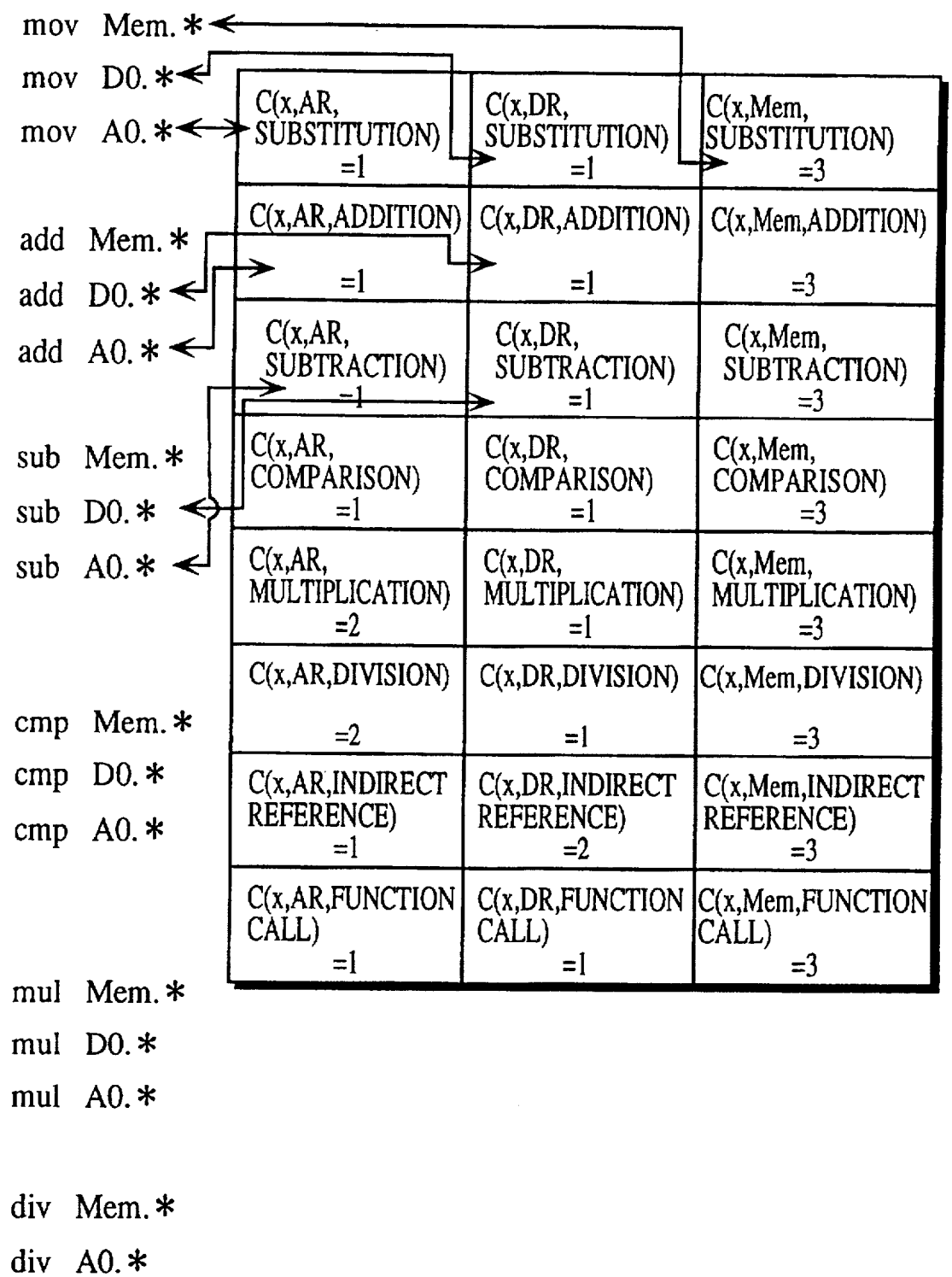
FIG. 19 is a figure showing the resources corresponded with their costs.

FIG. 19 shows the increase or decrease in code size or execution time of the machine language instructions which have the assignments as their operands when the resource elements of each of the resources are assigned the assignments.

Expressions such as [C(x,AR,INDIRECT REFERENCE) =1], [C(x,DR,INDIRECT REFERENCE)=2], [C(x,Mem. INDIRECT REFERENCE)=3] are shown in this figure. These expressions show which resource is to be used in the machine language instructions which execute the instruction called INDIRECT REFERENCE.

[C(x,AR,INDIRECT REFERENCE)=1] shows that when an instruction for indirect reference to the address register is executed, [1] will be added to the necessary memory size or to the execution time.

[C(x,DR,INDIRECT REFERENCE)=2] shows that when an instruction for indirect reference to the data register is executed, [2] will be added to the necessary memory size or to the execution time.

[C(x,Mem,INDIRECT REFERENCE)=3] shows that when an instruction for indirect reference to the memory is executed, [3] will be added to the necessary memory size or to the execution time.

Additionally, [C(x,Mem,ADDITION)=3] shows that when an instruction for addition is executed using the memory, [3] will be added to the necessary memory size or to the execution time.

In the same way, [C(x,Mem,SUBTRACTION)=3] shows that when an instruction for subtraction is executed using the memory, [3] will be added to the necessary memory size or to the execution time.

Figure 20:
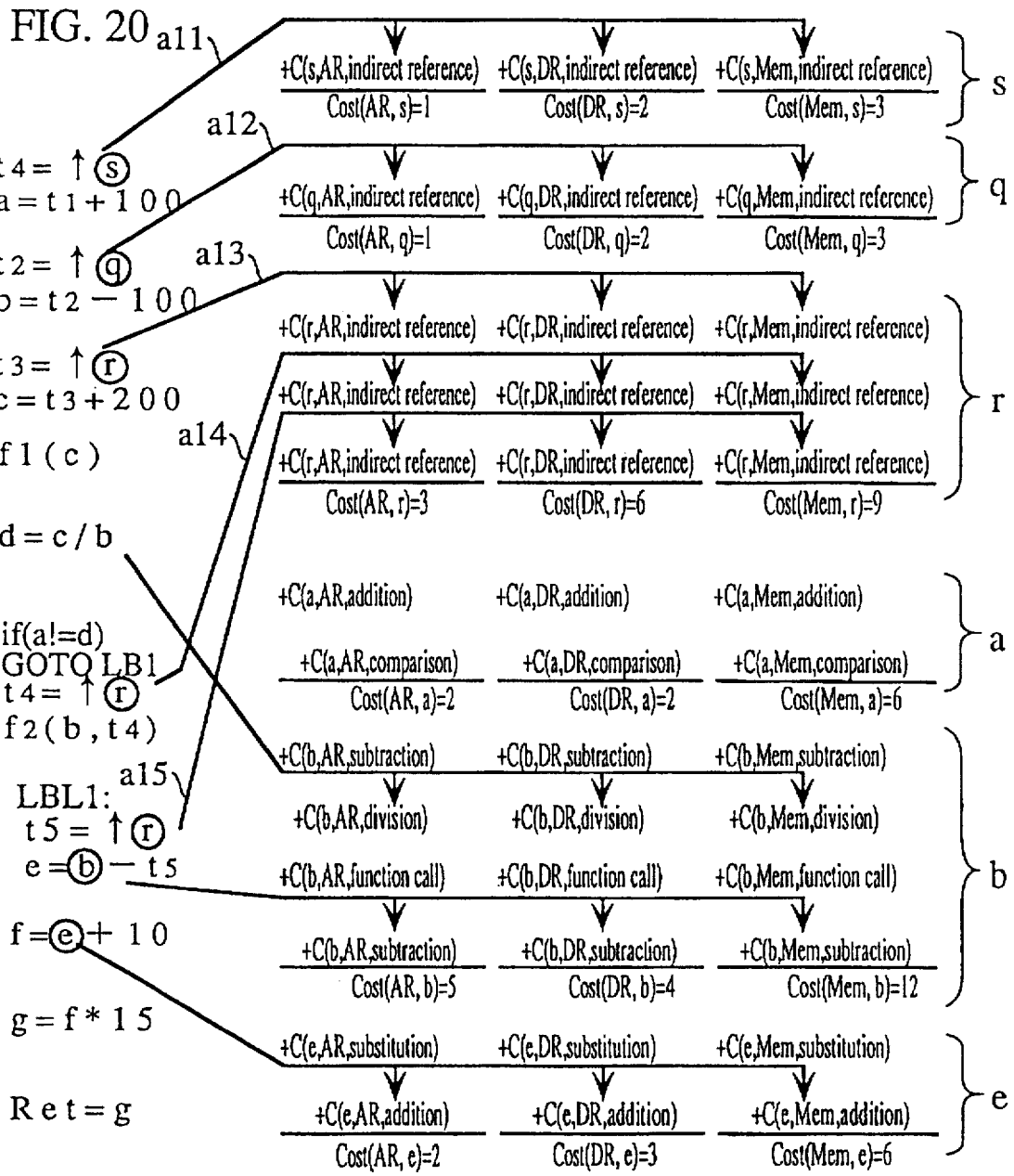
FIG. 20 is a figure showing the definition of assignments and the change in cost of intermediate instructions in which assignments are used when assignments are assigned to the resource elements of different resources.

The left side of FIG. 20 shows an example intermediate program. Several assignments in this program have been circled and arrows have been added originating from these circled assignments. In the drawing, arrow a11 (a-eleven) originates at assignment s and splits up indicating three positions. These positions [C(s,AR,INDIRECT REFERENCE)], [C(s,DR,INDIRECT REFERENCE)], [C(s,Mem,INDIRECT REFERENCE)] show indirect reference instructions which use assignment s. Below these, the totals of the use cost values for assignment s are shown as [Cost(AR,s)=1], [Cost(DR,s)=2] and [Cost(Mem,s)=3]. This is to say, when assignment s is assigned to the resource AR, the use cost value is [1], when assignment s is assigned to the resource DR, the use cost value is [2], and, when assignment s is assigned to memory, the use cost value is [3].

Additionally, the assignment r is present in 3 places in the example program, with each being circled. The arrows a13, a14, a15 originate at these assignments. Each of the arrows splits up indicating the following three positions each [C(r, AR,INDIRECT REFERENCE)], [C(r,DR,INDIRECT REFERENCE)], [C(r,Mem,INDIRECT REFERENCE)], but, since this assignment appears 3 times within the program, the evaluation is shown as being made for these 3 places together. The total use cost values for these 3 positions are [C(r,AR)=3], [C(r,DR)=6], [C(r,Mem)=9].

In the process described above, the calculation of the totals of the use cost values is executed as shown by the arrows a11, a12, a13 etc., and the use cost values for all of the assignments with regard to each of the 3 resources are obtained as shown in the table at the bottom of FIG. 20. These totals are parameters which show the suitability or unsuitability of each resource for an assignment, with the lower the value, the more suitable the resource for the assignment. There is however the drawback that since this use cost is measured in terms of code size and execution time, a same value can only be achieved for any of the data registers D0–D2 and any of the address registers A0–A2, so that this is only an approximate calculation.

Profit/Loss Values

Profit/loss values are values which show how the assignments already assigned to resource elements affect the assignments which are to be assigned. Accordingly, these profit/loss values are already set for each of the resource elements. The profit/loss values which are totaled for individual resource elements are called profit values.

Figure 21:
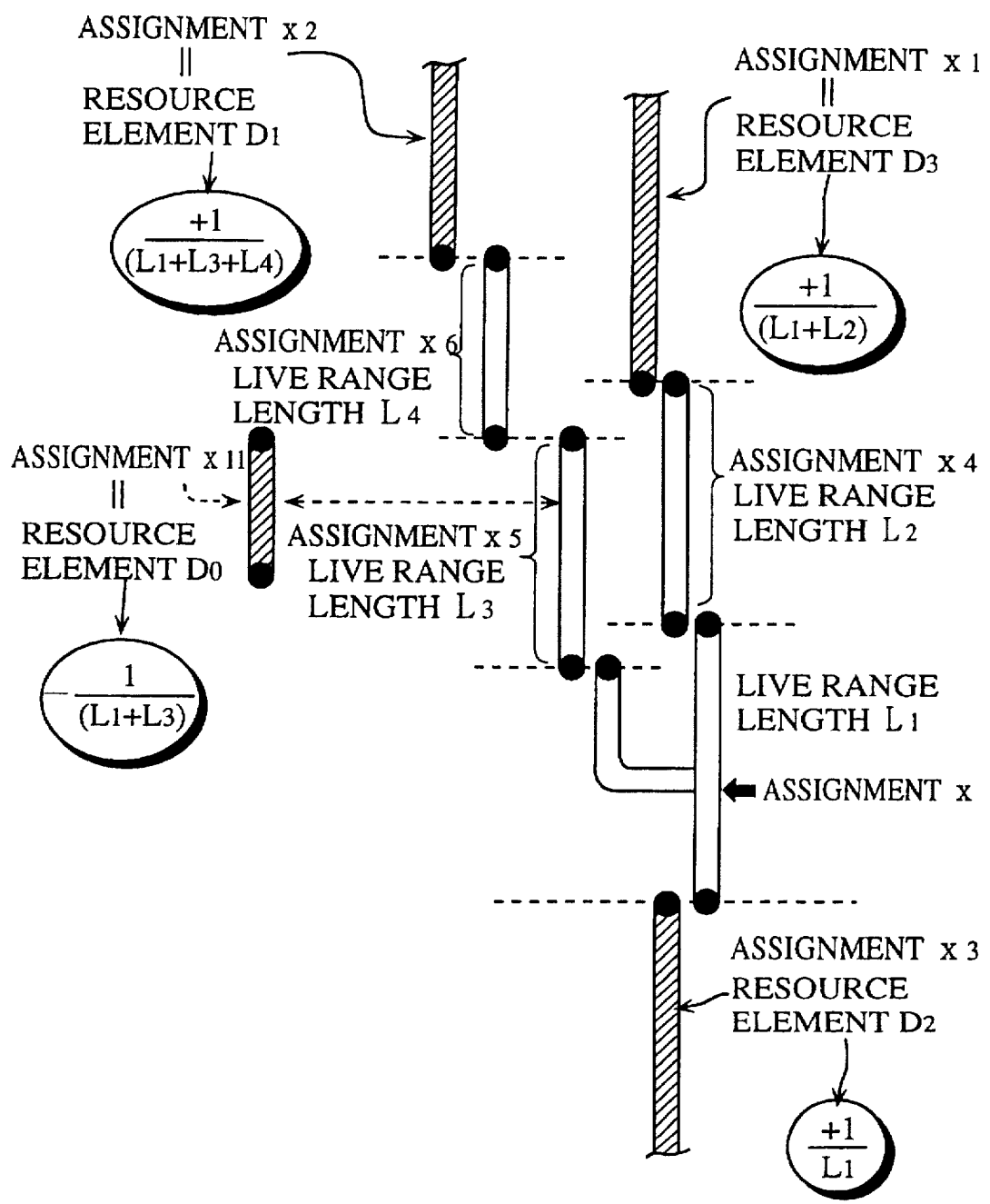
FIG. 21 is a figure showing how the profit/loss values of assigned assignments change.

The following is an explanation with reference to FIG. 21 of these profit/loss values for resource elements which have been assigned. FIG. 21 shows the profit/loss values for each resource element by showing the profit factors processed in the calculation. Note that assignment x has a priority level which makes it next in order to be assigned (this is what is meant without further qualification by assignment x in the following explanation).

In this drawing, the thick white lines show the live ranges of the assignments which are yet to be assigned while the shaded lines show the assignments which have already been assigned. Black dots have been used to show the start and end points of these live ranges. In the drawing, broken lines have been drawn level with these black dots, and these show where there is coherence between the end point of a live range and the start point of another, so that the assignments which have their start/end points connected by these broken lines can be said to exhibit resource succession relations. Character strings, such as [assignment x1], [assignment x2], [assignment x11], showing assignment names, have been added to the vertical lines showing the live ranges. For the assignments which have already been assigned, characters strings have been added directly below the character strings showing the names of the resource elements to which they have been assigned. These resource element names have been connected by arrows to circles containing the expressions [+1/L1], [+1/(L1+L2)], and [+1(L1+L3+L4)] which show the profit/loss values for those resource elements.

In this figure, the character string [resource element D2] is shown joined to the expression [+1/L1], which shows that the profit/loss value for the resource element D2 to which the assignment x3 is assigned is [+1/L1].

Similarly, the character string [resource element D3] is shown joined to the expression [+1/(L1+L2)], which shows that the profit/loss value for the resource element D3 to which the assignment x1 is assigned is [+1/(L1+L2)]. The reason the profit/loss value is such is that between the live range of the assignment x1 and that of the assignment x there is a live range difference of length L2, and that such live range lengths are reflected in the profit/loss value.

Also, the character string [resource element D1] is shown joined to the expression [+1/(L1+L3+L4)], which shows that the profit/loss value for the resource element D1 to which the assignment x2 is assigned is [+1/(L1+L3+L4)]. The reason the profit/loss value is such is that between the live range of the assignment x2 and that of the assignment x there is a live range difference of length L3 and another of length L4, and that such live range lengths are reflected in the profit/loss value.

On the other hand, in the present figure the vertical line showing the assignment x11 has a portion which overlaps the assignment with the live range L3, so that it can be seen that assignment x11 and the assignment x5 with the live range L3 interfere with one another.

Below to the left of assignment x11, the expression [−1/(L1+L3)] has been added to show the profit/loss value of the resource element D0 to which assignment x11 has been assigned. The reason the profit/loss value is such is that between the live range of assignment x11 and that of assignment x there is a live range difference of length L3, and that such live range lengths are reflected in the profit/loss value.

It should be noted here that the reason the profit/loss value [−1/(L1+L3)] has a negative sign while the profit/loss values [+1/(L1+L2)], [+1/(L1+L3+L4)] have positive signs is as explained below.

The reason profit/loss value [+1/(L1+L2)] is given to the resource element D3 is that an assignment (assignment x1) has already been assigned which allows a reduction in transfer instructions when assignment x is assigned, and the reason profit/loss value [+1/(L1+L3+L4)] is given to the resource element D1 is that an assignment (assignment x2) has been assigned which allows a reduction in transfer instructions when assignment x is assigned, while the reason profit/loss value [−1/(L1+L3)] is given to the resource element D0 is that it has been assigned an assignment (x11) which requires a generation of transfer instructions when assignment x is assigned.

The denominator of these profit/loss values is a total length of live ranges with assignment x as the cardinal point, with it being possible to set the live range length L1 as simply "1".

As can be seen from the above explanation, the closer the assignment assigned to a resource element is to assignment x, the larger the profit/loss value and the further the assignment assigned to a resource element is from assignment x, the smaller the profit/loss value. This is because the assignment which is next to be assigned is more affected by nearby assignments which have already been assigned. As explained above, in calculating the use cost values it is difficult to establish the advantages and disadvantages between resources having the same functions such as the data registers D0, D1, D2 and the address registers A0, A1 and A2. However, the profit/loss values affect which of the data registers D0, D1, D2 is first to be assigned. Even when all have been assigned, the profit/loss values will show the advantages and disadvantages of the data registers D0, D1, D2 according to proximity of assigned assignments to assignment x.

Looking from the perspective of assignments which have been assigned, these assignments can affect the assigning of following assignments which are close to them. This means assignments which have been assigned can allow the allocation of proximate assignments to the same resource element. In the present embodiment, assignments are assigned to resource elements in order of assigning priority levels which reflect loop-nesting depth levels and frequency of use, so that combinations of these assigning priority levels and profit/loss values can be used to obtain a "smart" assigning of assignments so that assignments with deep loop-nesting depth levels are assigned to registers and that assignments with progressively shallower loop-nesting depth levels are distributed among the assigned registers. In the same way, a "smart" assigning of assignments whereby assignments whose frequency of use is high are assigned to registers while assignments with progressively lower frequencies of use are distributed among the assigned registers can be achieved. Furthermore, argument registers, the broken registers and the return values registers can have the assignments assigned to them decided in advance by the operator with the remaining assignments spreading out from this base as another kind of "smart" assigning.

The above explanation deals with the case of assignment x and already assigned assignments whose live ranges follow after one another, although even should the live ranges all run one after the other, there will still be losses. This is because of interference between assignment x and the previous assigning of an assignment with a live range which interferes with it, with it being necessary to avoid such kinds of assigning. In the same way, the case where a number of resource elements are assigned on an extension line from the live range of an interfering assignment should also be avoided. For unavoidable cases, it is necessary to execute assigning so as to minimize the loss. The profit/loss values here are used to estimate these losses in fixed quantities.

Figure 22:
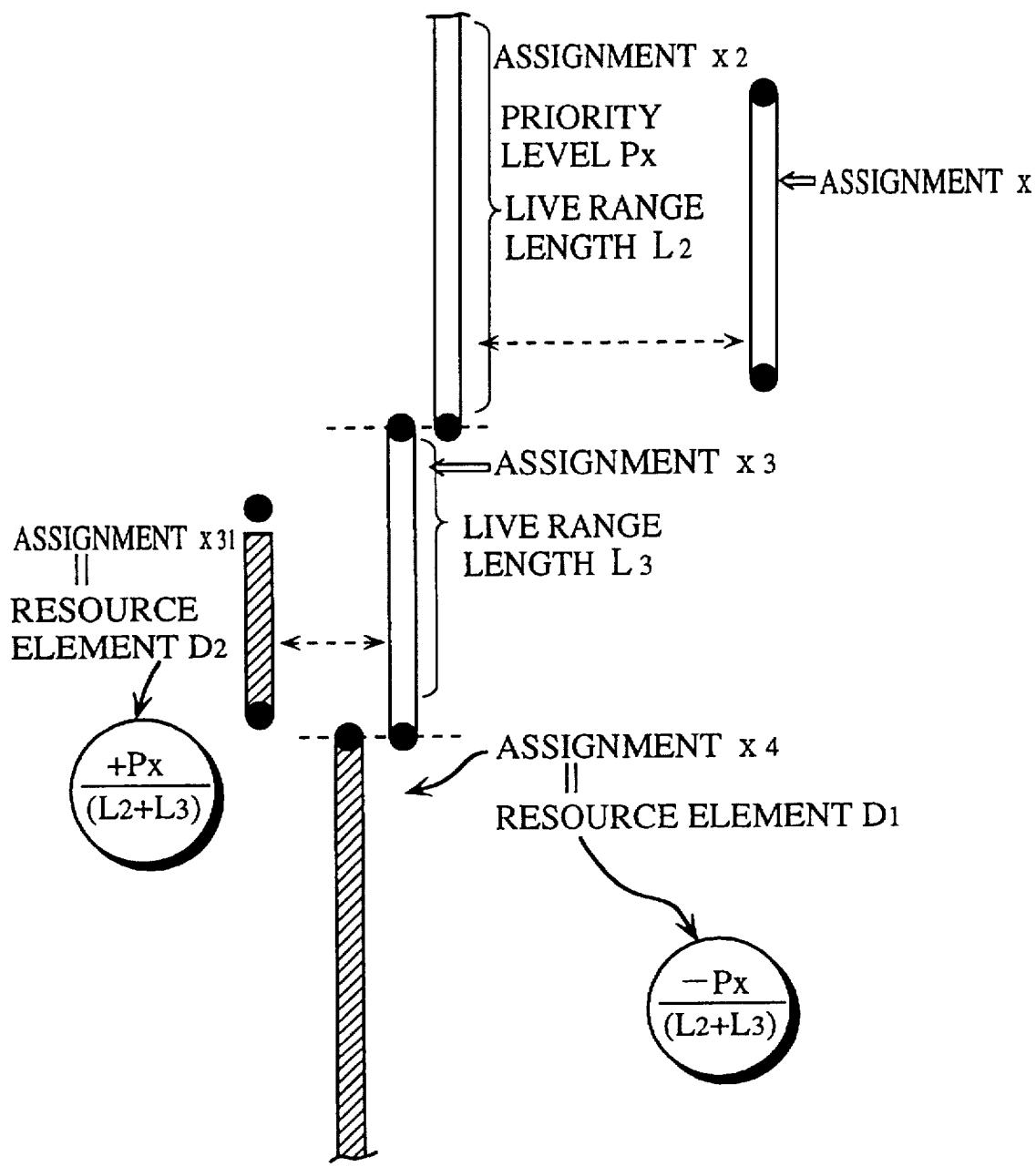
FIG. 22 is also a figure showing how the profit/loss values of assigned assignments change.

The following is an explanation of when the profit/loss values are used to estimate losses, with reference to FIG. 22. In FIG. 22, the thick white lines show the live ranges of the assignments which are yet to be assigned while the shaded lines show the assignments which have already been assigned. Black dots have been used to show the start and end points of these live ranges. In the drawing, broken lines have been drawn level with these black dots, and these show where there is a coherence between the end point of a live range and the start point of another, so that the assignments which have their start/end points connected by these broken lines can be said to exhibit resource succession relations. Character strings, such as [assignment x2], [assignment x3], [assignment x4], showing the assignment names, have been added to the vertical lines showing the live ranges.

For the assignments which have already been assigned, characters strings have been added directly below the character strings showing the names of the resource elements to which they have been assigned. These resource element names have been connected by arrows to circles containing the expressions [+Px/(L2+L3)] and [−Px/(L2+L3)] which show the profit/loss values for those resource elements.

In this figure, the character string [resource element D1] is shown joined to the expression [−Px/(L2+L3)], which shows that the profit/loss value for the resource element D1 to which assignment x4 is assigned is the value [−Px/(L2+L3)] which features a minus sign, meaning that this profit/loss value [−Px/(L2+L3)] indicates a loss. The reason the profit/loss value is such is that between the live range of assignment x4 and that of assignment x2 which interferes with the live range of assignment x there is a live range difference of length L2plus length L3, and that such live range lengths are reflected in the profit/loss value.

On the other hand, in the present figure the vertical line showing assignment x31 has an portion which overlaps assignment x3 which has the live range L3, so that it can be seen that assignment x31 and assignment x3 interfere with one another.

The character string [+Px/(L2+L3)] has been added below and to the left of the vertical line representing assignment x31 which shows that the profit/loss value of the resource element D2 to which assignment x31 is assigned is [+Px/(L2+L3)]. This value reflects that between the live range of assignment x31 and the live range of assignment x2, which interferes with the live range of assignment x, there are live ranges of lengths L2and L3.

It should be noted here that in the same figure, a profit/loss value [−Px/(L2+L3)] which has a negative sign and a profit/loss value [+Px/(L2+L3)] which has a positive sign are present, with the reasons for these positive and negative values being explained below.

When assignment x is assigned to the resource element D2 which has the profit/loss value [+Px/(L2+L3)], an assignment (assignment x31) which can reduce the number of transfer instructions is assigned, while when assignment x is assigned to the resource element D1 which has the profit/loss value [−Px/(L2+L3)], an assignment (assignment x4) which generates transfer instructions is assigned. Here, the denominator of the profit/loss values is a total length of live ranges with assignment x2 as the cardinal point, with it being possible to set the live range length L2 as simply "1".

Trackers

Trackers trace the course of resource succession relations and so form information for the calculation of the profit/loss values for each resource element. Accordingly, trackers include information showing the assignments which trace the present resource succession relations in the program (expressed using assignment names), a total length of live range between the live ranges of these assignments and assignment x, and a group of the resource elements which are presently assignable. Since this kind of information is included, in the present embodiment trackers are treated as composition variables, so that the present position information, the total length of live ranges, and the group of assignable resource elements are treated as members of that composition (in the present embodiment, a tracker is set as "A", the assignment at a present tracking position is set as "A.ASO", the total live range length is set as "A.LNS", and the group of resource elements is set as "A.RES").

Lower-Order Cost Value

The lower-order cost value is a value which shows how the code size and the execution time of the intermediate instructions which use assignments of lower priority than assignment x (and so are assigned after assignment x) are affected when assignment x is assigned to resource elements of each of the resources.

Figure 23:
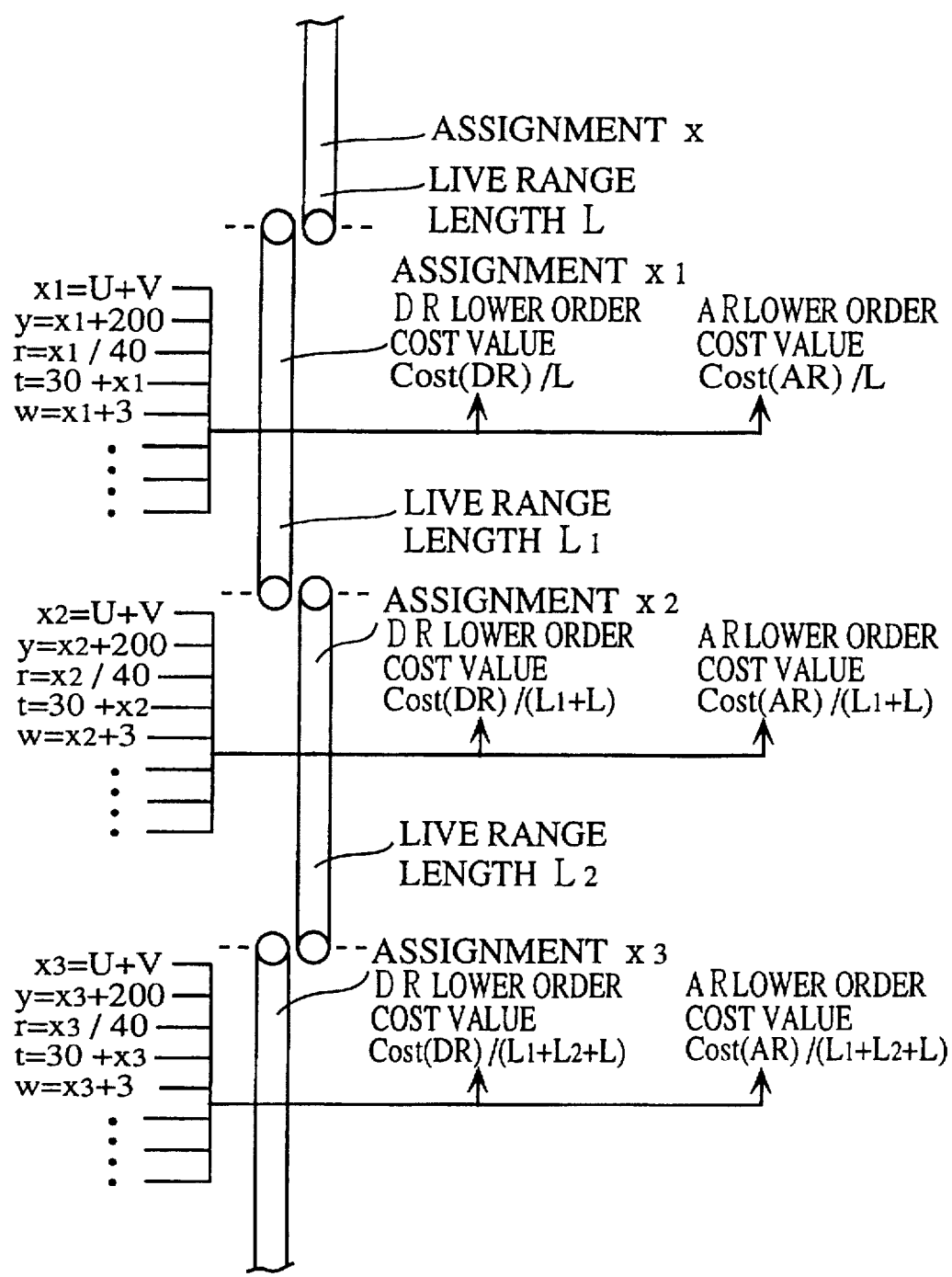
FIG. 23 is a figure showing the what happens to the lower order cost values of the assignments yet to be assigned.

The following is an explanation of the nature of these lower-order cost values for unassigned assignments of lower-order priority rankings with reference to FIG. 23. FIG. 23 is a figure showing the lower-order cost values of the assignments yet to be assigned.

In this figure, the thick white vertical lines show the live ranges of the assignments, with the start and end points of the live ranges being shown by white circles. Some of the white circles in the figure are joined by broken lines, showing coincidence between the start point of a live range and the end point of another, indicating that the live ranges in question exhibit resource succession relations. The various vertical lines have been given character strings such as [assignment x1], [assignment x2] or [assignment x3], showing the names of the assignments. Also, to the left of assignment x1, there is a group of the following intermediate instructions, "x1=U+V", "y=x1+200", "r=x1/40", "t=30+x1" and "w=x1+3". This shows the group of intermediate instructions in the intermediate program which use assignment x1.

Similarly, to the left of assignment x2, there is a group of the following intermediate instructions, "x2=U+V", "y=x2+200", "r=x2/40", "t=30+x2" and "w=x2+3". This shows the group of intermediate instructions in the intermediate program which use assignment x2.

Also, to the left of assignment x3, there is a group of the following intermediate instructions, "x3=U+V", "y=x3+200", "r=x3/40", "t=30+x3" and "w=x3+3". This shows the group of intermediate instructions in the intermediate program which use assignment x3.

In the same figure, the character strings "DR lower-order cost value" and "AR lower-order cost value" have been added below the character string "Assignment x1", with the numerical expressions "Cost(DR)/(L)" and "Cost(AR)/(L)" further being added below these. These numerical expressions show the lower-order cost value of assignment x1 when assignment x1 is assigned to resource elements belonging to the resources called the data register and the address register. Arrows have also been drawn from each of the intermediate instructions, "x1=U+V", "y=x1+200", "r=x1/40", "t=30+x1" and "w=x1+3" in the group of intermediate instructions to the left of assignment x1 to the elements "Cost(DR)" and "Cost(AR)" in the numerical expressions, with the total values of the use cost "Cost(DR)" and "Cost(AR)" in the lower-order cost value equation showing the total use cost value of assignment x1 when it is assigned to a resource element belonging to the data register DR or the address register AR.

In the same figure, the character strings "DR lower-order cost value" and "AR lower-order cost value" have been added below the character string "Assignment x2", with the numerical expressions "Cost(DR)/(L1+L)" and "Cost(AR)/(L1+L)" further being added below these. These numerical expressions show the lower-order cost value of assignment x2 when assignment x2 is assigned to resource elements belonging to the resources called the data register and the address register. Arrows have also been drawn from each of the intermediate instructions "x2=U+V", "y=x2+200", "r=x2/40", "t=30+x2" and "w=x2+3" in the group of intermediate instructions to the left of assignment x2 to the elements "Cost(DR)" and "Cost(AR)" in the numerical expressions, with the total values of the use cost "Cost(DR)" and "Cost(AR)" in the lower-order cost value equation showing the total use cost value of assignment x2 when it is assigned to a resource element belonging to the data register DR or the address register AR. These total values of use cost "Cost(DR)" and "Cost(AR)" are divided by the live range length (L1+L), with this being due to assignment x1 falling in-between assignment x and the assignment x2, with this live range length (L1+L) being reflected in the lower-order cost value.

The character strings "DR lower-order cost value" and "AR lower-order cost value" have also been added below the character string "Assignment x3", with the numerical expressions "Cost(DR)/(L1+L2+L)" and "Cost(AR)/(L1+L2+L)" further being added below these. These numerical expressions show the lower-order cost value of assignment x3 when assignment x3 is assigned to resource elements belonging to the resources called the data register and the address register. Arrows have also been drawn from each of the intermediate instructions, "x3=U+V", "y=x3+200", "r=x3/40", "t=30+x3" and "w=x3+3" in the group of intermediate instructions to the left of assignment x3 to the elements "Cost(DR)" and "Cost(AR)" in the numerical expressions, with the total values of the use cost "Cost(DR)" and "Cost(AR)" in the lower-order cost value equation showing the total use cost value of assignment x3 when it is assigned to a resource element belonging to the data register DR or the address register AR. These total values of use cost "Cost(DR)" and "Cost(AR)" are divided by the live range length (L1+L2+L), with this being due to the assignments x1 and x2 falling in-between assignment x and assignment x3, with this live range length (L1+L2+L) being reflected in the lower-order cost value. It should also be noted here that the denominator of the lower-order cost values is a total length of live ranges with assignment x as the cardinal point, with it being possible to set the live range length L as simply "1".

Figure 1:
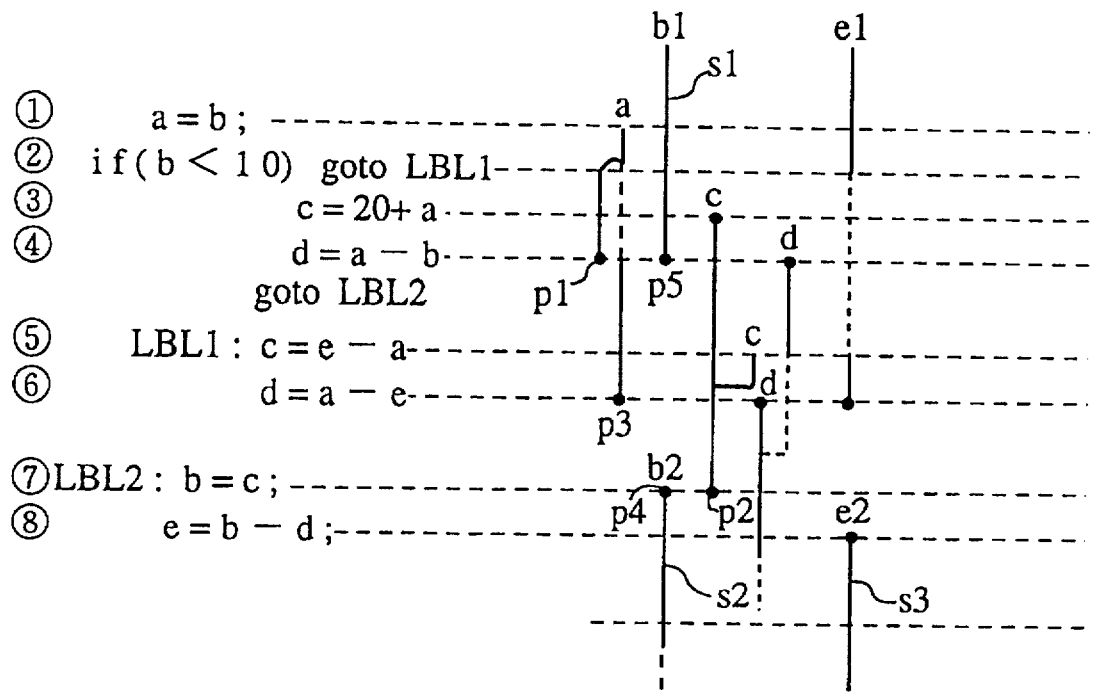
FIG. 1 shows a program and the assignments in the program.
Figure 2:
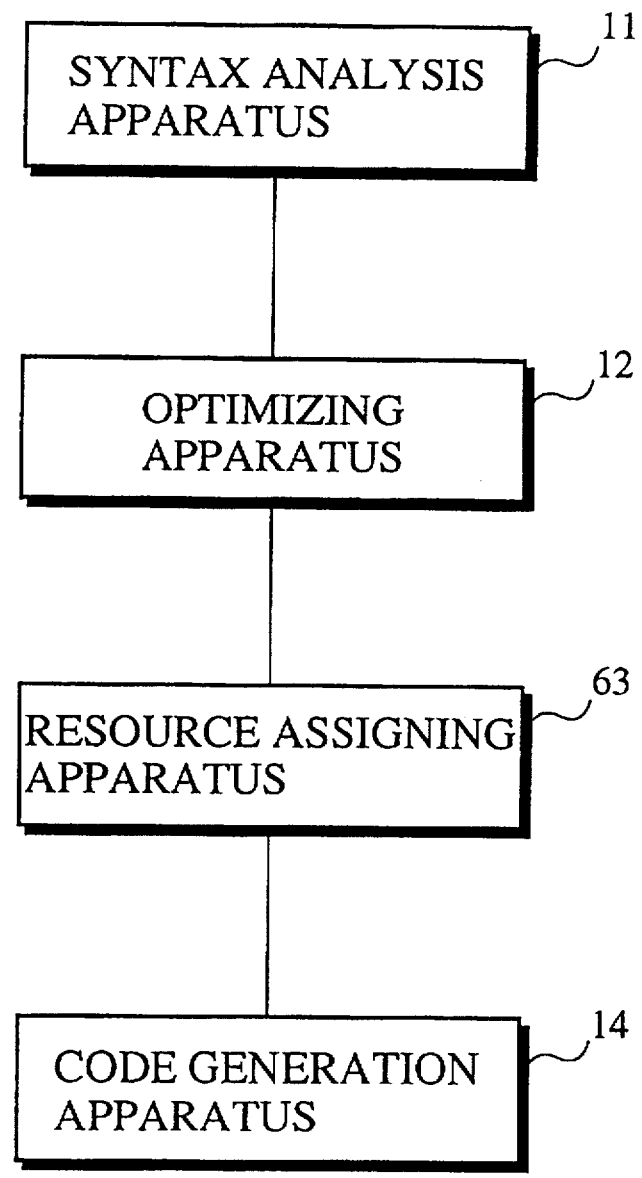
FIG. 2 shows the construction blocks of a compiler.
Figure 4:
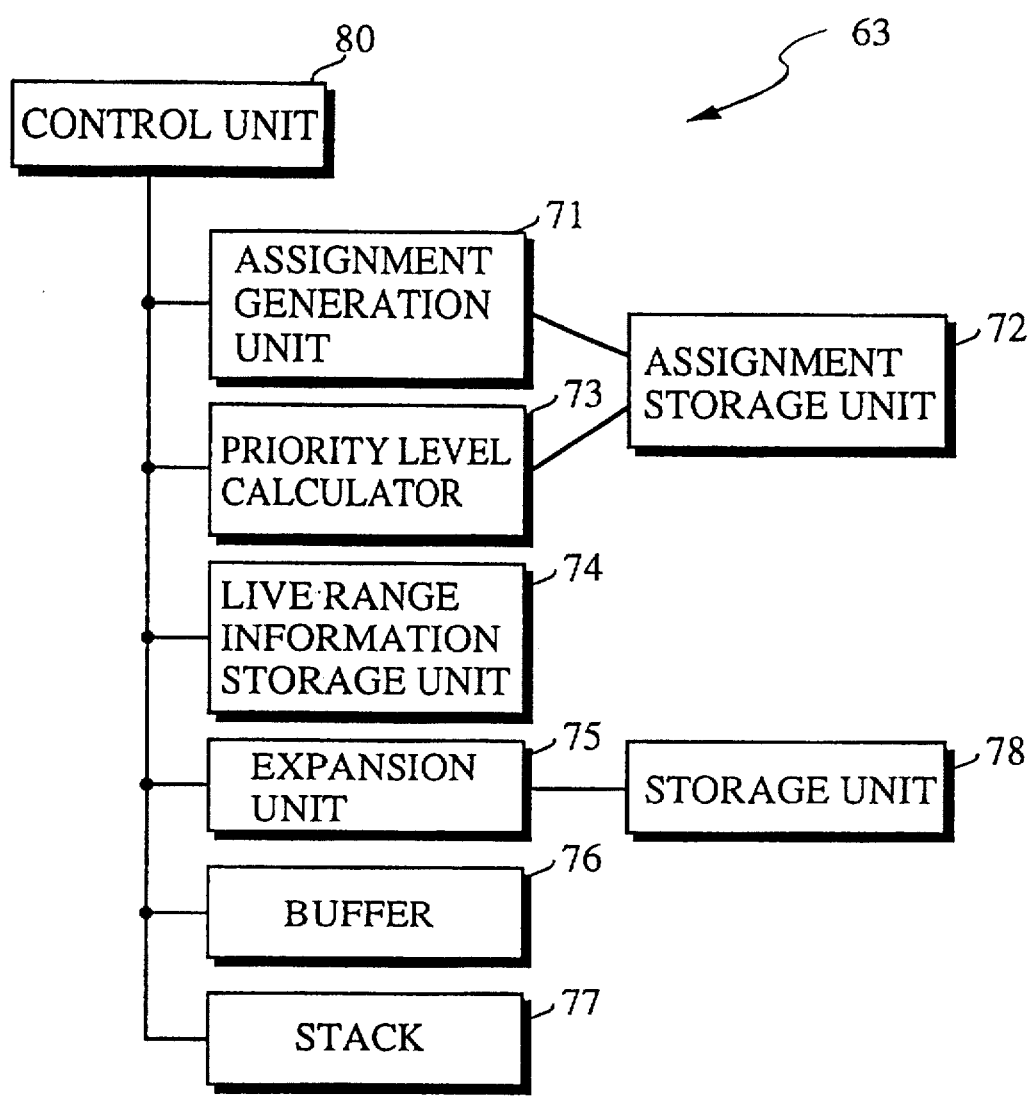
FIG. 4 is a drawing showing the construction blocks of the resource assigning apparatus 63 under the prior art.
Figure 5A:
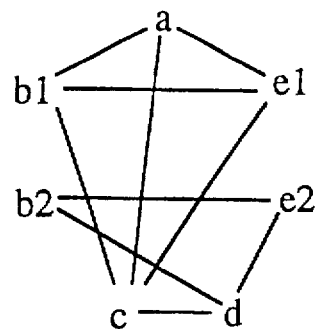
FIGS. 5A and 5B are drawings showing an interference graph and the way the same interference graph is changed by combining the vertices.
Figure 5B:
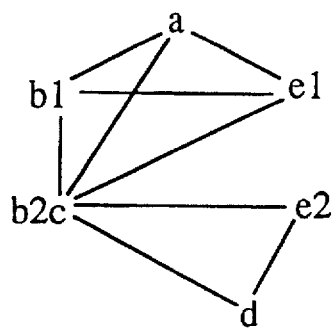
Figure 8:
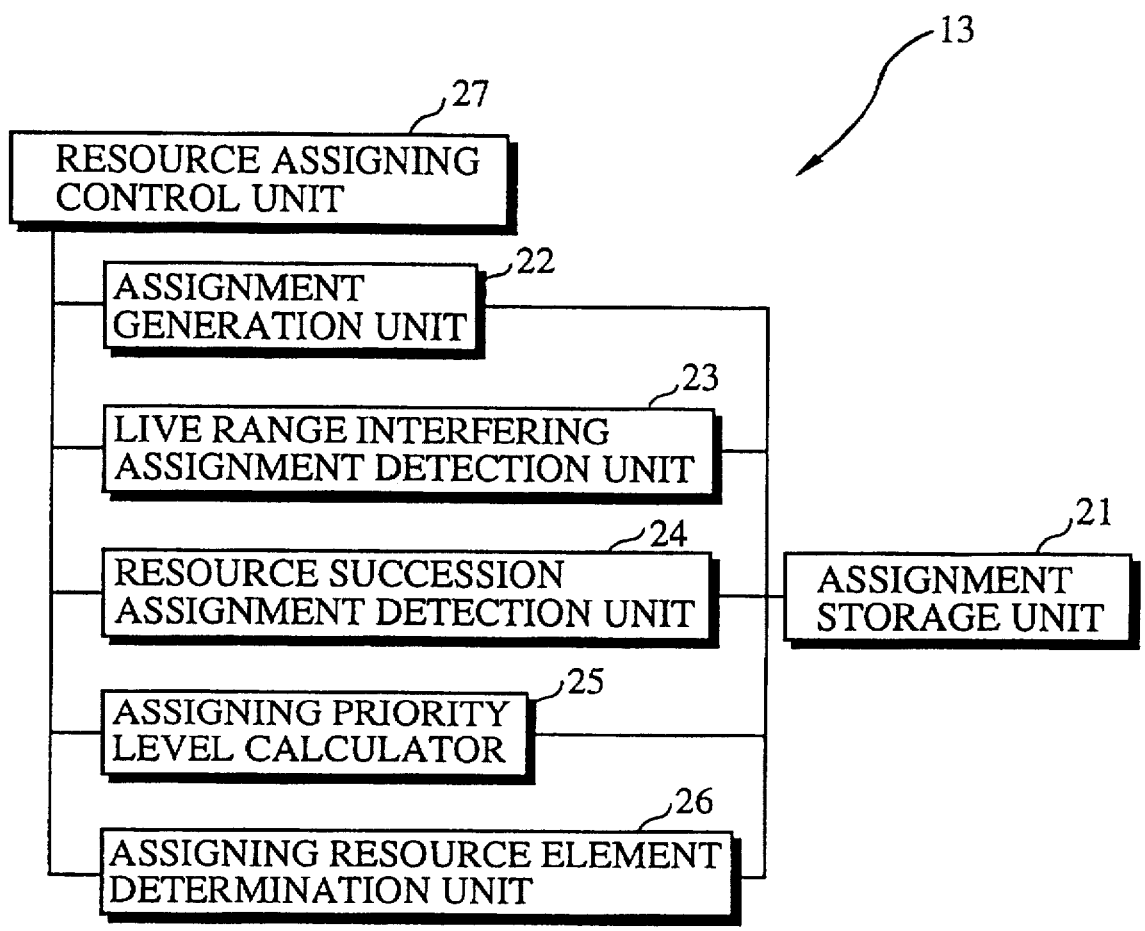
FIG. 8 show the construction blocks of the resource assigning apparatus 13 in the embodiment of the present invention.

Construction of the Resource Assigning Apparatus 13 FIG. 8 shows the construction blocks of the resource assigning apparatus 13. The resource assigning apparatus 13 can be seen to be made up of an assignment storage unit 21, an assignment generation unit 22, a live range interfering assignment detection unit 23, a resource succession assignment detection unit 24, an assigning priority level calculator 25, an assigning resource element determination unit 26 and a resource assigning control unit 27.

The assignment storage unit 21 stores the assignments generated by the assignment generation unit 22 and an assigning information table made up of assignment information, as well as an assigning status table.

Examples of assigning information tables are shown in FIGS. 24 and 25. FIG. 24 shows the assigning information for the assignments assigned to resource elements according to the assigning process described below. It should be noted here that the content of this figure corresponds to the assignments and live ranges in the example intermediate program shown in FIG. 33.

In the assigning information table shown in FIG. 24, n10 is the column showing the assignments whose live ranges are shown in the column n11 as groups of intermediate instructions which cover a certain part of the intermediate program. The lengths of the live ranges are expressed in the n12 column as number of instructions in the groups in the n11 column, while the use intermediate instruction groups given in the n13 column show the intermediate instructions which use each assignment in question. The start point column n14 shows groups of intermediate instructions which form the start point of the live ranges and the end point column n15 shows groups of intermediate instructions which form the end point of the live ranges. The interfering assignment group column n16 shows the groups of intermediate instruc instructions whose live ranges interfere with the live range of the assignment in question, the resource succession assignment group column n17 shows the groups of assignments which have resource succession relations with an assignment in question, and finally the assigning priority column n18 shows the assigning priority of the assignment in question.

In this figure, the expression "i2–i6" to the right of the assignment "t35" shows that the live range of the assignment t35 is expressed by the intermediate instructions i2 to i6 in FIG. 33.

To the right of this, the figure "5" shows the live range length of the assignment t35 and then to the right of this, the entry "i1, i5, i6" shows the intermediate instructions which use assignment t35. In the next two cells, "i1" and "i6" show the start point and end point of the live range of assignment t35, respectively. In the next cell, the entry "t34, t1, a1, p1" is the interfering assignment group which shows the group of assignments which interfere with assignment t35. Next, on the right the entry "Pr1" shows that the assignment "Pr1" exhibits resource succession relations with assignment t35 and the final entry in the row "0.6" shows the assigning priority level of assignment t35. It should be noted here that the intermediate instruction i1 at the start point is not included in the live range shown in column n11, which means that coincidence between an end point of a live range and a start point of a live range is not judged as constituting interference between the two live ranges, so that interference can be determined easily from the intermediate instruction groups for the live ranges. Accordingly, the start points of all assignments are not included in their live ranges.

FIG. 25 shows an example of assigning information for assignments which have already been assigned to resource elements, such as arguments (Ar), return values for functions (Fr) and broken registers (Br).

In the assigning information table shown in FIG. 25, n20 is the column showing the assignments whose live ranges are shown in the column n21 as groups of intermediate instructions which cover a certain part of the intermediate program. The lengths of the live ranges are expressed in the n22 column as number of instructions in the groups in the n21 column, while the use intermediate instruction groups given in the n23 column show the intermediate instructions which use each of the assignments in question. The start point column n24 shows groups of intermediate instructions which form the start point of the live ranges and the end point column n25 shows groups of intermediate instructions which form the end point of the live ranges. The interfering assignment group column n26 shows the groups of intermediate instructions whose live range interferes with the live range of the assignment in question, the resource succession assignment group column n27 shows the groups of assignments which have resource succession relations with an assignment in question, and finally the assigning resource element column n28 shows the resource elements to which the assignment in question can be assigned.

An example of an assigning status table is shown in FIG. 26A. The assigning status table is a list of assignments and columns into which the resource elements to which the assignments are assigned are entered showing how the assigning process proceeds. Here, the content of this figure corresponds to the assignments and live ranges in the example program shown in FIG. 33.

The row marked (a) to the right of the entries shows the assigning status at a point when only the assignment t262 with the highest priority level has been assigned. The next row marked (b) to the right of the entries shows the assigning status at a point when the assignment t263 with the next highest priority level has been assigned. Similarly, the next row marked (c) to the right of the entries shows the assigning status at a point when the assignment t264 with the next highest priority level has been assigned.

The assignment generation unit 22 generates assignments based on a result of data flow analysis (hereinafter, data flow information) and a result of control flow analysis (hereinafter, control flow information). At this point, the live range, the start point and end point of the live range and use intermediate instructions are detected. Furthermore, assignments which need to be assigned before the assigning process shown in FIG. 25 are assigned at this point to resource elements. The assignments generated here are stored in the assignment storage unit 21.

The live range interfering assignment detection unit 23 investigates the interference between the live ranges of assignments. This is to say, the live range interfering assignment detection unit 23 find the assignment group Ov(x) for any arbitrary assignment x which contains assignments whose live range interferes with that of assignment x. The content of Ov(x) is then stored in the assignment storage unit 21.

The resource succession assignment detection unit 24 detects all of the assignments which exhibit resource succession relations with the assignments stored in the assignment storage unit 21. This is to say, the resource succession assignment detection unit 24 finds the assignment group Rs(x) which is the group of assignments which have resource succession relations with an arbitrary assignment x. The content of Rs(x) is then stored in the assignment storage unit 21.

The following grouping is performed in order to find Rs(x).

Since the assignment storage unit 21 stores every assignment together with the intermediate instruction corresponding to the start point of the live range of each assignment and the intermediate instruction corresponding to the end point of the live range of each assignment, the resource succession assignment detection unit 24 finds every assignment out of the stored assignments whose end point corresponds with the intermediate instruction which corresponds to the start point of the assignment x. It then stores the assignments it finds in the resource succession relations group of assignment x.

The resource succession assignment detection unit 24 then finds every assignment out of the stored assignments whose start point corresponds with the intermediate instruction which corresponds to the end point of the assignment x and stores the assignments it finds in the resource succession relations group of assignment x. By repeating the above processes, the groups Rs(x) for every assignment are found. However, if it is clear that assigning a detected assignment to the same resource element as assignment x will not reduce the number of transfer instructions, it does not store the detected assignment in the same resource succession relations group as assignment x.

The assigning priority level calculator 25 calculates the assigning priority of assignment x stored in the assignment storage unit 21. The assigning priority level is the priority level which shows in what order assignments should be assigned to resource elements. This is calculated according to the equation given below.

Assigning Priority Level=(total loop-nesting depth level of use intermediate instructions of x)/(length of live range of x)

The assigning resource element determination unit 26 assigns the assignments to resource elements based on the content of the assigning information table.

The resource assigning control unit 27 controls all of the assigning processes.

Figure 12:
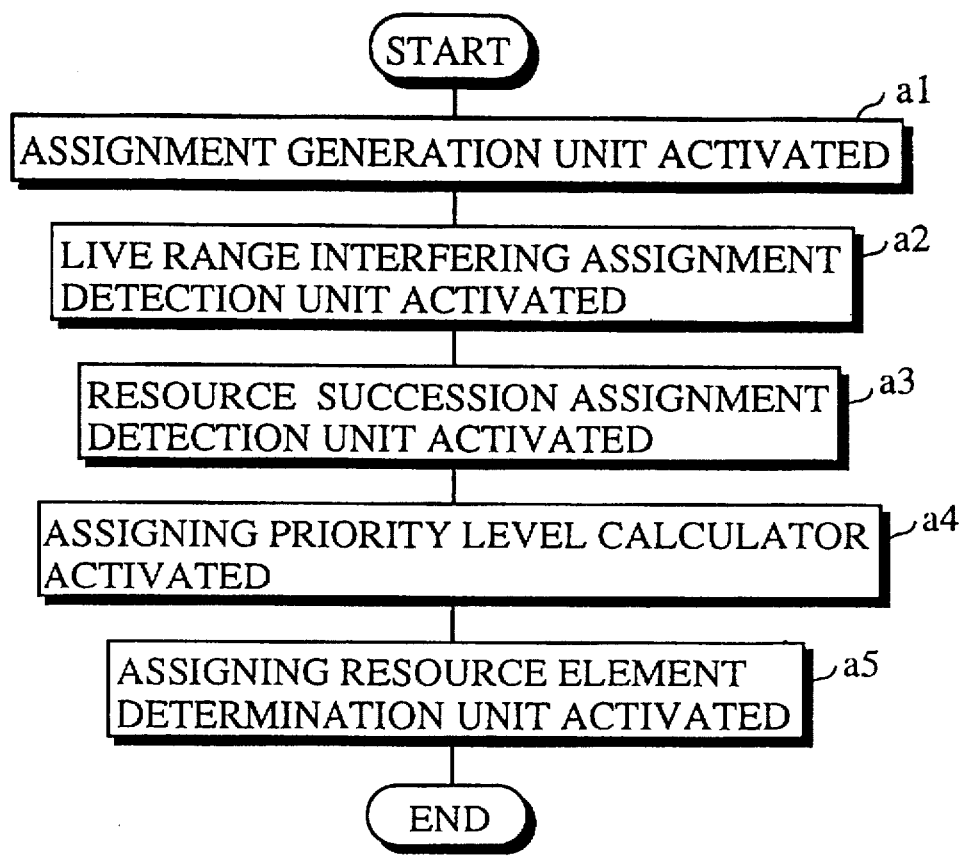
FIG. 12 is a flowchart for the resource assigning control unit 27.

FIG. 12 is a flowchart for the resource assigning control unit 27.

In step a1, the resource assigning control unit 27 activates the assignment generation unit 22.

In step a2, the resource assigning control unit 27 activates the live range interfering assignment detection unit 23.

In step a3, the resource assigning control unit 27 activates the resource succession assignment detection unit 24.

In step a4, the resource assigning control unit 27 activates the assigning priority level calculator 25.

In step a5, the resource assigning control unit 27 activates the assigning resource element determination unit 26.
Construction of the Assigning Resource Element Determination Unit 26 Shown in FIG. 8

The assigning resource element determination unit 26 determines the resource elements to which each assignment is to be assigned based on the stored content of the assigning information table.

Figure 9:
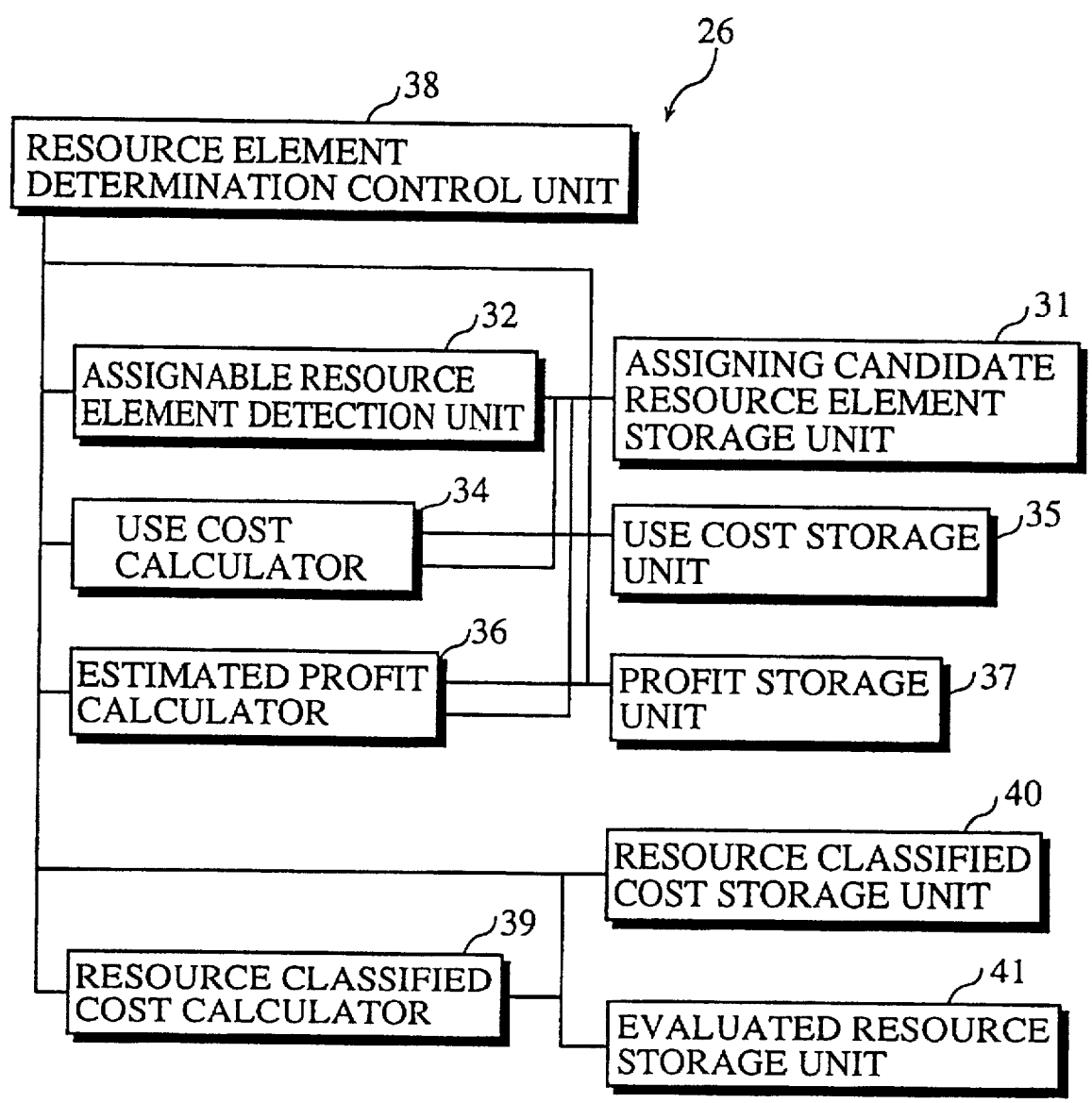
FIG. 9 shows the construction blocks of the assigning resource element determination unit 26.

FIG. 9 shows the construction of the assigning resource element determination unit 26 shown in FIG. 8.

Figure 13:
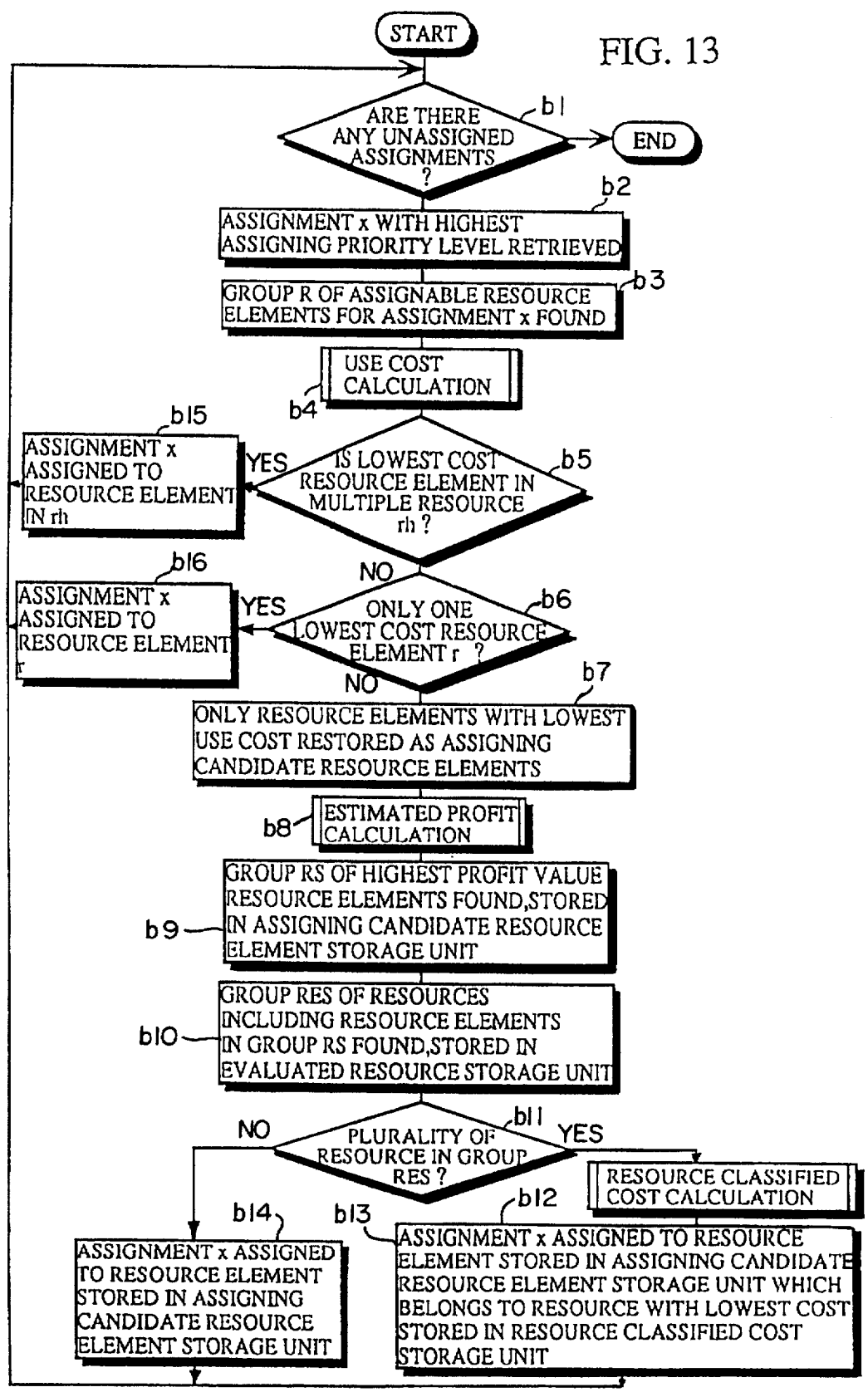
FIG. 13 is a flowchart for the resource element determination control unit 38.

As can be seen from FIG. 9, the assigning resource element determination unit 26 is made up of an assigning candidate resource element storage unit 31, an assignable resource element detection unit 32, a use cost calculator 34, a use cost storage unit 35, an estimated profit calculator 36, a profit storage unit 37, a resource element determination control unit 38, a resource classified cost calculator 39, a resource classified cost storage unit 40 and an evaluated resource storage unit 41. Here, FIG. 13 is a flowchart for the operation of the resource element determination control unit 38.

As shown in this flowchart, the resource elements to which assignment x can be assigned are found in step b3, with, when there is a plurality of assignable resources, the resource element to which assignment x should be assigned being selected by calculating the use costs of each resource element in step b4. If only one resource element is selected in this process, assignment x is assigned to this resource element in step b16, while if a plurality of resource elements are left after the selection process, then only these lowest use cost resource elements are taken in step b7 and, out of the taken candidates, the most suitable resource element for the assigning of assignment x is selected by calculating the profit/loss values for the candidates taken in step b8. When only one resource element is left after the re-selection process, assignment x is assigned to this resource element in step b14, while if a plurality of resource elements are left after the re-selection process, then the lower order cost values for these resource elements are calculated and re-selection performed in step b12, with the above loop process (step b1–b14) being performed for all unassigned assignments in order of their assigning priority.

In this flowchart, the group R shows the group of resource elements which are not assigned assignments whose live ranges interfere with that of assignment x.

The following is a more detailed explanation which will follow the steps in this flowchart.

In step b1, when the resource element determination control unit 38 finds that there is still an assignment in the assignment storage unit 21 which has not been assigned to a resource element, it proceeds to step b2, while if it does not find such an assignment, the assigning resource element determination unit 26 terminates its operation.

In step b2, the resource element determination control unit 38 takes the assignment x with the highest assigning priority level evaluated by the assigning priority level calculator 25 out of the unassigned assignments in the assignment storage unit 21.

In step b3, the resource element determination control unit 38 activates the assignable resource element detection unit 32 and has the group of assignable resource elements for assignment x found. This is to say, the assignable resource element detection unit 32 finds the group of resource elements r (called assignable resource elements) which have not been assigned assignments whose live ranges interfere with that of assignment x. The assignable resource elements are then stored in the assigning candidate resource element storage unit 31.

In step b4, the resource element determination control unit 38 activates the use cost calculator 34 and has the use cost of the intermediate instructions which use assignment x calculated for each of the resource elements in the group R stored in the assigning candidate resource element storage unit 31, with the results of this calculation being stored in the use cost storage unit 35.

In step b5, when the lowest cost resource element obtained in step b4 out of the resource elements stored in the assigning candidate resource element storage unit 31 is present in the multiple resource rh, step b15 is performed, otherwise the process proceeds to step b6.

In step b6, when there is only one resource element r out of the resource elements stored in the assigning candidate resource element storage unit 31 which has a lowest use cost obtained in step b4, the resource element determination control unit 38 performs step b16, otherwise it performs step b7.

In step b7, the assigning candidate resource element storage unit 31 is, temporarily cleared and only the resource elements with the lowest use cost obtained in step b4 are restored in the assigning candidate resource element storage unit 31.

In step b8, the resource element determination control unit 38 activates the estimated profit calculator 36 and has the profit value for each resource element found from the assignments which exhibit resource succession relations with assignment x, with the obtained profit values being stored in the profit storage unit 37.

In step b9, the group of resource elements RS with a highest profit value calculated and stored in the profit storage unit 37 in step b8 is found out of all the resource elements stored in the assigning candidate resource element storage unit 31. The content of the assigning candidate resource element storage unit 31 is then temporarily cleared and only the resource elements belonging to the group RS are restored.

In step b10, the group of resources RES to which the resource elements in the group RS belong is found and is stored in the evaluated resource storage unit 41.

In step b11, when there are a plurality of resources in the group RES stored in the evaluated resource storage unit 41, the process advances to step b12, otherwise the process advances to step b14.

In step b12, the resource element determination control unit 38 activates the resource classified cost calculator 39 and has the lower order cost values calculated, with the calculated result for each resource then being stored in the resource classified cost storage unit 40.

In step b13, assignment x is assigned to a resource element stored in the assigning candidate resource element storage unit 31 which is a resource element which belongs to a resource in the group RES stored in the evaluated resource storage unit 41, said resource having the lowest cost stored in the resource classified cost storage unit 40, before the processing returns to step b1.

In step b14, assignment x is assigned to the resource element stored in the assigning candidate resource element storage unit 31, before the processing returns to step b1.

In step b15, when an assignment whose live range interferes with that of assignment x has been assigned to a resource element of a multiple resource rh, then assignment x is assigned to a different resource element in the multiple resource rh, before the processing returns to step b1.

In step b16, assignment x is assigned to resource element r, before the processing returns to step b1.

The assigning candidate resource element storage unit 31 stores the assignable resource elements for assignment x. An example of the stored content of the assigning candidate resource element storage unit 31 and a transition of this content are shown in FIG. 26B. In this figure, the symbols (a), (d), (e), (f) . . . to the right of the rows correspond to (a), (d), (e), (f) . . . in FIG. 26A which themselves correspond to (a), (d), (e), (f) . . . in the example program shown in FIG. 33. Here, the assignable resource elements are set as the resource elements which have not been assigned assignments whose live range interferes with that of assignment x.

In (a) and (d) in FIG. 26B, [D0, D1, D2, D3, A0, A1, A2 and Mm] are the assignable resource elements. However, in the transition from (f) to (f-1), it can be seen that resource element D1 is removed from the list of assignable resource elements.

The assignable resource element detection unit 32 is activated in step b3 and detects the assignable resource elements. The assignable resource elements detected by the assignable resource element detection unit 32 are stored in the assigning candidate resource element storage unit 31.

The use cost calculator 34 is activated in step b4 and, by estimating the cost in terms of the memory size or the execution time of machine language instructions corresponding to intermediate instructions using assignment x when assignment x is assigned to each of the assignable resource elements stored in the assigning candidate resource element storage unit 31, performs the selection of the resource elements. Also, the use cost calculator 34 stores cost values calculated for each resource element as its estimation results in the use cost storage unit 35.

The use cost storage unit 35 stores the calculated results of the use cost calculator 34 calculated in step b4.

The estimated profit calculator 36, in respect to the estimates of the memory size or execution time by the use cost calculator 34, estimates the reduction in transfer requests when assignment x is assigned to each resource element by calculating profit/loss values and so selects the resource elements.

The profit storage unit 37 stores the profit values which are the totals of the profit/loss values calculated by the estimated profit calculator 36 in step b9. An example of the stored content of the profit storage unit 37 is shown in FIG. 28A. In this figure, the symbols (d), (d-1), (d-2), (d-3), (d-4) . . . have been added to the right of the rows in the table, with these showing the transition by the estimated profit calculator 36 of the profit values stored for each resource element with regard to the assignment t265.

The resource element determination control unit 38 controls the entire assigning resource determination process.

The resource classified cost calculator 39 calculates the lower order cost value in step b12 when there are a plurality of resources whose profit value calculated by the estimated profit calculator 36 is the highest.

The resource classified cost storage unit 40 stores the lower order cost value for each resource which are the calculation results of the resource classified cost calculator 39.

Figure 31A:
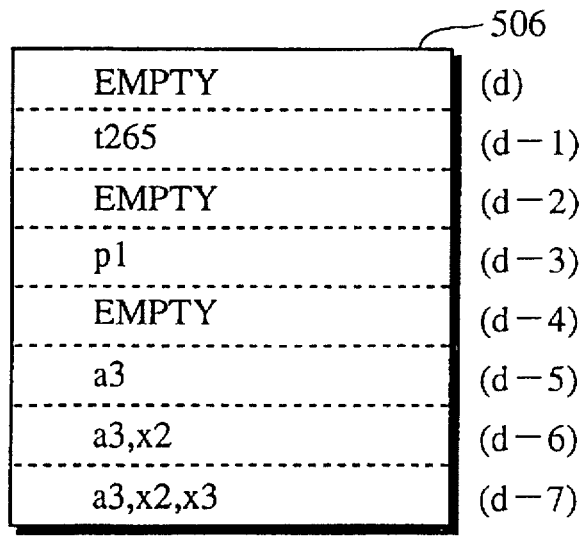
FIG. 31A is a figure showing an example of a transition in the stored content of the processed assignment storage unit 506.
Figure 31B:
FIG. 31B is a figure showing an example of a transition in the stored content of the resource cost pattern storage unit 502.
Figure 31C:
FIG. 31C is a figure showing an example of a transition in the stored content of the evaluated resource storage unit 41.

The evaluated resource storage unit 41 stores the resources determined to be valid by the calculation of the resource classified cost calculator 39 in step b12. An example of the stored content of the evaluated resource storage unit 41 is shown in FIG. 31C. In this figure, the symbols, (d), (d-1) . . . have been added to the right of the rows in the table, with these showing the transition in the stored content of the evaluated resource storage unit 41 by the resource classified cost calculator 39 with regard to the assignment t265.

Construction of the Use Cost Calculator 34

Figure 10:
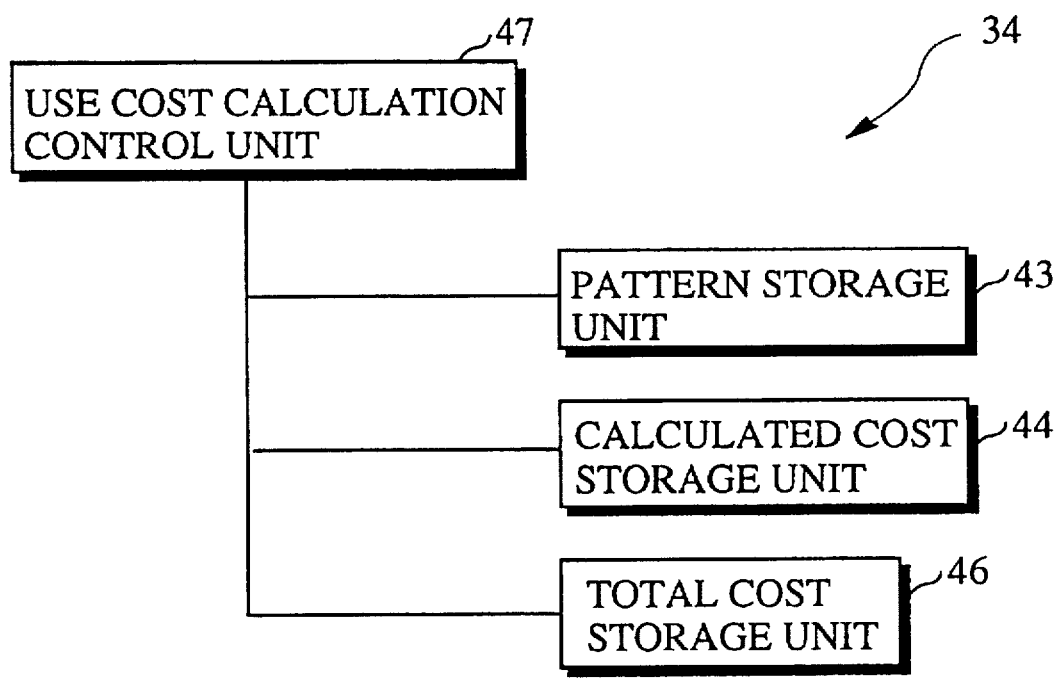
FIG. 10 shows the construction blocks of the use cost calculator 34.

The use cost calculator 34 shown in FIG. 9 is constructed for the calculation of the use cost of every assignment. The construction of the use cost calculator 34 itself is shown in FIG. 10.

The use cost calculator 34 is made up of a pattern storage unit 43, a calculated cost storage unit 44, a total cost storage unit 46 and a use cost calculation control unit 47.

Figure 14:
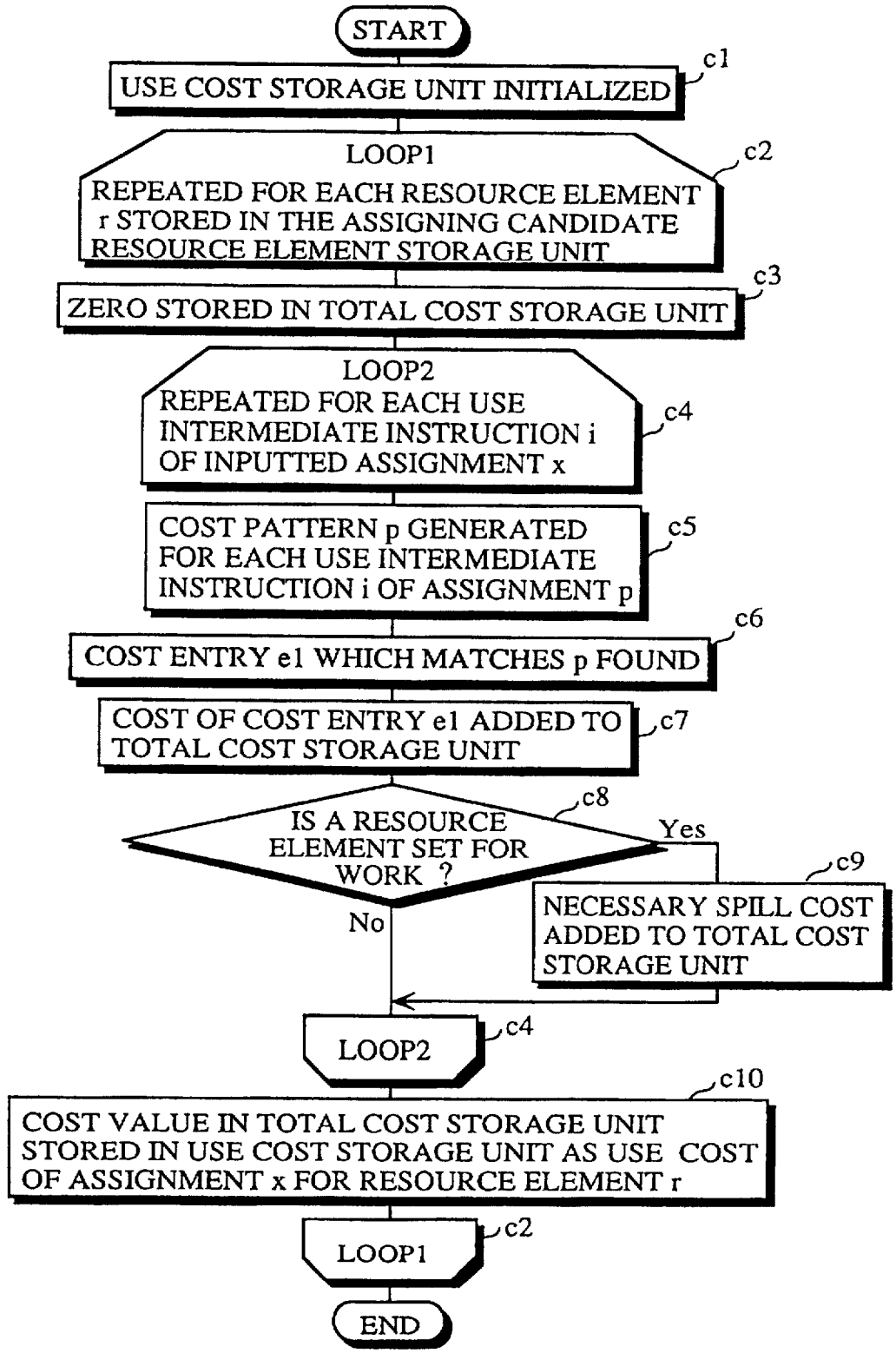
FIG. 14 is a flowchart for control content of the use cost calculation control unit 47.

FIG. 14 shows the flowchart for the use cost calculation control unit 47.

In this flowchart, the intermediate instruction i is an intermediate instruction which uses assignment x. Resource element r shows a resource element stored in the assigning candidate resource element storage unit 31. The cost pattern p represents the cost pattern generated for the intermediate instruction when resource element r is used (note that cost patterns are explained later in the text).

In this flowchart, there is a loop process (steps c4–c9) which is repeated for every intermediate instruction which uses assignment x, the loop process being made up of step c5 in which the cost pattern p when the operand in the intermediate instruction i which uses assignment x uses resource element r, step c6 for finding the cost entry which matches the generated cost pattern p, and step c7 for adding the determined cost entry to the total cost storage unit 46.

The loop process is then also repeated for every assignable resource element (steps c2–c10), making it a dual loop process (note that cost entries are explained later in the text).

The following is a detailed explanation of the steps in this flowchart in order of their execution.

In step c1, zeros are written into the storage areas of the use cost storage unit 35 which correspond to the resource elements stored in the assigning candidate resource element storage unit 31, while "INVALID" is written onto the remaining areas.

In step c2, steps c3 to c10 are performed for every resource element r stored in the assigning candidate resource element storage unit 31. After completing this, the use cost calculator 34 terminates its processing.

In step c3, the total cost storage unit 46 is set to store the value zero.

In step c4, the intermediate instructions which use assignment x are retrieved one at a time and the processes from c5 to c9 are executed for the retrieved intermediate instruction i.

In step c5, cost pattern p is generated for the intermediate instruction i when the part of the intermediate instruction i which relates to assignment x is assigned to the resource element r, with this cost pattern being stored in the pattern storage unit 43.

In step c6, cost matching between the cost pattern p and the cost entry stored by the calculated cost storage unit 44 is performed, and the matching cost entry e1 is retrieved.

In step c7, the cost of the cost entry e1 is retrieved and the retrieved cost is added to the total cost storage unit 46.

In step c8, it is determined whether the resource element is set to WORK for the cost entry e1, with step c9 being performed when it is so determined, and step c4 being performed when it is not. Here, WORK is the resource element used other information, aside from the information in the resource element(s) set for an operand and the calculated result of the intermediate instruction i, which can be necessary when the code generation apparatus 14 converts the immediate instruction i into a machine language instruction.

In step c9, the group R1 of resource elements to which the assignments whose live range include intermediate instruction i are assigned is found and, when the resource element r1 set by WORK for cost entry e1 is present in the group R1, the spill cost is added to the total cost storage unit 46. Spill cost refers to the cost needed to temporarily save the stored value of resource element r1 in the stack and then restore the value after use by the intermediate instruction i. After adding the spill cost, step c4 is performed (hereinafter, the resource element r1 is called the spill resource element for the intermediate instruction i).

In step c10, the use cost for when assignment x is assigned to the resource element r is stored in the use cost storage unit 35 as the value stored in the total cost storage unit 46, before step c2 is performed.

The pattern storage unit 43 stores the cost patterns generated in step c5. The cost pattern expresses the intermediate instructions which use assignment x as a combination of the following four items, these being necessary for more specific and accurate calculation.

(OP, OPR1, OPR2, RESULT)

OP . . . This item sets the classification of the operator in the intermediate instruction, with examples being "MULTIPLICATION", "ADDITION" and "SUBSTITUTION".

OPR1 . . . This corresponds to the first operand in the intermediate instruction (which corresponds to the operand on the left hand side for instructions in 2-operand format), and records how the first operand is set.

If the first operand is an immediate value, then "IM" is set to show there is an immediate value. Also, if the assignment of the first operand has already been assigned to a resource element, this resource element is set. If the operand neither has an immediate value nor has been assigned to a resource element, the value "YET" is set to show that it has not yet been assigned. Here, the characteristic "K" or "N" can be added to this first operand to show whether or not this intermediate instruction coincides with the end point.

OPR2 . . . This corresponds to the second operand in the intermediate instruction (which corresponds to the operand on the right hand side for instructions in 2-operand format), and is set a value in the same way as OPR1.

RESULT . . . This item is set information which shows whether a resource element for storing a calculation result is the same as a resource element to which any of the assignments is assigned.

When the RESULT is assigned to the same resource element as the left hand operand, "SAME LEFT" is set as RESULT, when it is the same as the right hand operand, "SAME RIGHT" is s et, and when it is assigned to a different resource to both the right and left hand operands, "DIFFERENT" is set. Also, if th e result has not been assigned to a resource element, the value "YET" is set . Here, for comparison and substitution operations, this item is yet to be set.

Hereinafter, the combination of above four kinds of information are referred to as a cost pattern.

As an example, the assignment t34 in the intermediate instruction i3 (t1=t34+3) in the example program shown in FIG. 33 is assigned to the resource element D0 and the assignment t1 is unassigned. The item for the classification of the operation is set as "ADDITION". Here, intermediate instruction i3 is the end intermediate instruction for assignment t34, so that since assignment t34 is assigned to resource element D0, "D0.K" is set as OPR1. The second operand has the immediate value "3" so that the value "IM" is set for OPR2. The calculation result th is unassigned so that the value "YET" is set for the item RESULT.

In this way, the cost pattern for the intermediate instruction i3 is (ADDITION, D0.K, IM, YET).

The calculated cost storage unit 44 stores a cost table which has columns which correspond all of the cost patterns with their costs, this being necessary for greater accuracy in the use cost calculation.

An example of the calculated cost table is shown in FIG. 27A. The columns in this table include the four items described above, OP, OPR1, OPR2, and RESULT, as well as WORK which shows the necessary resource elements, aside from the other resource elements, to which the operands and result in the four items are assigned and COST which shows the cost value of the cost pattern in question. Hereinafter, entries in the cost table are referred to as cost entries.

As one example, in FIG. 27A it is shown that Dn and Dm can be matched using any of the resource elements D0–D3 out of the resource DR. It is also shown that An and Am can be matched using any of the resource elements A0–A2 out of the resource AR. IM shows the matching of an immediate value. Dn and An are displayed as being separated by a "↑" which indicates that matching is possible using a resource element of either the AR resource or the DR resource. As shown by the cost entry in FIG. 27A(a), matching is possible for entries with no "N" or "K" characteristics regardless of whether the cost entry has "N" or "K" characteristics. Here, the cost pattern (ADDITION, D0.K, IM, YET) for the aforementioned (t1=t34+3) is matched to cost entries in FIG. 27A(b). From this it can be seen that the cost of the corresponding cost pattern is 3.

The costs which are matched above are totalled in the total cost storage unit 46.

The use cost calculation control unit 47 receives an input of assignment x and executes control in accordance with the flowchart shown in FIG. 14 in order to calculate the use cost when assignment x is assigned to each of the resource elements stored in the assigning candidate resource element storage unit 31.

Construction of the Estimated Profit Calculator 36

Figure 11A:
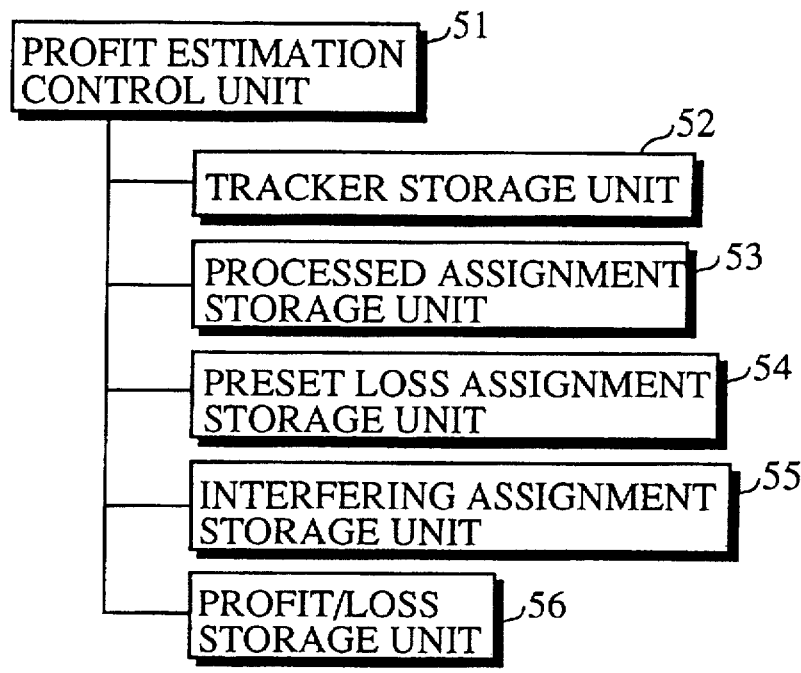
FIGS. 11A, 11B show the constructions of the estimated profit calculator 36 and the resource classified cost calculator 39.

The estimated profit calculator 36 is constructed so as to calculate profit values in order to estimate the extent to which there is a reduction in transfer requests. FIG. 11A shows the construction of the estimated profit calculator 36.

The estimated profit calculator 36 is made up of a profit estimation control unit 51, a tracker storage unit 52, a processed assignment storage unit 53, a preset loss assignment storage unit 54, an interfering assignment storage unit 55 and a profit/loss storage unit 56.

The profit estimation control unit 51 executes control so as to calculate the profit value for assignment x.

Figure 15:
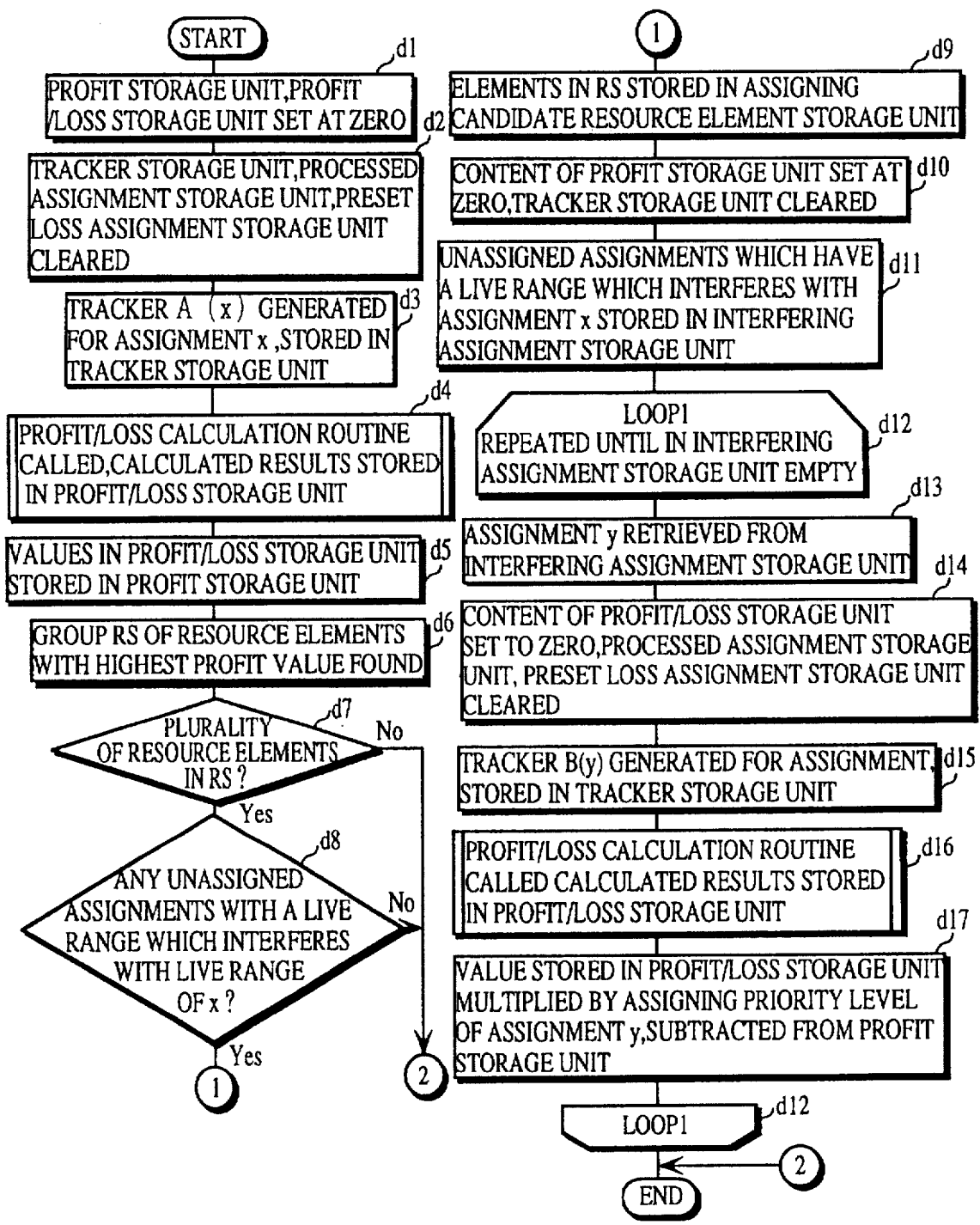
FIG. 15 is a flowchart for control content of the profit estimation control unit 51.
Figure 16:
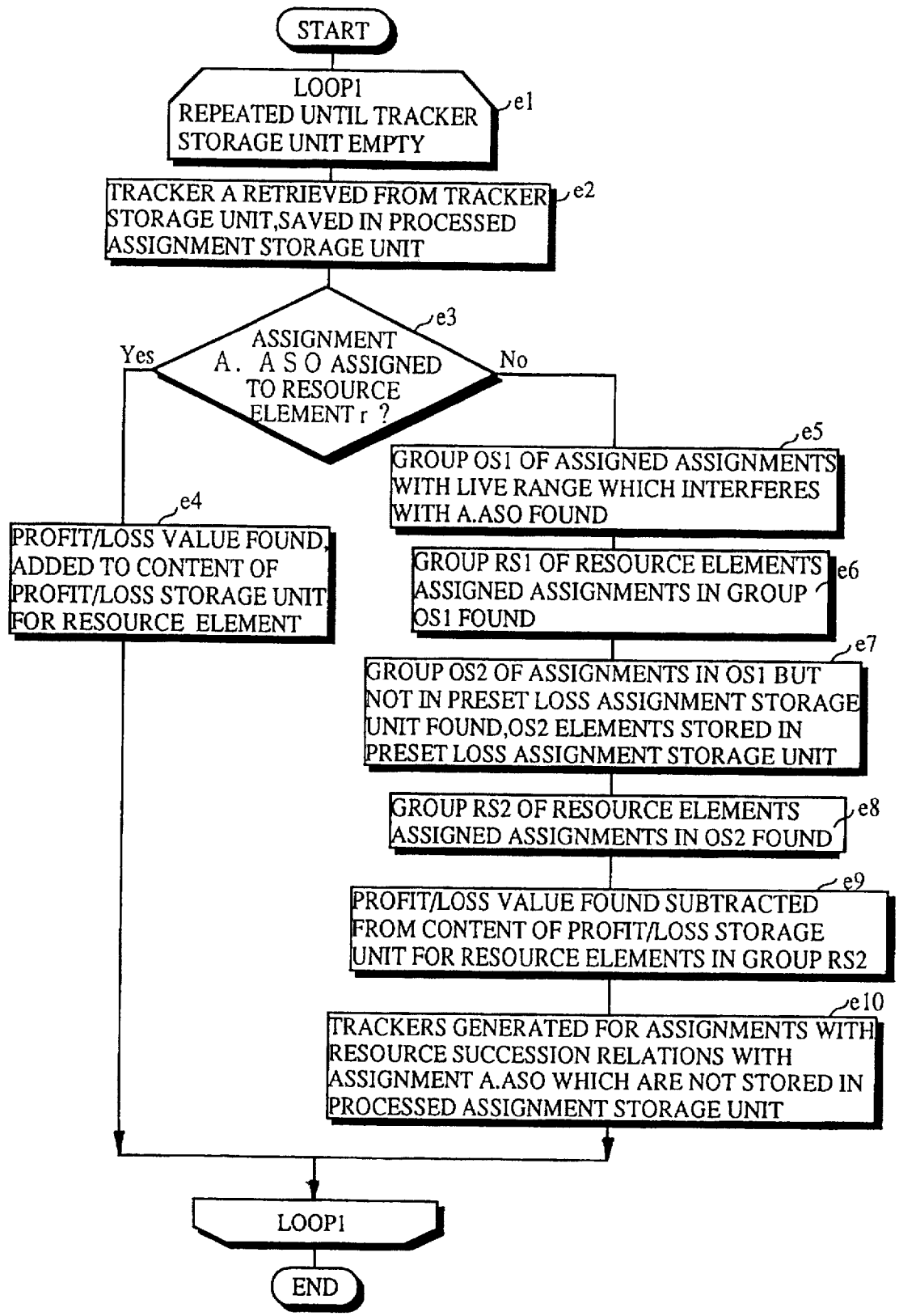
FIG. 16 is a flowchart for the profit/loss calculation.

The control process executed by the profit estimation control unit 51 is shown in the flowcharts in FIGS. 15 and 16. FIG. 15 shows the main flow of the processing control of the profit estimation control unit 51 and FIG. 16 shows the profit/loss calculation process (the profit/loss calculation process shown by this flowchart is called the profit/loss calculation routine).

The flowchart in FIG. 15 includes a step d3 for generating trackers for tracing the resource succession relations from assignment x, a step d4 for calculating profit/loss values for each resource element and performing a first stage re-selection of resource elements, and steps d12–d17 for tracing, when a number of resource elements are found in the first re-selection to have a highest profit value, the resource succession relations of any assignment whose live range interferes with that of assignment x and which is not yet assigned, for calculating the profit/loss values for each resource element and for performing a second stage re-selection of resource element.

In the present flowchart, the second stage re-selection is made up of a loop construction (steps d12–d17) which is repeated for every assignment y (an assignment whose live range interferes with that of assignment x and which is not yet assigned), with this loop construction including step d15 in which a tracker is generated for assignment y, step d16 in which the profit/loss value of this tracker value is found, and step d17 in which a value gained by multiplying the calculated profit/loss value by the priority level of assignment y is subtracted from the profit value of the resource element.

The following is a more detailed explanation of the present flowchart which follows the steps in order.

In step d1 of FIG. 15, the profit estimation control unit 51 resets the contents of the profit storage unit 37 and of the profit/loss storage unit 56 corresponding to each resource element to zero.

In step d2, the tracker storage unit 52, the processed assignment storage unit 53 and the preset loss assignment storage unit 54 are all cleared.

In step d3, the tracker A(x) is created for assignment x, with the items in A(x) being set so as assignment of tracker A(x)=A(x).ASO=x total live range length of tracker A(x)=A(x).LNS=1 resource element group for tracker A(x)=A(x).RES= group of resource elements in assigning candidate resource element storage unit 31 with this generated tracker A(x) being saved in the tracker storage unit 52.

In step d4, the profit/loss calculation routine (described later) is called, profit/loss calculation is performed and the calculated result for each resource element is saved in the profit/loss storage unit 56.

In step d5, the values for each resource element stored in the profit/loss storage unit 56 are stored in the profit storage unit 37.

In step d6, the resource elements which are stored in the assigning candidate resource element storage unit 31 and which have a highest value stored in the profit storage unit 37 are set as group RS.

In step d7, step d8 is executed when there are a plurality of resource elements in group RS. When there are not, the processing by the estimated profit calculator 36 is terminated.

In step d8, step d9 is executed if there are any assignments yet to be assigned whose live range interferes with that of assignment x. When there are not, the processing by the estimated profit calculator 36 is terminated.

In step d9, the content of the assigning candidate resource element storage unit 31 is temporarily cleared and the new group of resource elements RS are saved.

In step d10, the content of the profit storage unit 37 corresponding to each resource element is reset to zero and the tracker storage unit 52 is cleared.

In step d11, only the assignments yet to be assigned whose live range interferes with that of assignment x are stored in the interfering assignment storage unit 55.

In step d12, steps d13–d17 are repeated until the content of the interfering assignment storage unit 55 is empty. When it becomes empty, the processing by the estimated profit calculator 36 is terminated.

In step d13, one assignment y is retrieved from the interfering assignment storage unit 55 and is deleted from the interfering assignment storage unit 55.

In step d14, the contents of the profit/loss storage unit 56 corresponding to each resource element are reset to zero and the processed assignment storage unit 53 and the preset loss assignment storage unit 54 are cleared.

In step d15, the tracker B(y) is created for assignment y, with the items is B(y) being set so as assignment of tracker B(y) B(y).ASO=y total live range length of tracker B(y)=B(y).LNS=1 resource element group for tracker B(y)=B(y).RES=group of resource elements in assigning candidate resource element storage unit 31 with this generated tracker B(y) being saved in tracker storage unit 52.

In step d16, the profit/loss calculation routine (described later) is called, profit/loss calculation is performed and the calculated result for each resource element is saved in the profit/loss storage unit 56.

In step d17, the values for each resource element stored in the profit/loss storage unit 56 are multiplied by the priority level of assignment y and the result is subtracted from the profit storage unit 37, before a return to step d12.

As described above, the profit estimation control unit 51 calculates profit values (steps d1–d5) from assignments which have resource succession relations with assignment x. When there is a plurality of resource elements with a highest calculated profit value, it calculates a final profit value, considering even the possibility that transfer instructions can be eradicated by assigning to a same resource element as an assignment y whose live range interferes with assignment x (steps d9–d17).

In particular, the profit/loss value related to assignment y shows whether it is advantageous to assign assignment y to a certain resource element. The greater the extent of this value for a resource element, the more transfer instructions will be generated if assignment x is assigned to this resource element. Also, out of the various assignments y, since the possibility of assignments with low assigning priority levels being assigned one of the limited number of registers or the like is low, it is necessary when estimating to lower the evaluation of this effect. Accordingly, in step d17, a value obtained by multiplying the profit/loss value calculated for assignment y by the assigning priority level of assignment y is subtracted from the profit storage unit 37.

Detailed Flowchart for the Profit/Loss Calculation Routine

The profit/loss calculation routine is the sub-routine called from steps d4 and d16 in FIG. 15. In steps d3 and d15 in the flowchart in FIG. 15, the process shown in FIG. 16 is repeated for all of the trackers stored in the tracker storage unit 52.

The profit/loss calculation routine includes step e3 for determining whether assignments A.ASO which trace the present resource succession relations for a consecutive live group (this being a group of assignments whose live ranges follow on continuously) are assigned to a resource element, with either step e4 or steps e5–e10 being executed depending on the determination result in step e3.

In step e4, when it is determined that the consecutive live group has been assigned, the profit/loss values of the resource elements tracing as far as the assignments have been assigned are calculated and this profit/loss value is added to the profit value. On the other hand, when it is determined in step e3 that the assignments have not been assigned, in steps e5–e10 the investigation is extended to the assignments whose live ranges interfere with the live range of assignments A.ASO. More specifically, this process is made up of a calculation of the causes of a loss for assignments A.ASO (assignments which cause a reduction in the profit value) in steps e5–e8, the calculation of the profit/loss values of the resource elements which have been assigned assignments which cause losses and the reduction of the profit/loss values by the profit values of these resource elements in step e9 and after this reduction, the further generation of trackers for the assignments which exhibit resource succession relations with assignments A.ASO in step e10, with this processing from step e2–e10 being repeated until there are no more trackers stored in the tracker storage unit 52, thereby forming a loop construction which traces all of the assignments which exhibit resource succession relations in order.

The following is a more detailed explanation of the present flowchart which follows the steps in order.

In step e1, the steps e2–e10 are repeated until the tracker storage unit 52 is empty, at which point the processing in the profit/loss calculation subroutine is terminated.

In step e2, one tracker A is retrieved from the tracker storage unit 52 and is deleted from the tracker storage unit 52, and the assignment A.ASO, which is an assignment element in tracker A, is stored in the processed assignment storage unit 53.

In step e3, it is determined whether assignment A.ASO is assigned to resource element r, with step e4 being executed when it has been so assigned, otherwise step e5 being executed.

In step e4, when resource element r belongs to A.RES which is an element in the resource element group for tracker A, then 1/A.LNS (total live range length of tracker A) is found as the profit/loss value, with this value being added to the content for the resource element r in the profit/loss storage unit 56. The processing then returns to step e1.

In step e5, the group OS1 of the assignments which have been assigned to a resource element and whose live ranges interfere with that of assignment A.ASO is found.

In step e6, the group RS1 of resource elements to which assignments belonging to group OS1 have been assigned is found.

In step e7, the group OS2 of assignments x which belong to OS1 but which are not stored in the preset loss assignment storage unit 54 is found, with the elements in the group OS2 being stored in the preset loss assignment storage unit 54.

In step e8, the group RS2 of resource elements to which assignments belonging to group OS2 have been assigned is found.

In step e9, 1/A.LNS (total live range length of tracker A) is found as the profit/loss value and is subtracted from the content of the profit/loss storage unit 56 for the resource elements belonging to group RS2.

In step e10, trackers B(y) are generated for each assignment y which is an assignment which exhibits resource succession relations with assignment A.ASO and which is not stored in the processed assignment storage unit 53, with the items in B(y) being set as assignment of tracker B(y)=B(y).ASO=y total live range length of tracker B(y)=B(y).LNS=total live range length A.LNS+live range length of A.ASO resource element group for tracker B(y)=B(y).RES=group of resource elements A.RES-group RS1

The generated tracker B(y) is then stored in tracker storage unit 52, with the processing returning to step e1 after the execution of step e10.

As described above, the profit/loss calculation routine adds assignments with resource succession relations to the tracker storage unit 52 in step e10, by doing so making it possible to trace the resource succession relations. This setting means that there is an increase in trackers so that the range of the investigation in the calculation of profit/loss values is extended.

Figure 34:
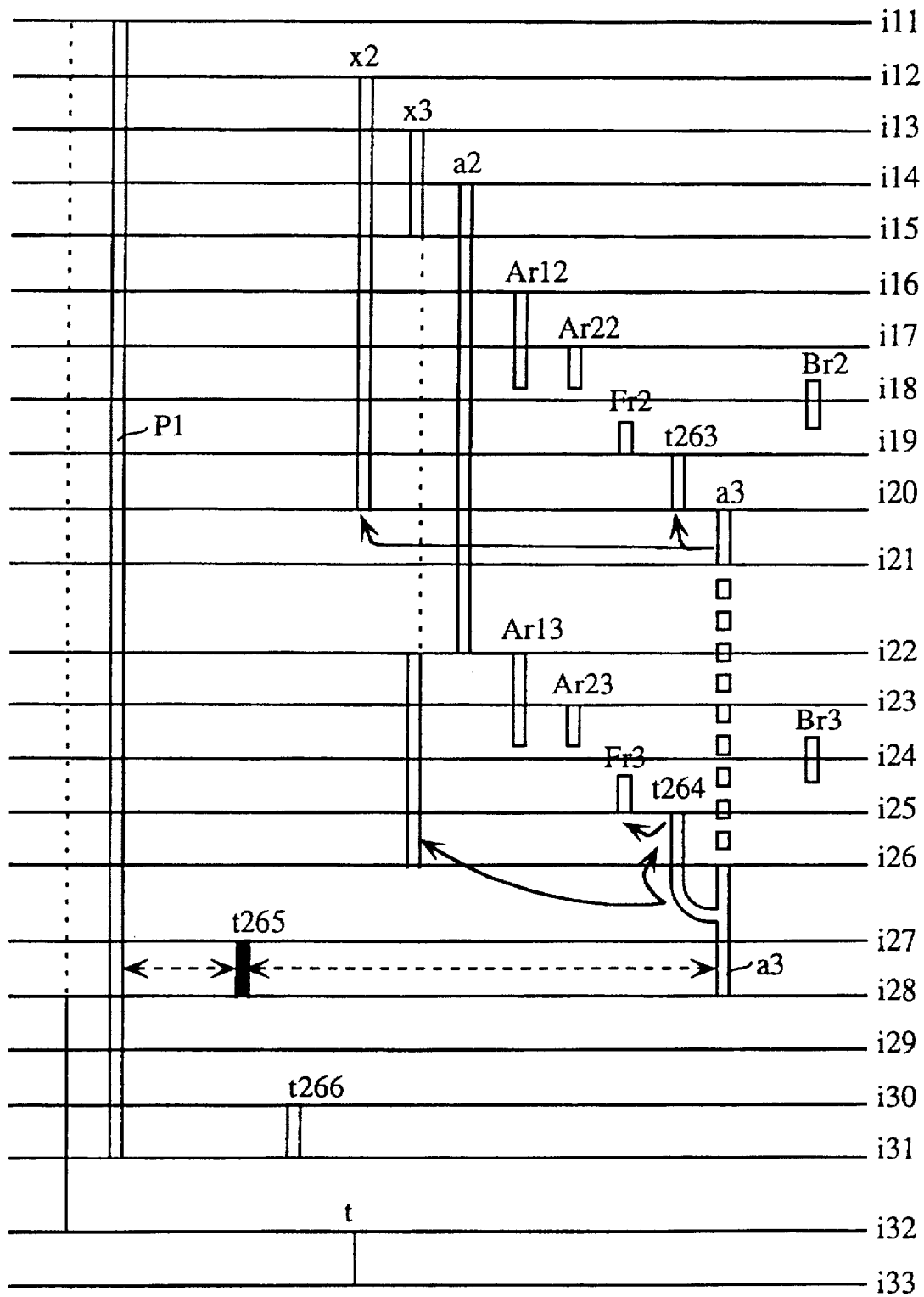
FIG. 34 is a figure showing the assignments which exhibit resource succession relations when calculating the profit/loss value of assignment t265.

The tracker storage unit 52 stores the plurality of trackers generated during the processing in steps d3, d15 and e10 of the profit/loss calculation subroutine. An example of the stored content of the tracker storage unit 52 is shown in FIG. 28C. In this figure, the characters (d), (d-1), (d-2), (d-3), (d-4) ... have been added to the right of the entry table, these characters showing the transition in the stored content of tracker storage unit 52 in the estimated profit calculator 36 regarding assignment t265. These characters (d), (d-1), (d-2), (d-3), (d-4) ... indicate the tracker assignments whose resource succession relations are traced in calculating the profit/loss value of the assignment t265. The positional relationship between the live ranges of these tracker assignments whose resource succession relations are traced and that of assignment t265 is shown in FIG. 34. As can be seen in FIG. 34, the subject of the profit/loss calculation, assignment t265, is shown by a vertical line shaded in black, while the assignments whose resource succession relations are to be traced in the profit/loss calculation are show by white vertical lines.

In the entries in FIG. 28C, the row marked (d-1) shows that a tracker is generated with assignment t265 as a member of the composition. In the same figure, the row marked (d4) shows that a tracker is generated with the assignment p1 whose live range interferes with the live range of assignment t265 as a member of the composition. In the same way, the row marked (d-6) shows that a tracker is generated with the assignment a3 whose live range interferes with the live range of assignment t265 as a member of the composition.

Also, the row marked (d-8) shows that a tracker is generated with the assignments t263, t264, x2 and x3 which exhibit resource succession relations with assignment a3 whose live range interferes with the live range of assignment t265 as members of the composition.

In FIG. 28C, the assignment p1 whose live range interferes with the live range of assignment t265 is selected as a tracker in (d-4), while the assignment a3 whose live range interferes with the live range of assignment t265 is selected as a tracker in (d-6). In (d-8) of the same figure, assignments t263, t264, x2 and x3 which exhibit resource succession relations with assignment a3 are selected as trackers.

By referring to FIG. 28C, it can be seen that the range of the investigation for the calculation of the profit/loss value of assignment t265 is extended to assignments t263, t264, x2 and x3.

The processed assignment storage unit 53 stores the assignments in the tracker in step e2 which completes the profit/loss calculation routine. In particular, the role of the processed assignment storage unit 53 is to prevent infinite repetition of the processing in the profit/loss calculation routine when there are direct or indirect circular resource succession relations.

An example of the stored content of the processed assignment storage unit 53 is shown in FIG. 29A. In this figure, the characters (d), (d-1), (d-2), (d-3), (d-4) . . . have been added to the right of the entry table, these characters showing the transition in the stored content of the processed assignment storage unit 53 in the estimated profit calculator 36 regarding assignment t265. The row marked (d-1) shows that assignment t265 is an assigned assignment. By progressing through the lower entries (d-1), (d-2), (d-3), (d-4) . . . it can be seen that the trackers with members assignment p1 whose live range interferes with the live range of assignment t265, assignment a3 whose live range interferes with the live range of assignment t265, and assignments t263, t264, x2 and x3 which exhibit resource succession relations with assignment a3 are progressively added to processed assignment storage unit 53.

In order to avoid repetition of the process subtracting the profit/loss value of a same assignment in the procedure of the profit/loss calculation routine, preset loss assignment storage unit 54 stores the assignments which have been selected in step e7 as causes of losses. By providing such a preset loss assignment storage unit 54, wildly inaccurate estimates of the causes of losses can be avoided. For example, in FIG. 21 the tracker containing assignment x is stored in the step d3 in tracker storage unit 52. After this the profit/loss calculation routine is called and in step e10 the tracker including assignments x3, x4 and x5 is saved in tracker storage unit 52. At this point, if group RS1 is used in place of group RS2 in step e9, but not in steps e7, e8, then when the trackers including assignments x4, x5 are processed in step e9, the profit/loss value of resource element D0, to which assignment x11 whose live range interferes with the live ranges of assignments x4, x5 has been assigned, will be reduced twice. Following this, when the tracker including assignments x6 is processed in step e9, the profit/loss value of resource element D0, to which assignment x11 whose live range interferes with the live ranges of assignments x6 has been assigned, will be reduced again, meaning that there is a possibility that the profit/loss value of resource element D0 will end up as a very low value. In order to avoid this, in step e7 only the assignments not stored in the preset loss assignment storage unit 54 are used in the profit/loss calculation.

An example of the stored content of the preset loss assignment storage unit 54 is shown in FIG. 29B. In this figure, the characters (d), (d-1), (d-2), (d-3), (d-4) . . . have been added to the right of the entry table, these characters showing the transition in the stored content of the preset loss assignment storage unit 54 in the estimated profit calculator 36 regarding assignment t265. The rows in the entry table marked (d), (d-1), (d-2) show the assignments which at the initial stage of the estimated profit calculation for assignment t265 have already been set as causes of losses. Here, in row (d-3) the profit/loss calculation routine for assignment p1, whose live range interferes with the live range of assignment t265, is called and the assignments whose live ranges interfere with the live range of assignment p1 can be seen to be progressively added to the preset loss assignment storage unit 54.

The interfering assignment storage unit 55 stores the assignments whose live range interferes with the live range of assignment x and which have not yet been assigned. An example of the stored content of the interfering assignment storage unit 55 is shown in FIG. 29C. In this figure, the characters (d), (d-1), (d-2) . . . have been added to the right of the entry table, these characters showing the transition in the stored content of the interfering assignment storage unit 55 in the estimated profit calculator 36 regarding assignment t265. In particular, the row marked (d) shows that the assignments p1 and a3, whose live ranges interfere with the live range of assignment t265, are stored in the interfering assignment storage unit 55.

The profit/loss storage unit 56 stores the profit/loss values for each resource element calculated by executing the profit/loss calculation routine in steps d4 and d16. An example of the stored content of the profit/loss storage unit 56 is shown in FIG. 28B. In this figure, the characters (d), (d-1), (d-2), (d-3), (d-4) . . . have been added to the right of the entry table, these characters showing the transition in the stored content of the profit/loss storage unit 56 in the estimated profit calculator 36 regarding assignment t265.

Construction of the Resource Classified Cost Calculator 39

Figure 11B:
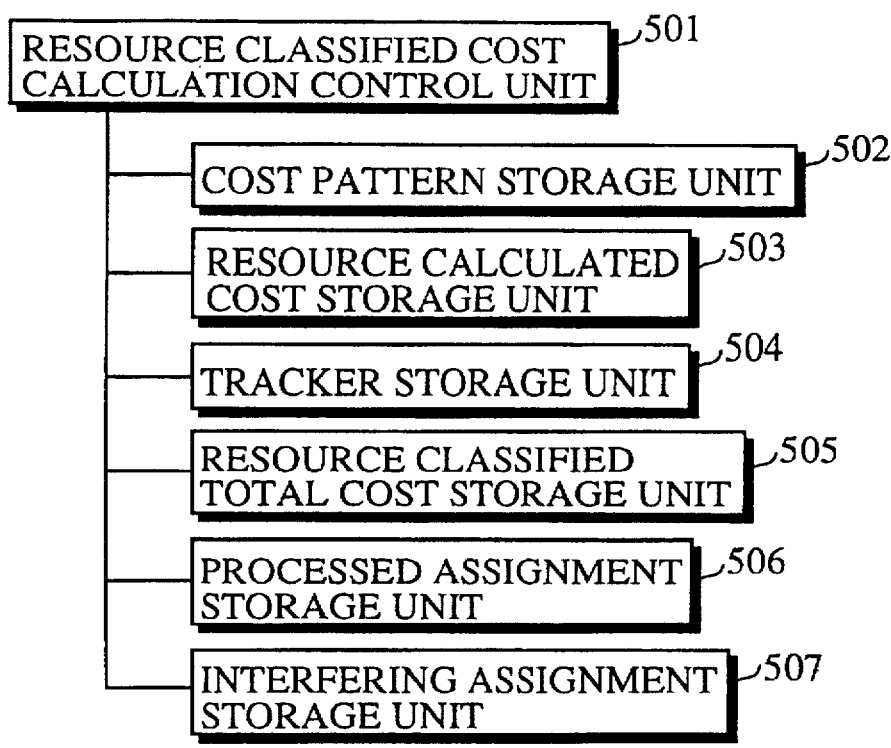

The resource classified cost calculator 39 shown in FIG. 11B is constructed so that the assignments which follow in order of assigning can be more suitably assigned to resource elements.

The resource classified cost calculator 39 is made up of a resource classified cost calculation control unit 501, a cost pattern storage unit 502, a resource calculated cost storage unit 503, a tracker storage unit 504, a resource classified total cost storage unit 505, a processed assignment storage unit 506 and an interfering assignment storage unit 507.

The resource classified cost calculation control unit 501 executes processing control so as to calculate the resource classified use cost of the assignment x.

Figure 17:
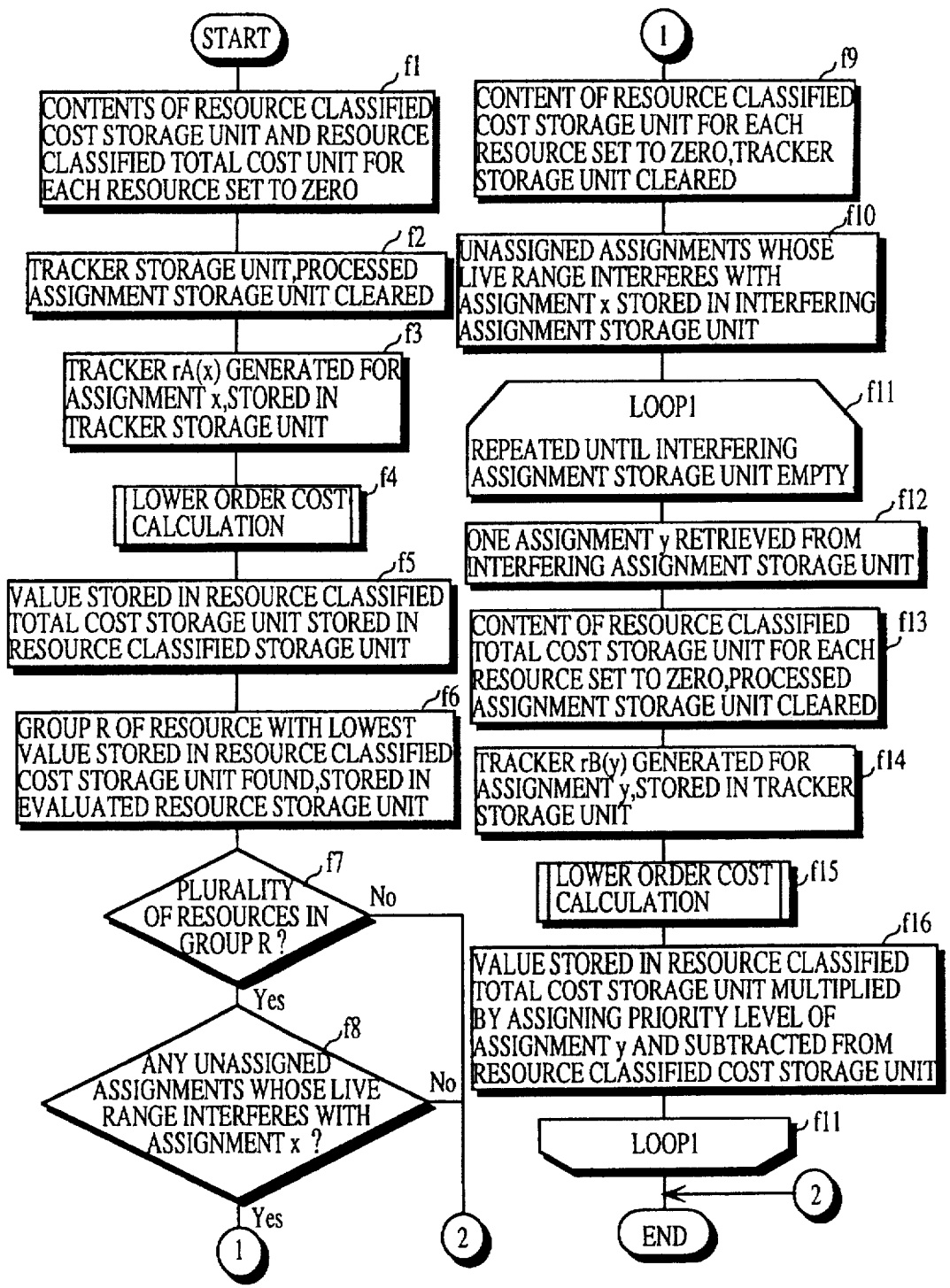
FIG. 17 is a flowchart for control content of the resource classified cost calculation control unit 501.
Figure 18:
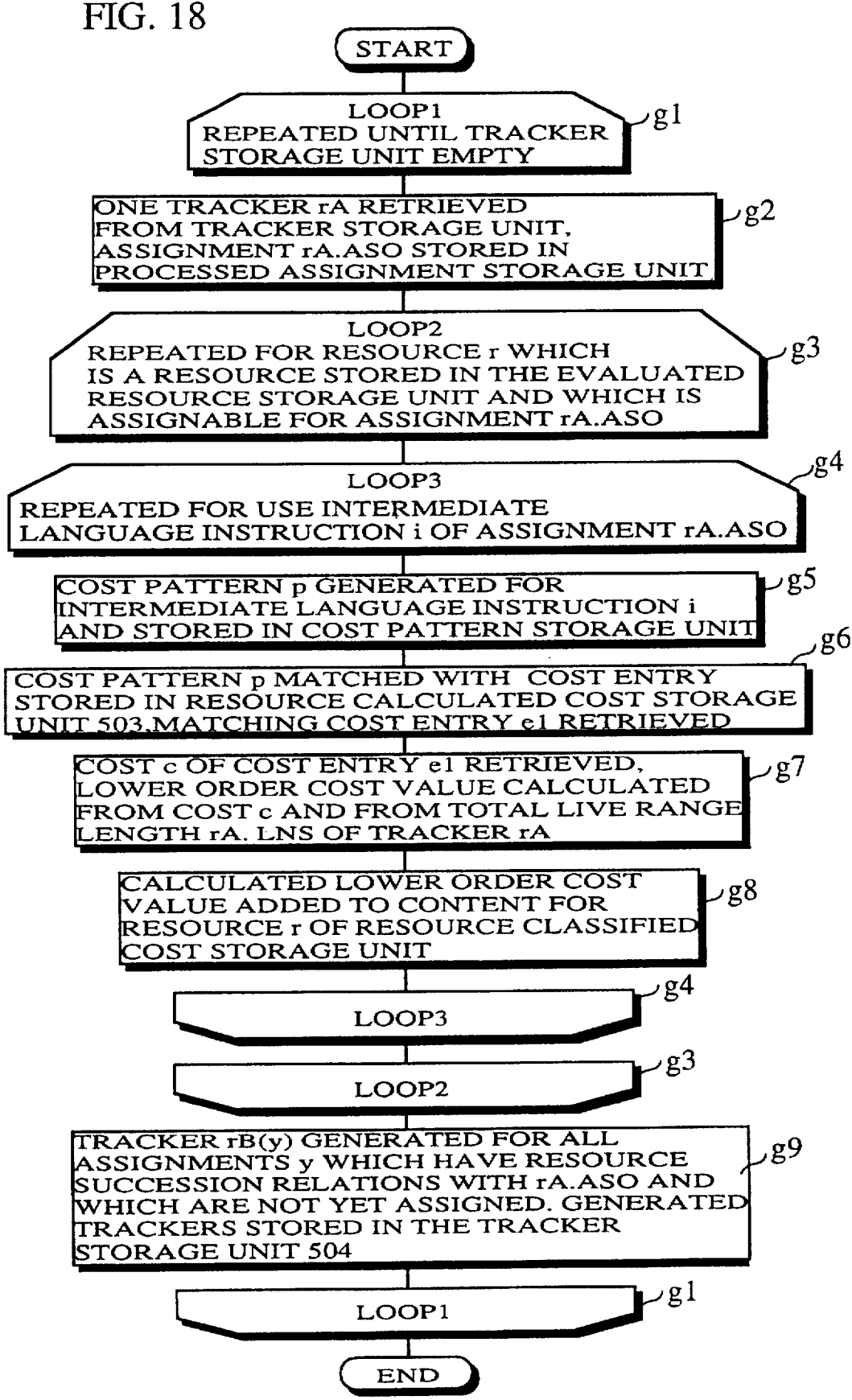
FIG. 18 is a flowchart for the lower-order cost calculation routine.

The content of the processing by the resource classified cost calculation control unit 501 is shown in the flowcharts in FIGS. 17 and 18. Here, FIG. 17 shows the main flow for the processing control of the resource classified cost calculation control unit 501, while FIG. 18 shows the flowchart for the lower order cost value calculation process (hereinafter, the lower order cost value calculation process shown in this flowchart is called the lower order cost value calculation routine).

The flowchart in FIG. 17 includes step f3 for generating trackers to trace the resource succession relations for assignment x, step f4 for executing a first stage re-selection of resources by using the trackers to trace the resource succession relations and calculating the lower order cost value for each resource, and step f15 for executing, when as a re-selection result of the first stage re-selection of resources there is a plurality of resources with a lowest lower order cost value, a second stage reselection of resources by tracing the resource succession relations of assignments whose live ranges interfere with that of assignment x and which have not yet been assigned and calculating the lower order cost value for each resource.

The second stage re-selection part of this flowchart consists of a loop construction (steps f11–f16) wherein a step f14 generating trackers for assignment y (an assignment whose live range interferes with that of assignment x and which has not yet been assigned), a step f15 calculating the lower order cost value for these trackers, and a step f16 subtracting a product of the calculated lower order cost value and the priority level of assignment y from the lower order cost value of resources are repeated for every assignment y.

The following is a more detailed explanation of the present flowchart which follows the steps in order.

In step f1, the contents of the resource classified cost storage unit 40 and the resource classified total cost storage unit 505 corresponding to each resource are reset to zero.

In step f2, the tracker storage unit 504 and the processed assignment storage unit 506 are cleared.

In step f3, the tracker rA(x) is generated for the assignment x, with the elements in rA(x) being set so that assignment of tracker rA(x)=rA(x).ASO=x total live range length of tracker rA(x)=rA(x).LNS=1.

The generated tracker rA(x) is then stored in the tracker storage unit 504.

In step f4, the lower order cost value calculation routine (described later in the text) is called, cost calculation is performed and the calculated result for each resource is stored in the resource classified total cost storage unit 505.

In step f5, the values stored in the resource classified total cost storage unit 505 for each resource are stored in the resource classified cost storage unit 40.

In step f6, the group R of resources in the resource classified cost storage unit 40 with a lowest cost value is found, the evaluated resource storage unit 41 is cleared and the resources belonging to group R are stored.

In step f7, step f8 is performed when there is a plurality of resources as elements in the group R. If not, the processing of the resource classified cost calculator 39 is terminated.

In step f8, step f9 is performed if there are any assignments whose live ranges interfere with that of assignment x and which have not yet been assigned. If not, the processing of the resource classified cost calculator 39 is terminated.

In step f9, the contents of the resource classified cost storage unit 40 corresponding to each resource are reset to zero and the tracker storage unit 504 is cleared.

In step f10, only the assignments whose live ranges interfere with that of assignment x and which have not yet been assigned are stored in the interfering assignment storage unit 507.

In step f11, steps f12–f16 are repeated until the content of the interfering assignment storage unit 507 is empty, at which point the processing of the resource classified cost calculator 39 is terminated.

In step f12, one assignment y is retrieved from the interfering assignment storage unit 507 and is deleted from the interfering assignment storage unit 507.

In step f13, the content of the resource classified total cost storage unit 505 corresponding to each resource is reset to zero and the processed assignment storage unit 506 is cleared.

In step f14, a tracker rB(y) is generated for each assignment y, with the items in rB(y) being set as assignment of tracker rB(y)=rB(y).ASO y total live range length of tracker rB(y)=rB(y).LNS=1

The generated tracker rB(y) is then stored in tracker storage unit 504.

In step f15, the lower order cost value calculation routine (described later in the text) is called, cost calculation is executed, and the calculated result for each resource is stored in the resource classified total cost storage unit 505.

In step f16, a product of the value stored by the resource classified total cost storage unit 505 and the priority level of assignment y is subtracted from the resource classified cost storage unit 40 for every resource stored in the evaluated resource storage unit 41 and the processing returns to step f11.

As described above, the resource classified cost calculation control unit 501 calculates the use cost from the assignments which exhibit resource succession relations with assignment x (steps f1–f5), with, when there is a plurality of resources with a lowest calculated cost, the cost of assignment x being calculated with consideration for assignments y whose live ranges interfere with the live range of assignment x by executing a cost calculation for assignments y (steps f9–f16). In particular, a resource whose use cost calculated in step f15 is high is a resource for which the use cost for assignment y whose live range interferes with the live range of assignment x is high, so that if assignment x is assigned to this resource when the other assignable resources include this one, the probability that assignment y will be assigned to a resource which does not have such a great cost can be increased. Accordingly, the cost found in step f16 is subtracted from the resource classified cost storage unit 40. Also, the multiplying of the cost found in step f16 by the priority level of assignment y reduces the effect of assignments y whose priority level is low since there is a low probability that such assignments will be assigned to one of the limited number of registers.

Detailed Flowchart for the Lower Order Cost Calculation Routine

FIG. 18 shows the flowchart for the lower order cost value calculation routine. Here, the lower order cost value calculation routine has a loop construction (steps g4–g8) which is repeated for all of the use intermediate instructions included in the assignment rA.ASO, the routine including step g5 generating a cost pattern for intermediate instructions in assignment rA.ASO, step g6 matching each cost pattern with a cost entry and retrieving cost c of cost entry e1, step g7 executing the calculation [lower order cost value=cost c/rA.LNS] from this cost c and the total length of live range for tracker rA, and step g8 adding the calculated lower order cost value to the lower order cost value of resource r, with this loop process then being repeated for each of the resources whose resource elements remain for the second re-selection, making a dual loop process (step g3).

This dual loop process is activated when the tracker rA is retrieved from the tracker storage unit 504, with the tracker storage unit 504 storing assignments which have resource succession relations with assignment rA.ASO during tracing of the present resource succession relations in one execution of the dual loop process (step g9). As a result, the dual loop process is repeated until all of the assignments with consecutive resource succession relations have been processed, making a triple loop process (step g1).

The following is a more detailed explanation of the present flowchart which follows the steps in order.

In step g1, steps g2–g9 are repeated until the tracker storage unit 504 is empty, at which point the processing in the lower order cost value calculation routine is terminated.

In step g2, one tracker rA is retrieved from the tracker storage unit 504 and is deleted from the tracker storage unit 504. The assignment rA.ASO in the tracker rA is also stored in the processed assignment storage unit 506.

In step g3, the processes in steps g4–g8 are repeated for each resource r which is stored in the evaluated resource storage unit 41 and which is an assignable resource for the assignment rA.ASO in the tracker rA. After the repetition of these processes is complete, step g9 is performed. Here the resources which are assignable resources for the assignment rA.ASO are resources which have resource elements which have not been assigned assignments whose live ranges interfere with the live range of assignment rA.ASO. This is to say, when all resource elements belonging to resources have been assigned assignments whose live ranges interfere with the live range of assignment rA.ASO, assignment to such resources becomes impossible.

In step g4, the intermediate instructions which use assignment rA.ASO are retrieved one at a time and the processing in steps g5–g8 is performed for the retrieved intermediate instruction i. Once the repetition of these processes is complete, the processing returns to step g3.

In step g5, cost pattern p for the intermediate instruction i when the part of assignment rA.ASO for intermediate instruction i is assigned to resource r is generated and is stored in the cost pattern storage unit 502.

In step g6, the cost pattern p stored in the cost pattern storage unit 502 is matched with a cost entry stored in the resource calculated cost storage unit 503 and the matched cost entry e1 is retrieved.

In step g7, the cost c of the cost entry e1 is retrieved, and the calculation [lower order cost value=cost c/rA.LNS] is made from this cost c and the total length of live range rA.LNS for tracker rA.

In step g8, the lower order cost value calculated in step g7 is added to the content of the resource r in resource classified total cost storage unit 505. The process then returns to step g4.

In step g9, a tracker rB(y) is generated for each assignment y, assignment y being an assignment whose live range interferes with that of assignment x, which has not yet been assigned and which has not been stored in the processed assignment storage unit 506. The items in rB(y) being set as assignment of tracker rB(y)=rB(y).ASO=y total live range length of tracker rB(y)=rB(y).LNS= total live range length rA.LNS +live range length of assignment rA.ASO

The generated tracker rB(y) is then stored in the tracker storage unit 504 and the processing returns to step g1.

The cost pattern storage unit 502 stores the cost patterns generated in step g5 of FIG. 18 for the calculation of the lower order cost values. These cost patterns are formed of the same items as the entries stored by the pattern storage unit 43, so that no further explanation will be given. An example of the stored content of the cost pattern storage unit 502 is shown in FIG. 31B. The entry in this figure which has been marked on the right side with the character (d) shows the transition of the cost pattern storage unit 502 in the resource classified cost calculator 39 related to the assignment t265.

The resource calculated cost storage unit 503 stores a calculated cost table for lower order cost value calculation which has entries which correspond all of the cost patterns with the costs for each cost pattern.

The calculated cost table stored by the resource calculated cost storage unit 503 is made up of the four items OP, OPR1, OPR2 and RESULT from FIG. 27A and COST which shows a cost value for the combination of the four items.

The tracker storage unit 504 stores a plurality of trackers to be processed by the lower order cost calculation routine.

The trackers stored in the tracker storage unit 504 are different to the trackers stored by the tracker storage unit 52 and used by the estimated profit calculator 36 in that they are deleted from the members of the group of assignable resource elements. As a result, the trackers stored by the tracker storage unit 504 are composed of two component data made up of assignments and total live range length. In order to distinguish these trackers from the trackers stored by the tracker storage unit 52, the character "r" is added so that when the assignments which trace the present resource succession relations in the tracker are set as ASO and the total live range length is set as LNS, the assignments are set as rA.ASO and the total live range length is set as rA.LNS.

The resource classified total cost storage unit 505 stores the costs calculated in the lower order cost calculation routine.

The processed assignment storage unit 506, in the same way as the processed assignment storage unit 53 in the estimated profit calculator 36, stores the assignments for which the lower order cost calculation routine has been completed. In the same way as the processed assignment storage unit 53, the role of the processed assignment storage unit 506 is to prevent the infinite repeating of the processes in the lower order cost calculation routine when there are direct or indirect circular resource succession relations. An example of the stored content of the processed assignment storage unit 506 is shown in FIG. 31A. In this figure, the characters (d), (d-1), (d-2), (d-3), (d-4) . . . have been added to the right of the entry table, these characters showing the transition in the stored content of the processed assignment storage unit 506 in the resource classified cost calculator 39 regarding assignment t265. Out of these, the row marked (d-1) shows the assignments in the resource classified cost calculator 39 regarding assignment t265which have been assigned at an initial stage. Progressing through the lower rows (d-2), (d-3), (d-4) . . . shows the progressive addition of assignment a3 whose live range interferes with that of assignment t265 and of assignments x2, x3 which have resource succession relations with assignment a3 as members of the tracker to the processed assignment storage unit 506.

Figure 31D:
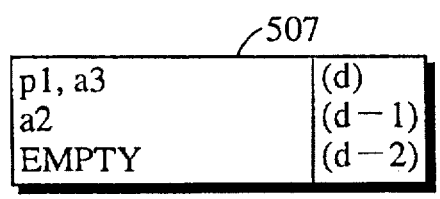
FIG. 31D is a figure showing an example of a transition in the stored content of the interfering assignment storage unit 507.

The interfering assignment storage unit 507 stores assignments whose live ranges interfere with that of assignment x and which have not yet been assigned to a resource element. An example of the stored content of the interfering assignment storage unit 507 is shown in FIG. 31D. In this figure, the characters (d), (d-1), (d-2) . . . have been added to the right of the entry table, these characters showing the transition in the stored content of interfering assignment storage unit 507 in the resource classified cost calculator 39 regarding assignment t265. Out of these, the row marked (d) shows that the assignments p1, a3, which have live ranges which interfere with the live range of assignment t265, have been stored in the interfering assignment storage unit 507.

The following is a more specific explanation of the processing content of the resource assigning apparatus of the present invention constructed as described above with reference to the flowcharts.

This description is based on the premise that the resources are made up of address registers (AR), data registers (DR) and the multiple resource which is memory (Mm). The resource elements of the AR resource are set as A0, A1 and A2, the resource elements of the DR resource are set as D0, D1, D2, and D3, and the multiple resource Mm is also set as containing resource elements.

As resource classified function limitations, the AR resource has a memory indirect reference function which the DR resource does not have. Also, the DR resource can be used for operands in multiplication and division operations, while the AR resource cannot. Also, D0, D1 and A0 are set as the broken registers for use during function calls and as the argument registers used for passing over arguments in functions. D0 and A0 are set as the return value registers to be used for return values of functions, and a use distinction between D0 and A0 is made depending on the data format of the return value registers.

For the C language program shown in FIG. 32, the intermediate program with 3-address instruction format shown in FIG. 33(1) is output by the syntax analysis apparatus 11 and the optimizing apparatus 12. Basic blocks are also extracted from this intermediate program by the optimizing apparatus 12 and the control flow information and data flow information are obtained. In FIG. 33(1) the up arrows show indirect reference operations, with the variables Ar1, Ar2 and Fr expressing the variables held by the actual argument of the function and the return value of the function.

In this state the processing passes over to the resource assigning apparatus 13. The resource assigning control unit 27 first activates the assignment generation unit 22. The assignment generation unit 22 generates assignments for the variables from the control flow information and the data flow information (step a1). As a result the information shown in columns n10 to n15 of FIG. 24 is obtained. FIG. 24 shows how the assignments are assigned to resource elements in the assigning process executed as described below, while FIG. 25 shows the assignments which express the arguments (Ar), the function return values (Fr) and the broken registers (Br). FIG. 33(2) shows the live ranges as solid lines. The variable t26 in FIG. 33(2) and FIG. 24 has a plurality of live ranges which are distinguished from each other as the separate assignments t261, t262 and so on.

The information for the assignments shown in FIG. 24 is stored by the assignment storage unit 21 in FIG. 8.

Next, the resource assigning control unit 27 activates the live range interfering assignment detection unit 23. The live range interfering assignment detection unit 23 finds the assignments whose live ranges interfere with any of the assignments stored in the assignment storage unit 21 (step a2). As a result, the information in column n16 in FIG. 24 is obtained.

Next, the resource assigning control unit 27 activates the resource succession assignment detection unit 24. The resource succession assignment detection unit 24 finds the assignments which exhibit resource succession relations with any of the assignments stored in the assignment storage unit 21 (step a3). As a result, the information in column n17 in FIG. 24 is obtained.

Next, the resource assigning control unit 27 activates the assigning priority level calculator 25. The assigning priority level calculator 25 calculates the assigning priority level for each assignment according to the following equation (step a4).

assigning priority level=frequency of use=total loop-nesting depth level of use intermediate instructions/length of live range Next, the resource assigning control unit 27 activates the assigning resource element determination unit 26. The assigning resource element determination unit 26 assigns the assignments to resource elements in order starting with the assignment with the highest assigning priority level (step a5).

The following is an explanation of the processing of the assigning resource element determination unit 26 with reference to the flowchart for the resource element determination control unit 38 shown in FIG. 13.

a. Processing Content for the Assignment t262

First, the resource element determination control unit 38 determines whether there are any unassigned assignments and retrieves the assignment t262 which has the highest assigning priority level out of the unassigned assignments (step b1, b2).

Next, the resource element determination control unit 38 activates the assignable resource element detection unit 32 (step b3). The assignable resource element detection unit 32 stores the resource elements which have not been assigned an assignment whose live range interferes, these being (D0, D1, D2, D3, A0, A1, A2 and the multiple resource Mm), in the assigning candidate resource element storage unit 31 (FIG. 26B (a)). Next, the resource element determination control unit 38 activates the use cost calculator 34 (step b4).

The use cost calculator 34 finds the use cost for each resource element when the resource elements stored in the assigning candidate resource element storage unit 31 are used for assignment t262.

a-1. Processing Content for use intermediate instruction i10 of assignment t262 and resource element D0

Here, the processing content of the use cost calculator 34 will be explained with reference to the flowchart for the use cost calculation control unit 47 shown in FIG. 14.

The use cost calculation control unit 47 first has zeros saved as the content for each resource element in the use cost storage unit 35 (step c1).

Next, the use cost calculation control unit 47 retrieves the resource element D0 which is stored in the assigning candidate resource element storage unit 31 and which has not had its use cost calculated (step c2).

Next, the use cost calculation control unit 47 has zero stored in the total cost storage unit 46 (step c3).

Next, the use cost calculation control unit 47 retrieves the intermediate instruction i10 whose use cost is yet to be calculated for D0 out of the use intermediate instructions for assignment t262 (step c4).

Next, the use cost calculation control unit 47 generates the cost pattern (substitution, D0.N, D0.K, -) for the use intermediate instruction i10 and stores it in the pattern storage unit 43 (step c5).

Next, the use cost calculation control unit 47 matches the calculated cost table of FIG. 27A stored in the calculated cost storage unit 44 with the cost pattern stored by the pattern storage unit 43. In this case, matching is established with the cost entry shown in FIG. 27A (c), with a cost "0" being obtained and then added to the stored value of the total cost storage unit 46 (steps c6, c7).

Next, the use cost calculation control unit 47 judges that the item WORK in the matched cost entry has not been set and so executes step c4.

a-2. Processing Content for use intermediate instruction i11 of assignment t262 and resource element D0

Next, the use cost calculation control unit 47 retrieves the intermediate instruction i11, whose use cost is yet to be calculated for D0, out of the use intermediate instructions for assignment t262 (step c4), generates the cost pattern (ADDITION, D0.K, IM, YET) and stores it in the pattern storage unit 43. This is then matched with the cost entry in (b) in the calculated cost table, the cost "2" is obtained and is added to the stored value of the total cost storage unit 46. Following this, it is determined that the WORK item of the matched cost entry is not yet set so that step c4 is executed (steps c4–c8).

Next, the use cost calculation control unit 47 determines that there are no intermediate instructions for assignment t262 whose use cost is yet to be calculated for D0 and so stores the value stored in the total cost storage unit 46 in the use cost storage unit 35 as the use cost for resource element D0 (steps c4, 10).

a-3. Processing Content for use intermediate instructions i10, i11 of assignment t262 and resource element D1

Next, the use cost calculation control unit 47 retrieves the resource element D1 which is stored in the assigning candidate resource element storage unit 31 and which has not had its use cost calculated and, in the same way as with D0, retrieves the intermediate instructions i10, i11 in turn out of the use intermediate instructions for assignment t262, generates the respective cost patterns (SUBSTITUTION, D1.N, D0.K, -) and (ADDITION, D1.K, IM, YET), and matches them with cost entries (d) and (b) in the calculated cost table in FIG. 27A, giving the respective costs "1" and "2". The total of these, "3", is set as the stored value of the total cost storage unit 46 which is then set in the D1 column of the use cost storage unit 35 (steps c2–c8).

Next, the use cost calculation control unit 47 performs the same calculations as resource element D1 for resource elements D2, D3, A0, A1, and A2, thereby obtaining their use costs.

Next, the use cost calculation control unit 47 retrieves the resource element Mm whose use cost is yet to be calculated from the assigning candidate resource element storage unit 31, generates the respective cost patterns (SUBSTITUTION, Mn.N, D0.K, -) and (ADDITION, Mn.K, IM, YET) for the intermediate instructions i10, i11, matches these with the calculated cost table and so obtains the costs "2" and "3" for the matched entries show as (e) and (f) in FIG. 27A. The total of these, "5", is then set as the stored value of the total cost storage unit 46 which is set in the Mm column of the use cost storage unit 35 (steps c2–c7). The WORK item of the cost entry in FIG. 27A(f) is set, but since there is no spill resource element in intermediate instruction i11, a spill cost is not added to the total cost storage unit 46 (steps c8, c9).

Next, the use cost calculation control unit 47 determines that there are no resource elements stored in the assigning candidate resource element storage unit 31 whose use cost has not yet been calculated (step c2), and so the processing of the use cost calculator 34 is terminated, with the processing returning to step b4. It should be noted here that the content of the use cost storage unit 35 at this point is as shown in FIG. 27B(a).

The resource element determination control unit 38 refers to the use cost storage unit 35 and determines that the use cost of the multiple resource Mm is not the lowest (step b5) and so executes step b6.

The resource element determination control unit 38 refers to the use cost storage unit 35, determines that the resource element with the lowest use cost is resource element D0 and so assigns the assignment t262 to the resource element D0 (steps b6, b16, FIG. 26(a), FIG. 27B(a)).

(b),(c) Processing Content for Assignments t263, t264

Next, the resource element determination control unit 38 returns to step b1, executes the processing for the unassigned assignments t283, t264 in the same way as with assignment t262 and so assigns them to resource element D0 as shown in FIG. 26A (b) and (c).

(d) Processing Content for Assignments t265

Next, the resource element determination control unit 38 retrieves the assignment t265 which has the highest priority level out of the unassigned assignments (steps b1, b2).

Next, the resource element determination control unit 38 activates the assignable resource element detection unit 32, has the assignable resource elements (D0, D1, D2, D3, A0, A1, A2, Mm) obtained and stored in the assigning candidate resource element storage unit 31 (step b3, FIG. 26B(d)).

After this, the resource element determination control unit 38 activates the use cost calculator 34 and has the use costs of the resource elements in the assigning candidate resource element storage unit 31 calculated as shown in FIG. 27B(d) (step b4).

The resource element determination control unit 38 then determines that the multiple resource memory does not have the lowest use cost and so executes step b6 (step b5).

Next, the resource element determination control unit 38 determines that there is more than one lowest use cost resource element and so executes step b7 (step b6).

After this, the resource element determination control unit 38 deletes resource elements which do not have a lowest use cost from the assigning candidate group in the assigning candidate resource element storage unit 31 (step b7, (d-1) in FIG. 26B).

The resource element determination control unit 38 then activates the estimated profit calculator 36 with assignment t265 as its input and has a profit calculation performed for each resource element stored in the assigning candidate resource element storage unit 31 (step b8).

Process d1 onwards for assignment t265

The following is an explanation of the processing content of the estimated profit calculator 36 for assignment t265 with reference to the flowcharts for the profit estimation control unit 51 shown in FIGS. 15 and 16.

The profit estimation control unit 51 sets the contents of the profit storage unit 37 and the profit/loss storage unit 56 corresponding to each resource element to zero (step d2, FIG. 28C(d), FIG. 29A(d), FIG. 29B(d)).

After this, the profit estimation control unit 51 generates the tracker A1 for assignment t265 setting the items in A1 as A1.ASO=t265, A1.LNS=1, A1.RES=(D0, D1, D2, D3, A0, A1, A2) from FIG. 24. Next, as shown in (d-1) in FIG. 28C, tracker A1 is stored in the tracker storage unit 52 (step d3). In (d-1) in FIG. 28C, the tracker is expressed as (A1, t265, 1 (D0, D1, D2, D3, 10, A1, A2)), each item showing (tracker name, assignment, total live range length, assignment group).

Next, the profit estimation control unit 51 calls the profit/loss calculation routine.

Processing of Tracker A1

The following is an explanation of the processing content of the profit estimation control unit 51 for assignment t265 with reference to the flowchart in FIG. 16.

First, in steps e1, e2, tracker A1 is retrieved from the tracker storage unit 52 and is deleted from the tracker storage unit 52. Next, the assignment t265 which is the assignment item of tracker A1 is stored in the processed assignment storage unit 53 (FIG. 28C (d-2)), FIG. 29A (d-1).

Next, in step e3, since the assignment t265 which is the assignment item of tracker A1 has not been assigned, the processing proceeds to step e5.

After this, in steps e5–e9, no assignments are found for the group OS1, so that groups RS1, OS2, RS2 are empty and profit/loss values are not calculated (FIG. 29B (d-1)).

Following this, in step e10, since there are no assignments with resource succession relations with the assignment t265 which is the assignment item of tracker A1, no new tracker is generated. The processing returns to step e1.

In step e1, since the tracker storage unit 52 is empty as shown in FIG. 28C(d-2), the profit/loss calculation routine is terminated and the processing returns to step d4.

Process d5 onwards for assignment t265

The following is an explanation of the processing content of the profit estimation control unit 51 for assignment t265 with reference to steps d5 onwards in the flowchart in FIG. 15.

First, the profit estimation control unit 51 stores the value in the profit/loss storage unit 56 shown in FIG. 28B(d) in the profit storage unit 37 (step d5, FIG. 28A(d-1)).

Next, the profit estimation control unit 51 finds the group RS=(D0, D1, D2, D3, A0, A1, A2) of the resource elements which have a highest value stored in the profit storage unit 37 shown in FIG. 28A (d-1) (step d6).

After this, since there are a plurality of elements in the group RS, the profit estimation control unit 51 executes step d9 due to the presence of assignments p1, a3 which are unassigned and whose live ranges interfere with the live range of assignment t265 (steps d7, d8).

The profit estimation control unit 51 stores the group RS in the assigning candidate resource element storage unit 31, sets the contents of the profit storage unit 37 corresponding to each resource element, clears the tracker storage unit 52, and stores the assignments p1 and a3, which are unassigned and whose live ranges interfere with the live range of assignment t265, in the interfering assignment storage unit 55 (steps d9, d10, d11, FIG. 26B(d-2), FIG. 28C(d-3), FIG. 28A(d-2), FIG. 28C(d)).

Next, the profit estimation control unit 51 retrieves the assignment p1 from the interfering assignment storage unit 55 and deletes the assignment p1 from the interfering assignment storage unit 55 (step d12, step d13, FIG. 29C (d-1)).

Next, the content of the profit/loss storage unit 56 corresponding to each resource element is set to zero and the profit estimation control unit 51 clears the processed assignment storage unit 53 and the preset loss assignment storage unit 54 (step d14, FIG. 28(d-1), FIG. 29A(d-2), FIG. 29B (d-2)).

Following this, the profit estimation control unit 51 generates the tracker A2 for the assignment p1, setting the items in A2 as A2.ASO=p1, A2.LNS=1, A1.RES=D0, D1, D2, D3, A0, A1, A2 from FIG. 24. Next, as shown in (d-4) in FIG. 28C, tracker A2 is stored in the tracker storage unit 52 (step d15).

Next, the profit estimation control unit 51 calls the profit/ loss calculation routine.

The following is an explanation of the processing content of the profit estimation control unit 51 for assignment t265 with reference to the flowchart in FIG. 16.
Processing of tracker A2

First, in steps e1, e2, tracker A2 is retrieved from the tracker storage unit 52 and is deleted from the tracker storage unit 52. Next, the assignment p1 which is the assignment item of tracker A2 is stored in the processed assignment storage unit 53 (FIG. 28C (d-5)), FIG. 29A (d-3).

Next, in step e3, since the assignment p1 which is the assignment item of tracker A2 has not been assigned, the processing proceeds to step e5.

After this, in steps e5–e6, group OS1=(Ar11, Fr1, Ar12, Arp22, Fr2, Ar13, Ar23, Fr3, Br1, Br2, Br3, t262, t263, t264) and group RS1=(D0, D1, A0) are found.

Next, in steps e7, e8, the preset loss assignment storage unit 54 is empty as shown in FIG. 29B (d-2), so that group OS2=(Ar11, Fr1, Ar12, Ar22, Fr2, Ar13, Ar23, Fr3, Br1, Br2, Br3, t262, t263, t264) and group RS2=(D0, D1, A0) are found, and the preset loss assignment storage unit 54 becomes as shown in FIG. 29B(d-3).

Following this, in step e9, the profit/loss value =1/A2.LNS is found, and is subtracted from the content corresponding to resource elements D0, D1, A0 in the profit/loss storage unit 56 in (d-1) in FIG. 28B (FIG. 28B (d-2)).

Next, since in step e10 there are no resource elements which have resource succession relations with assignment p2 which is the assignment item in tracker A2, no new tracker is generated. The processing returns to step e1.

Here, since the content of the tracker storage unit 52 is now empty, the processing in the profit/loss calculation routine is terminated and the processing returns to d16.
Process d17 onwards for assignment t265 (Part 1)

The following is an explanation of the processing content of the profit estimation control unit 51 for assignment t265 with reference to steps d17 onwards in the flowchart in FIG. 15.

First, the profit estimation control unit 51 subtracts the product of the value stored in the profit/loss storage unit 56 shown as (d-2) in FIG. 28B and the assigning priority level "0.27" of assignment p1 from the profit storage unit 37. This is to say, when the profit loss values are minus as in (d-2) in FIG. 28B, the values shown in (d-3) in FIG. 28A are added. Next, the processing returns to step d12 (step d17).

Next, the profit estimation control unit 51 retrieves the assignment a3 from the interfering assignment storage unit 55 (step d12, step d13, FIG. 29C(d-2)).

Next, the content of the profit/loss storage unit 56 corresponding to each resource element is set to zero and the profit estimation control unit 51 clears the processed assignment storage unit 53 and the preset loss assignment storage unit 54 (step d14, FIG. 28B(d-3), FIG. 29A(d-4), FIG. 29B(d-4)).

Following this, the profit estimation control unit 51 generates the tracker A3 for the assignment a3, setting the items in A3 as A3.ASO=a3, A3.LNS=1, A3.RES=(D0, D1, D2, D3, A0, A1, A2) from FIG. 24 and (d-2) in FIG. 26B. Next, as shown in (d-6) in FIG. 28C, tracker A3 is stored in the tracker storage unit 52 (step d15).

Next, the profit estimation control unit 51 calls the profit/ loss calculation routine (step d16).

The following is an explanation of the processing content of the profit estimation control unit 51 for assignment t265 with reference to the flowchart in FIG. 16.
Processing of tracker A3

First, in steps e1, e2, tracker A3 is retrieved from the tracker storage unit 52 and is deleted from the tracker storage unit 52. Next, the assignment a3 which is the assignment item of tracker A3 is stored in the processed assignment storage unit 53 (FIG. 28C (d-7)), FIG. 29A (d-5).

Next, in step e3, since the assignment a3 which is the assignment item of tracker A3 has not been assigned, the processing proceeds to step e5.

After this, in steps e5–e9, since group OS1 is empty, groups RS1, OS2, RS2 are empty and profit/loss values are not calculated (FIG. 29B (d-5)).

Following this, in step e10, since assignments t263, t264, x2, and x3 have resource succession relations with the assignment a3 which is the assignment item of tracker A3, new trackers A4, A5, A6 and A7 are generated as shown in FIG. 28C (d-8). Here, the live range length of each tracker is A3.LNS (=1) plus live range length for assignment a3 (=3) making a total of 4. The processing then returns to step e1.
Processing of tracker A4

First, in steps e1, e2, tracker A4 is retrieved from the tracker storage unit 52 and is deleted from the tracker storage unit 52. Next, the assignment t263 which is the assignment item of tracker A4 is stored in the processed assignment storage unit 53 (FIG. 28C (d-9)), FIG. 29A (d6).

Next, in step e3, since the assignment t263 which is the assignment item of tracker A4 has already been assigned to resource element D0, the processing proceeds to step e4.

In step e4, the profit/loss value=1/A4.LNS=0.25 is found and is added to the content for resource element D0 in the profit/loss storage unit 56, before the processing returns to step e1 (FIG. 28B(d-4)).
Processing of tracker A5

Next, tracker A4 is processed in the same way as tracker A4 so that the content of the tracker storage unit 52 is transformed into (d-10) in FIG. 28C, the content of the profit/loss storage unit 56 is transformed into (d-5) in FIG. 28B, and the content of the processed assignment storage unit 53 is transformed into (d-7) in FIG. 29A (steps e1–e4, step e11).
Processing of tracker A6

First, in steps e1, e2, tracker A6 is retrieved from the tracker storage unit 52 and is deleted from the tracker storage unit 52. Next, the assignment x2 which is the assignment item of tracker A6 is stored in the processed assignment storage unit 53 (FIG. 28C (d-11)), FIG. 29A (d-8).

Next, in step e3, since the assignment x2 which is the assignment item of tracker A6 has not been assigned, the processing proceeds to step e5.

After this, in steps e5–e6, group OS1=(Ar12, Ar22, Fr2, t263, Br2) and group RS1=(D0, D1, A0) are found.

Next, in steps e7, e8, the preset loss assignment storage unit 54 is empty as shown in FIG. 29B (d-5), so that group OS2=(Ar12, Ar22, Fr2, t263, Br2) and group RS2=(D0, D1, A0) are found, and the preset loss assignment storage unit 54 becomes as shown in FIG. 29B(d-6).

Following this, in step e9, the profit/loss value =1/A6.LNS=0.25 is found, and is subtracted from the values in (d-5) in the profit/loss storage unit 56 which correspond to resource elements D0, D1, A0 (FIG. 28B (d-6)).

Next, in step e10 the only assignment which has resource succession relations with assignment x2 and which is an assignment item in tracker A6 is a3. Since assignment a3 has already been stored in the processed assignment storage unit 53 as shown in (d-8) in FIG. 29A, no new tracker is generated. The processing returns to step e1.
Processing of tracker A7

Tracker A7 is next processed in the same way as tracker A6, so that the content of the tracker storage unit 52 is transformed into (d-12) in FIG. 28C, the content of the profit/loss storage unit 56 is transformed into (d-7) in FIG. 28B, and the content of the processed assignment storage unit 53 is transformed into (d-9) in FIG. 29A (steps e1–e4, step e10).

Next, in step e10, since the content of the tracker storage unit 52 is empty as shown in (d-12) in FIG. 28c, the processing in th e prof it/lo ss calculation routine is terminated and the processing returns to step d16.
Process d17 onwards for assignment t265 (Part 2)

The following is an explanation of the processing content of the profit estimation control unit 51 for assignment t265 with reference to steps d17 onwards in the flowchart in FIG. 15.

First, the profit estimation control unit 51 subtracts the product of the value stored in the profit/loss storage unit 56 shown as (d-7) in FIG. 28 B and the assigning priority level "2.67" of assignment a3 from the profit storage unit 37. This is to say, when the profit loss value is minus as in (d-7) in FIG. 28B, the values shown in (d-4) in FIG. 28A are added. Next, the processing returns to step d12 (step d17).

Next, since the profit estimation control unit 51 finds that the interfering assignment storage unit 55 is empty, it terminates the processing of the estimated profit calculator 36 and the processing returns to step b8.

The following is a further explanation of the processing content of the resource classified cost calculator 39 with reference to steps b9 onwards in the flowchart in FIG. 14.
Process b9 onwards for assignment t265

First, the resource element determination control unit 38 finds the group RS={D0, A0} of resource elements with a highest value stored in the profit storage unit 37 as shown in (d-4) in FIG. 28A and stores this group RS in assigning candidate resource element storage unit 31 (FIG. 26B (d-3), step b9).

Next, the resource element determination control unit 38 obtains the group RES={AR, DR} from the content of the group RS and stores the group RES in the evaluated resource storage unit 41 (step b10, FIG. 31C(d)).

Next, the resource element determination control unit 38 executes step b12 since there are two resources in the group RES (step b11).

Following this, the resource element determination control unit 38 activates the resource classified cost calculator 39 (step b12).
Processing of assignment t265 by the resource classified cost calculator 39

The following is an explanation of the processing content of the resource classified cost calculator 39 with reference to the flowchart in FIG. 17.

First, the resource classified cost calculation control unit 501 resets the contents of the resource classified cost storage unit 40 and the resource classified total cost storage unit 505 corresponding to each resource element to zero (step f1, FIG. 30A (d), FIG. 30B (d)).

Next, the resource classified cost calculation control unit 501 clears the tracker storage unit 504 and the processed assignment storage unit 506 (step f2, (d) in FIG. 30C, (d) in FIG. 31A).

Following this, the resource classified cost calculation control unit 501 generates the tracker rA1 for the assignment t265, with the elements in rA1 being set so that the assignment of tracker rA1=rA1.ASO=t265 and total live range length of tracker rA1=rA1.LNS=1. The generated tracker rA1 is then stored in the tracker storage unit 504 (step f3). This tracker is shown as (rA1, t265, 1) in (d-1) in FIG. 30C, each item signifying (tracker name, assignment, total length of live range).

Next, the resource classified cost calculation control unit 501 calls the lower order cost value calculation routine (step f4).

The following is an explanation of the processing content of the resource classified cost calculator 39 for assignment t265 with reference to the flowchart in FIG. 18.
Processing of Tracker rA1

First, in steps g1, g2, tracker rA1 is retrieved from the tracker storage unit 504 and is deleted from the tracker storage unit 504. Next, the assignment t265 which is the assignment item of tracker rA1 is stored in the processed assignment storage unit 506 (FIG. 30C (d-2), FIG. 31A (d-1)).

Next, in step g3, since there are assignable resources AR and DR for t265 which are also stored in the evaluated resource storage unit 41 as in (d) in FIG. 31C, the processing from step g4 onwards is executed first for resource AR.
Processing for resource AR First in step g4, the use intermediate instruction i27 of assignment t265 is retrieved and in step g5, the cost pattern (indirect reference, An, YET, -) is generated and stored in the cost pattern storage unit 502 (FIG. 31B (d)).

Next, in step g6, the cost entry (g) in FIG. 27A which matches the cost pattern (indirect reference, An, YET) is retrieved.

Following this, in step g7, the lower order cost value 2/1=2 is calculated from the cost "2" of the retrieved cost entry and the total length of live range rA1.LNS for tracker rA1.

In step g8, the calculated lower order cost value is added to the content for the resource AR in the resource classified total cost storage unit 505 ((d-1) in FIG. 30B).

The processing then returns to step g4, and the intermediate instruction i28 of assignment t265 is retrieved, the cost pattern (ADDITION, YET, An, YET) is generated and the matching cost pattern (f) in FIG. 27A is retrieved. The cost of this cost pattern is "3", so that lower order cost value= 3/1=3 is calculated from the this cost and from the total live range length rA1.LNS of tracker rA1, with this value being added to the content for the resource AR in the resource classified total cost storage unit 505, so that its content becomes as shown in (d-2) in FIG. 30B.

Another return to step g4 is then performed and since all of the intermediate instructions for assignment t265 have already been retrieved, the processing returns to step g3.

Processing for resource DR

First, a cost calculation is performed for the resource DR in the same way as resource AR, and since the cost entries (g) and (f) in FIG. 27A are matched, the resource classified total cost storage unit 505 becomes as shown in (d-3) of FIG. 30B.

Next, a return to step g3 is performed since the cost calculation has been completed for all of the resources AR and DR stored in the evaluated resource storage unit 41. The processing advances to step g9.

In step g9, it is found that there are no assignments having resource succession relations with assignment t265, so that no trackers are generated.

Next, there is a return to step g1 but, as shown in (d-29 in FIG. 30C, since tracker storage unit 504 is empty, the lower order cost calculation routine is terminated and a return to f4 is performed.

The following is a further explanation of the processing of assignment t265 by the resource classified cost calculator 39 with reference to step f5 onwards in the flowchart in FIG. 17.

Processing of Assignment t265 in Step f5 Onwards

First, in step f5, the values stored in the resource classified total cost storage unit 505 are stored in the resource classified cost storage unit 40.

In step f6, the resources AR, DR are found to have the lowest cost value in the resource classified cost storage unit 40. These resources are then stored in the evaluated resource storage unit 41 as shown in (d-1) in FIG. 31C.

In step f7, step f8 is performed since a plurality of resources are found to have the lowest cost value in the resource classified cost storage unit 40.

In step f8, step f9 is performed since there are two assignments p1 and a3 whose live ranges interfere with that of assignment t265.

In steps f9 and f10, the contents of the resource classified cost storage unit 40 are reset to zero, the tracker storage unit 504 is cleared, and only the assignments p1 and a3 are stored in the interfering assignment storage unit 507 (FIG. 30A(d-2), FIG. 30C(d-3), FIG. 31D(d)).

In steps f11, f12 and f13, assignment p1 is retrieved from the interfering assignment storage unit 507, the content of the resource classified total cost storage unit 505 is reset to zero and the processed assignment storage unit 506 is cleared (FIG. 31D(d-1), FIG. 30B(d-4), FIG. 31A(d-2)).

In step f14, a tracker rA2 is generated for the retrieved assignment p1, with the items in rA2 being set as rA2.ASO= p1, rA2.LNS=1. This generated tracker rA2 is then stored in tracker storage unit 504.

In step f15, the resource classified cost calculation control unit 501 calls the lower order cost value calculation routine.

The following is an explanation of the processing content of the resource classified cost calculator 39 for assignment t265 with reference to the flowchart in FIG. 18.

Processing of Tracker rA2

First, in steps g1, g2, tracker rA2 is retrieved from the tracker storage unit 504 and is deleted from the tracker storage unit 504. Next, the assignment p1 which is the assignment item of tracker rA2 is stored in the processed assignment storage unit 506 (FIG. 30C (d-5), FIG. 31A (d3)).

Next, in step g3, since there are assignable resources AR and DR for p1 which ar e also stored in the evaluated resource storage unit 41 as in FIG. 31C (d-1), the processing from step g4 onwards is executed first for resource AR.

Processing for resource AR

First, the u se intermediate instructions i5, i27, i29, i30 of assignment p1 are retrieved and in step g5, the respective cost patterns (SUBSTITUTION, An, YET, -), (INDIRECT REFERENCE, YET, An, -), (ADDITION, An, IM, SAME LEFT), (INDIRECT REFERENCE, YET, An, -) are generated and are matched with the respective cost entries (h), (j), (a) and (i) in FIG. 27A, with the lower order cost value being found using the total live range length of tracker rA2.LNS and the contents of the resource classified total cost storage unit 505 corresponding to the resource AR being updated as shown in FIG. 30B(d-5) (steps g4-g8).

Processing for resource DR

Next, the processing returns to g3 and the respective cost patterns for the use intermediate instructions i5, i27, i29, i30 of assignment p1, (SUBSTITUTION, Dn, YET, -), (INDIRECT REFERENCE, YET, Dn, -), (ADDITION, Dn, IM, SAME LEFT), (INDIRECT REFERENCE, YET, Dn, -) are generated and are matched with the respective cost entries (h), (j), (a) and (i) in FIG. 27A, with the lower order cost value being found using the total live range length of tracker rA2.LNS and the contents of the resource classified total cost storage unit 505 corresponding to the resource DR being updated as shown in FIG. 30B(d-6) (steps g4-g8).

The process then returns again to step g3, but since the resources which satisfy the selection criteria have all been retrieved, the process advances to step g9.

Since it is found in step g9 that no assignments have resource succession relations with assignment p1, no trackers are generated and the processing returns to step g1.

In step g1, since the tracker storage unit 504 is empty as shown in FIG. 30C(d-5), the lower order cost calculation routine is terminated and the processing returns to step f15.

The following is a further explanation of the processing of assignment t265 by the resource classified cost calculator 39 with reference to steps f16 onwards in the flowchart in FIG. 17.

Processing of Assignment t265 in Step f16 Onwards (Part 1)

In step f16, the contents of the resource classified cost storage unit 40 for the resources AR, DR are updated using the value stored in the profit/loss storage unit 56 and the priority level 0.27 of assignment p1, as shown in FIG. 30A(d-3).

Next, in steps f11, f12 and f13, the assignment a3 is retrieved from the interfering assignment storage unit 507, the content of the resource classified total cost storage unit 505 is reset to zero and the processed assignment storage unit 506 is cleared (FIG. 31D(d-2), FIG. 30B(d-7), FIG. 31A(d-4)).

In step f14, a tracker rA3 is generated for the retrieved assignment a3, with the items in rA3 being set as rA3.ASO= a3, rA3.LNS=1. This generated tracker rA3 is then stored in tracker storage unit 504.

In step f15, the resource classified cost calculation control unit 501 calls the lower order cost value calculation routine.

The following is an explanation of the processing content of the resource classified cost calculator 39 for assignment t265 with reference to the flowchart in FIG. 18.

Processing of Tracker rA3

First, in steps g1, g2, tracker rA3 is retrieved from the tracker storage unit 504 and is deleted from the tracker storage unit 504. Next, the assignment a3 which is the assignment item of tracker rA3 is stored in the processed assignment storage unit 506 (FIG. 30C (d-7), FIG. 31A (d-5)).

Next, in step g3, since there are assignable resources AR and DR for a3 which are also stored in the evaluated resource storage unit 41 as in FIG. 31C (d-1), the processing from step g4 onwards is executed first for resource AR.

Processing for resource AR

First, in step g5 the respective cost patterns (ADDITION, YET, YET, DIFFERENT), (ADDITION, YET, YET, DIFFERENT), (ADDITION, An, YET, DIFFERENT) for the use intermediate instructions i20, i26, i28 of assignment a3 are generated and are matched with the respective cost entries (k), (k), and (l) in FIG. 27A, with the contents of the resource classified total cost storage unit 505 corresponding to the resource AR being updated as shown in FIG. 30B(d-8) (steps g4–g8).

Processing for resource DR

Next, the processing returns to g3, the resource DR is retrieved and is processed in the same way as the resource AR, so that the contents of the resource classified total cost storage unit 505 corresponding to the resource DR are updated as shown in FIG. 30B(d-9) (steps g4–g8).

Next, the processing returns to step g3, but since the resources which satisfy the selection criteria have all been retrieved, the process advances to step g9.

In step g9, the unassigned assignments x2, x3 are found to have resource succession relations with assignment a3 and to have not been stored in the processed assignment storage unit 506 as shown in FIG. 31A(d-5) so that the trackers rA4 and rA5 are generated as shown in FIG. 30C(d-8).

Processing of Tracker rA4

First, in steps g1, g2, tracker rA4 is retrieved from the tracker storage unit 504 and is deleted from the tracker storage unit 504. Next, the assignment x2 which is the assignment item of tracker rA4 is stored in the processed assignment storage unit 506 (FIG. 30C (d-9), FIG. 31A (d6)).

Next, in step g3, since there are assignable resources AR and DR for assignment x2 which are also stored in the evaluated resource storage unit 41 as in FIG. 31C (d-1), the processing from step g4 onwards is executed first for resource AR.

Processing for resource AR

First, in step g5 the respective cost patterns (ADDITION, YET, IM, DIFFERENT), (ADDITION, An, IM, YET), (ADDITION, YET, An, YET) for the use intermediate instructions i12, i13, i20 of assignment x2 are generated and are matched with the respective cost entries (m), (b), and (f) in FIG. 27A. The cost value "8" is found, and the lower order cost value is calculated using the tracker rA4 total length of live range rA4.LNS=4 so as to give a result of 8/4=2, with this value being used to update the contents of the resource classified total cost storage unit 505 corresponding to the resource AR as shown in FIG. 30B(d-10) (steps g4–g8).

Processing for resource DR

Next, the processing returns to g3, the resource DR is retrieved and is processed in the same way as the resource AR, so that the contents of the resource classified total cost storage unit 505 corresponding to the resource DR are updated as shown in FIG. 30B(d-11) (steps g4–g8).

Next, the processing returns to step g3, but since the resources which satisfy the selection criteria have all been retrieved, the process advances to step g9.

In step g9, only the assignment a3 is found to have resource succession relations with assignment x2 but since this has already been stored in the processed assignment storage unit 506 as shown in FIG. 31A(d-6), no new trackers are generated and the processing returns to step g1.

Processing of Tracker rA5

First, in steps g1, g2, tracker rA5 is retrieved from the tracker storage unit 504 and is deleted from the tracker storage unit 504. Next, the assignment x3 which is the assignment item of tracker rA5 is stored in the processed assignment storage unit 506 (FIG. 30C (d-10), FIG. 31A (d-7)).

Next, in the same way as assignment x2, the use intermediate instructions of assignment x3 are found to be i13 and i26, so the lower order cost values of resources AR and DR are found and the contents of the resource classified total cost storage unit 505 corresponding to the resource DR are updated as shown in FIG. 30B(d-12) (steps g3–g8).

In step g9, only the assignment a3 is found to have resource succession relations with assignment x3 but, since this has already been stored in the processed assignment storage unit 506 as shown in FIG. 31A(d-6), no new trackers are generated and the processing returns to step g1.

In step g1, since the tracker storage unit 504 is empty as shown in FIG. 30C(d-10), the lower order cost calculation routine is terminated and the processing returns to step f15.

The following is a further explanation of the processing of assignment t265 by the resource classified cost calculator 39 with reference to steps f16 onwards in the flowchart in FIG. 17.

Processing of Assignment t265 in Step f16 Onwards (Part 2)

In step f16, the contents of the resource classified cost storage unit 40 for the resources AR, DR are updated using the value stored in the profit/loss storage unit 56 and the priority level 2.67 of assignment a3, as shown in FIG. 30A(d-4).

Next, the processing returns to step f11 and since the interfering assignment storage unit 507 is empty as shown in FIG. 31D(d-2), the processing by the resource classified cost calculator 39 is terminated and a return to step b12 is executed.

The following is an explanation of the processing content of the resource classified cost calculator 39 in steps b13 onwards with reference to the flowchart in FIG. 14.

Process b13 onwards or assignment t265

In step b13, assignment t265 is assigned to the resource element D1 stored in the assigning candidate resource element storage unit 31 as shown in FIG. 26B(d-3) which is also a resource element stored in the evaluated resource storage unit 41 as shown in FIG. 31C(d-1), said resource element D1 having the lowest cost stored in the resource classified cost storage unit 40 as shown in FIG. 30A(d-4).

By executing these kinds of processes for all of the assignments, each assignment is assigned to a resource element (Note that the processes described above for assignment t265 will not be explained for the remaining assignments).

By performing the operations described above, the present invention makes a very thorough examination of the resource succession relations of each assignment in the program, so that a more ideal assigning of resources can be achieved.

Here, a "smart" assigning can be achieved wherein assignments whose loop-nesting depth level is deep can be prioritized and assigned to registers with remaining assignments with progressively shallower loop-nesting depth levels being distributed among these registers. In the same way, a "smart" assigning can be achieved wherein assignments whose frequency of use is high can be prioritized and assigned to registers with remaining assignments with progressively lower frequencies of use being distributed among these registers. Also, a "smart" assigning can be achieved wherein assigning of assignments which are predetermined by an operator can be made to resources such as argument registers, return value registers and broken registers.

Since the assigning result is an arrangement which has been thoroughly refined, an improvement can be made in the program size and execution size of the machine language program which is finally generated.

The above embodiment describes the details of a calculation process whose intricacy increases in stages by being composed of a use cost value calculation, a profit/loss value calculation and a lower order cost value calculation which are executed in that order, though it should be obvious that the present invention also includes modifications of this arrangement. Three representative modifications are described below.

Modification 1

When the reduction of execution time is regarded as more important than the program size of the object code generated by the compiler, then if the depth of the loop nest level containing the intermediate instruction i for assignment x or number of executions of i is known, a product of this number of executions and the cost of the cost entry e1 retrieved in step c7 may be found and added to the total cost storage unit (Note that depth of loop-nesting depth level may be detected in step c4 of the flowchart for the use cost calculation control unit 47 in FIG. 15 and then input into the use cost calculator 34).

Modification 2

When there are a plurality of resource elements in the group RS obtained in step b9, then, in the lower order cost value calculation of the resource classified cost calculation in step b12, the same processing as in the use cost calculation in step b4 may be executed so that the assignment x may be assigned to a resource element which is more optimally chosen from the group RS.

When doing so, first the processes in steps g5 to g9 are replaced with same processes as steps c5 to c9 so that the use cost is calculated, with in FIGS. 17 and 18, the resource classified total cost storage unit 505 being replaced with the total cost storage unit 46, the resource classified cost storage unit 40 being replaced by the use cost storage unit 35 and the lower order cost value being replaced by the use cost. Also, in step b11, it is determined in step b11 whether there are a plurality of resource elements in group RS.

Also, step b12 and steps f1 to f6 find the use cost when the assignment x1, which has resource succession relations with assignment x or which has indirect resource succession relations with assignment x and is yet unassigned, is assigned to the resource elements in group RS, with the calculated use cost being divided by the length of live range from assignment x to assignment x1 and the result being stored in the use cost storage unit 35.

Additionally, in step f7, when there are a plurality of resource elements whose use cost stored in the use cost storage unit 35 has a lowest value, step f8 is performed and in steps f8 to f11, the use cost of assigning assignment x3, which either has resource succession relations with an unassigned assignment x2 whose live range interferes with the live range of assignment x or which has indirect resource succession relations with assignment x2 and is yet to be assigned, to resource elements belonging to the group RS is found, with the calculated cost being divided by the length of live range from assignment x2 to assignment x3. The result is then multiplied by −1 and is stored in the use cost storage unit 35.

The stored content of the use cost storage unit 35, which stores the use cost as described above, is then referenced and assignment x is assigned to the resource element whose stored value is the lowest.

Modification 3

In the embodiment, profit/loss values were calculated using a total length of live range, although it is also possible to use simply the number of assignments. As one example, in FIG. 21, there are three assignments (assignments x, x5 and x6) between assignment x and assignment x2, so that the profit/loss value of the resource element D1 to which assignment x2 has been assigned may be set at ⅓.

Modification 4

In the embodiment, profit/loss values were calculated so as to give both positive and negative values with a final profit/loss value then being found by summing such values, although these profit/loss values may be used separately, with one profit/loss value being used to identify the registers which are candidates for assigning and another profit/loss value being used to determine the assigning register. As one example, when determining the assigning register for assignment x in FIG. 22, the resource elements which are assignable for assignment x are set as D1, D2 and D3. Here, the resource elements with a negative profit/loss value of lowest magnitude can be first set as the assigning candidates for assignment x, with the profit/loss values of resource elements with no negative profit/loss values being set at zero. Accordingly, in the cited example, the negative profit/loss values of resource elements D2 and D3 are set at zero. Here, since the negative profit loss value of resource element D1 is Px(L2+L3), the resource elements with the negative profit/loss values of lowest magnitude are D2 and D3, so that these resource elements are set as the assigning candidates for assignment x.

Next, the positive profit/loss values are found and assignment x is assigned to the resource element with the highest positive profit/loss value, with the profit/loss values of resource elements with no positive profit/loss values being set at zero. Accordingly, in the cited example, the positive profit/loss value of resource element D3 is set at zero, so that assignment x is assigned to resource element D2 which has the highest positive profit/loss value.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A resource assigning apparatus to be used by a compiler which compiles a program written in a high-level language into a machine language program, wherein the resource assigning apparatus generates a plurality of assignments, each of which is a combination of a variable in the program written in the high-level language and a live range, and assigns the generated assignments in order to resource elements of hardware resources such as registers and memory, the resource assigning apparatus comprising:

profit/loss value calculation means for calculating, for each resource element, a profit/loss value which shows a degree of suitability of a resource element for a next assignment to be assigned, based on a positional relationship between live ranges of any assignments which have already been assigned and a live range of the next assignment;

assigning means for assigning the next assignment to any of the resource elements based on a value of the profit/loss value calculated for each resource element; and control means for repeatedly activating the profit/loss value calculation means and the assigning means until every assignment has been assigned.

2. The resource assigning apparatus of claim 1 further comprising positional relationship determination means for determining the positional relationships between all of the assignments in the program written in the high-level language, wherein the positional relationship determination means includes:

interfering relation determination means for determining whether the live range of the next assignment interferes with a live range of any assignment which has already been assigned to a resource element; and assigned-next continuation determination means for determining whether the live range of the next assignment is continuous with a live range of any assignment which has already been assigned to a resource element, wherein the profit/loss value calculation means includes a first increase unit for increasing, when the assigned-next continuation determination means determines that the live range of the next assignment is continuous with an assigned assignment, a profit/loss value of the resource element to which the assigned assignment has been assigned in accordance with an extent of a live range length from the assigned assignment to the next assignment, and wherein the assigning means determines not to assign the next assignment to a resource element which has been assigned an assignment determined by the interfering relation determination means to have a live range which interferes with the live range of the next assignment, and instead determines to assign the next assignment to a resource element, out of all resource elements which have not been determined to have an interfering live range, which has a highest profit/loss value.

3. The resource assigning apparatus of claim 2, wherein the positional relationship determination means further includes:

first assigned assignment interference detection means for detecting an unassigned assignment whose live range interferes with a live range of any assigned assignment;

unassigned-next continuation determination means for determining whether the live range of the unassigned assignment detected by the first assigned assignment interference detection means is continuous with the live range of the next assignment; and a first reduction unit for reducing, when it is determined by the unassigned-next continuation determination means that the live ranges are continuous, a profit/loss value of a resource element which has been assigned an assigned assignment detected as interfering with the unassigned assignment, in accordance with an extent of live range length from the unassigned assignment detected by the first assigned assignment interference detection means to the next assignment.

4. The resource assigning apparatus of claim 3, wherein, when a plurality of unassigned assignments are determined by the first assigned assignment interference detection means, the unassigned-next continuation determination means determines whether a live range of any of the plurality of unassigned assignments determined by the first assigned assignment interference detection means is continuous with the live range of the next assignment.

5. The resource assigning apparatus of claim 3, further including priority level storage means for storing a priority level corresponded to each assignment, the priority level reflecting at least one of a frequency of use of an assignment in the program and a loop-nesting depth level of a live range of an assignment, wherein the profit/loss value calculation means and the assigning means determine which assignment is a next assignment in order of priority levels stored in the priority level storage means.

6. The resource assigning apparatus of claim 5, wherein the positional relationship determination means further includes:

next assignment interfering assignment detection means for detecting, when there is a plurality of resource elements whose profit/loss values calculated by the profit/loss value calculation means are of a same value, any unassigned assignments whose live range interferes with the live range of the next assignment; and unassigned-assigned continuation determination means for determining whether a live range of an assignment detected by the next assignment interfering assignment detection means is continuous with the live range of an assigned assignment, wherein the profit/loss calculation means further includes:
  a priority level detection unit for detecting a priority level of an assignment detected by the next assignment interfering assignment detection means;
  a first extent calculation unit for calculating an extent of live range length from the unassigned assignment detected by the next assignment interfering assignment detection means to the assigned assignment determined by the unassigned-assigned continuation determination means to have a live range which continues with a live range of the detected unassigned assignment; and
  a second reduction unit for multiplying the priority level detected by the priority level detection unit by the extent of live range length calculated by the first extent calculation unit and for reducing a profit/loss value of a resource element to which the determined assigned assignment is assigned in accordance with a multiplication result.

7. The resource assigning apparatus of claim 6, wherein the positional relationship determination means further includes:

second assigned assignment interference detection means for detecting an unassigned assignment whose live range interferes with a live range of any assigned assignment; and unassigned-unassigned continuation determination means for determining whether a live range of an unassigned assignment detected by the next assignment interfering assignment detection means is continuous with a live range of an unassigned assignment detected by the second assigned assignment interference detection means, and wherein the profit/loss value calculation means further includes:

a second extent calculation unit for calculating an extent of live range length from an unassigned assignment detected by the next assignment interfering assignment detection means to the unassigned assignment detected by the second assigned assignment interference detection means to have a live range which interferes with a live range of an assigned assignment; and a second increase unit for multiplying the priority level detected by the priority level detection unit by the extent of live range length calculated by the second extent calculation unit and for increasing a profit/loss value of a resource element to which the detected assigned assignment is assigned in accordance with a multiplication result.

8. The resource assigning apparatus of claim 7, wherein, when a plurality of unassigned assignments are determined by the second assigned assignment interference detection means, the unassigned-unassigned continuation determination means determines whether any unassigned assignment, out of the determined plurality of unassigned assignments, has a live range which is continuous with the live range of the next assignment.

9. The resource assigning apparatus of claim 7, further including a profit/loss value storage unit for storing each resource element corresponded with an initial value of a profit/loss value, wherein the first and second increase units increase a profit/loss value of each resource element stored in the profit/loss value storage unit and the first and second reduction units reduce a profit/loss value of each resource element stored in the profit/loss value storage unit.

10. The resource assigning apparatus of claim 7, further including:

estimation means for estimating what will happen to a total value, which expresses at least one of a number of execution cycles and a code size of all definition instructions in which the next assignment is defined and use instructions in which the assignment is used, when assigning to resource elements belonging to each resource by calculating estimated values for the total value for pairings of the next assignment and each resource element; and resource element singular/plural determination means for comparing estimated values which are a result of estimating for each resource element and determining whether a plurality of resource elements have a lowest estimated value or whether only one resource element has a lowest estimated value, wherein, when the resource element singular/plural determination means determines that only one resource element has a lowest estimated value, the assigning means assigns the next assignment to the resource element determined to have the lowest estimated value, while when the resource element singular/plural determination means determines that a plurality of resource elements have a lowest estimated value, the assigning means assigns the next assignment to a resource element out of the plurality of resource elements with a lowest estimated value which has a highest profit/loss value.

11. The resource assigning apparatus of claim 10, wherein the estimation means includes:

an instruction pattern output unit for outputting an instruction pattern, which is information which uses an instruction format of machine language instructions and which expresses definition instructions and use instructions of an assignment in a program, for every definition instruction and use instruction of the assignment in the program;

a cost storage unit for storing a cost showing at least one of a number of execution cycles and a code size of definition instructions and use instructions when resource elements of each resource are used as each operand in a machine language instruction, corresponded to each instruction pattern obtained as an output from the instruction pattern output unit; and a cost totalling unit for retrieving a cost from the cost storage unit corresponding to the output instruction pattern, for totalling retrieved costs for each resource element and for setting the totalled costs as estimated values.

12. The resource assigning apparatus of claim 10, further including prediction means for predicting, when a profit/loss value calculated by the profit/loss value calculation means for resource elements belonging to a plurality of resources have a same value, a resource element which when used for assigning the next assignment allows a most favorable assigning of all unassigned assignments which have a lower priority level than the next assignment, wherein the assigning means assigns the next assignment to the resource element predicted by the prediction means.

13. The resource assigning apparatus of claim 12, wherein the prediction means includes:

first lower order assignment detection means for detecting all unassigned assignments which have a live range which is continuous with the live range of the next assignment and which also have a priority level lower than a priority level of the next assignment;

first estimation means for estimating what will happen to a total value, which expresses at least one of a number of execution cycles and a code size of all definition instructions in which the next assignment is defined and use instructions in which the assignment is used, when assigning each assignment detected by the first lower order assignment detection means to each resource element, by calculating estimated values for the total value for pairings of each assignment detected by the first lower order assignment detection means and each resource element;

first live range length calculation means for calculating a continuous length of live range for each assignment detected by the first lower order assignment detection means, the length of live range being between the next assignment and each assignment detected by the first lower order assignment detection means;

first weighting means for weighting the estimated value calculated by the first estimation means for pairings of each detected assignment and each resource element using the calculated length of live range;

first totalling means for totalling estimated values weighted by the first weighting means for each resource element; and first optimal resource element determination means for determining that a resource element, which when used for assigning the next assignment allows a most favorable assigning of all unassigned assignments which have a lower priority level than the next assignment, is a resource element which has a lowest total value totalled by the first totalling means, wherein a resource element determined as a determination result of the first optimal resource element determination means is set as a prediction result of the prediction means.

14. The resource assigning apparatus of claim 13, wherein the prediction means further includes:

second lower order assignment detection means for detecting, when a plurality of resource elements are determined by the first optimal resource element determination means to be most favorable, unassigned assignments which have a live range which interferes with the live range of next assignment and unassigned assignments which have a live range which is continuous with a live range of an assignment which has a live range which interferes with the live range of the next assignment;

second estimation means for estimating what will happen to a total value, which expresses at least one of a number of execution cycles and a code size of all definition instructions in which each detected assignment is defined and use instructions in which each assignment is used, when assigning each unassigned assignment detected by second lower order assignment detection means to each resource element, by calculating estimated values for the total value for pairings of each assignment detected by the second lower order assignment detection means and each resource element;

second live range length calculation means for calculating a continuous length of live range for each assignment detected by the second lower order assignment detection means, the length of live range being between an unassigned assignment whose live range interferes with the live range of the next assignment and an assignment which has a live range which is continuous with the live range of the unassigned assignment whose live range interferes with the live range of the next assignment;

second weighting means for weighting the estimated value calculated by the second estimation means for pairings of each unassigned assignment detected by the second lower order assignment detection means and each resource element using the length of live range calculated for each assignment by the second live range length calculation means and the priority value of each assignment;

second totalling means for totalling the estimated values of each assignment weighted by the second weighting means for each resource element; and second optimal resource element determination means for determining that a resource element, which when used for assigning the next assignment allows a most favorable assigning of all unassigned assignments which have a lower priority level than the next assignment, is a resource element which has a highest total value totalled by the second totalling means.

15. The resource assigning apparatus of claim 14, wherein the first and second weighting means perform weighting using an extent of live range length of "1" when the live range lengths between assignments calculated by a respective one of the first live range length calculation means and the second live range length calculation means is "0", and the first and second weighting means calculate a reciprocal of a live range length and perform weighting using the calculated reciprocal as an extent of live range length when the lengths of live range between assignments calculated by a respective one of the first live range length calculation means and the second live range length calculation means is not "0".

16. The resource assigning apparatus of claim 15 further including cost storage means for storing a plurality of instruction patterns, each being information which uses an instruction format of machine language instructions and which expresses definition instructions and use instructions of an assignment in a program, and for storing a cost showing at least one of a number of execution cycles and a code size of definition instructions and use instructions of an assignment in the program when resource elements of each resource are used as each operand in a machine language instruction, corresponded to each instruction pattern, wherein the first estimation means includes:
a first instruction pattern output unit for retrieving instruction patterns corresponding to all definition instructions and use instructions for an unassigned assignment detected by the first lower order assignment detection means and outputting the retrieved instruction patterns; and
a first cost totalling unit for retrieving a cost from the cost storage means corresponding to the output instruction patterns, for totalling the retrieved costs for each resource element and setting the totalled costs as estimated values, wherein the second estimation means includes:
a second instruction pattern output unit for retrieving instruction patterns corresponding to all definition instructions and use instructions for an unassigned assignment detected by the second lower order assignment detection means and outputting the retrieved instruction patterns; and
a second cost totalling unit for retrieving a cost from the cost storage means corresponding to the output instruction patterns, for totalling the retrieved costs for each resource element and setting the totalled costs as estimated values.

17. The resource assigning apparatus of claim 16, wherein an instruction pattern includes information showing whether a storage location of an operation result coincides with either operand in an operation or whether the storage location of an operation result is completely different, and wherein a cost of instruction patterns where a storage location coincides with either operand is lower than a cost of instruction patterns where a storage location does not coincide with either operand.

18. The resource assigning apparatus of claim 16, wherein an instruction pattern includes information showing whether or not a corresponding use instruction is an end point of a live range, and a cost of instruction patterns where the corresponding use instruction is the end point of the live range is lower than a cost of instruction patterns where the corresponding use instruction is not the end point.

19. The resource assigning apparatus of claim 9, further including:

reserved assignment detection means for detecting assignments which are to be assigned to a predetermined resource element from the program; and reserved resource element storage means for storing resource elements to which the assignments detected by the reserved assignment detection means should be assigned;

wherein the assigning means assigns the assignments detected by the reserved assignment detection means to the resource elements to which the assignments should be assigned, before assigning an assignment with a highest priority level to any of the resource elements.

20. The resource assigning apparatus of claim 19, wherein the reserved assignment detection means detects assignments which store arguments of function calls out of the program and the reserved resource element storage means stores that the detected assignments should be assigned to argument registers.

21. The resource assigning apparatus of claim 19, wherein the reserved assignment detection means detects assignments which store return values of function calls out of the program and the reserved resource element storage means stores that the detected assignments should be assigned to return value registers.

22. The resource assigning apparatus of claim 19, wherein the reserved assignment detection means detects assignments whose values may be rewritten out of the program and the reserved resource element storage means stores that the detected assignments should be assigned to broken registers.

23. The resource assigning apparatus of claim 9, further including live range continuation relation group storage means storing all assignments in the program corresponded to live range continuation relation groups made up of all assignments whose live range ends at start point of a live range of an arbitrary assignment in the program and all assignments whose live range starts at an end point of the arbitrary live range, wherein the assigned-next continuation determination means includes:
- a first determination unit for referring to the live range continuation relation group for the next assignment and determining whether there are any assigned assignments in the corresponding live range continuation relation group;
- a second determination unit for retrieving, when the first determination unit determines that there are no assigned assignments, another assignment in the corresponding live range continuation relation group, for referring to a corresponding live range continuation relation group for the retrieved assignment and determining whether there are any assigned assignments in the corresponding live range continuation relation group; and
- a control unit for repeatedly activating the second determination unit until the second determination unit determines that there is an assignment, wherein the profit/loss calculation means includes:
- a totalling unit for totalling a live range length of the assignments determined by the assigned-next continuation determination means: and
- a reciprocal calculation unit for calculating a reciprocal of a total of a live range length of the next assignment and the live range length totalled by the totalling unit and for setting a calculation result as an extent of live range length.

24. The resource assigning apparatus of claim 23, wherein each live range of an assignment is expressed as instruction position information from a start point to an end point for a part of the program spanned by each live range, and the totalling unit totals a number of items of instruction position information and sets a total as an extent of live range length.

25. The resource assigning apparatus of claim 24, wherein a start point and an end point of a live range are expressed as instruction position information and the resource assigning apparatus further includes:

start/end point storage means for storing each assignment in the program corresponded with instruction position information for a start point of a live range and instruction position information for an end point of the live range;

first grouping means for referring to the start/end point storage means, for detecting, out of all assignments, an assignment where the instruction position information for a start point of a live range coincides with the instruction position information for an end point of a live range of an arbitrary assignment in the program, and for setting a detected assignment and the arbitrary assignment in the program in a same live range continuation relation group;

second grouping means for referring to the start/end point storage means, for detecting, out of all assignments, an assignment where the instruction position information for an end point of a live range coincides with the instruction position information for a start point of a live range of an arbitrary assignment in the program, and for setting a detected assignment and the arbitrary assignment in the program in a same live range continuation relation group; and writing means for writing into the live range continuation relation group storage means an assignment in the program corresponded to any live range continuation relation groups to which the assignment belongs, the groups being grouped by one of the first grouping means and the second grouping means.

26. The resource assigning apparatus of claim 9, further including live range continuation relation group storage means storing all assignments in the program corresponded to live range continuation relation groups made up of all assignments whose live range ends at start point of a live range of an arbitrary assignment in the program and all assignments whose live range starts at an end point of the arbitrary live range, wherein the unassigned-next continuation determination means includes:
- a first determination unit for referring to the live range continuation relation group for the next assignment and determining whether there are any unassigned assignments detected by either assigned assignment interference detection means in the corresponding live range continuation relation group;
- a second determination unit for retrieving, when the first determination unit determines that there is no such unassigned assignment, another assignment in the corresponding live range continuation relation group, for referring to a corresponding live range continuation relation group for the retrieved assignment and determining whether there are any unassigned assignments detected by either assigned assignment interference detection means in the corresponding live range continuation relation group; and
- a control unit for repeatedly activating the second determination unit until the second determination unit determines that there is an assignment, wherein the profit/loss calculation means includes:
- a totalling unit for totalling a live range length of the assignments determined by the unassigned-next continuation determination means: and
- a reciprocal calculation unit for calculating a reciprocal of a total of a live range length of the next assignment and the live range length totalled by the totalling unit and for setting a calculation result as an extent of live range length.

27. The resource assigning apparatus of claim 26, wherein each live range of an assignment is expressed as instruction position information from a start point to an end point for a part of the program spanned by each live range, and the totalling unit totals a number of items of instruction position information and sets a total as an extent of live range length.

28. The resource assigning apparatus of claim 27, wherein a start point and an end point of a live range are expressed as instruction position information and the resource assigning apparatus further includes:

start/end point storage means for storing each assignment in the program corresponded with instruction position information for a start point of a live range and instruction position information for an end point of the live range;

first grouping means for referring to the start/end point storage means, for detecting, out of all assignments, an assignment where the instruction position information for a start point of a live range coincides with the instruction position information for an end point of a live range of an arbitrary assignment in the program, and for setting a detected assignment and the arbitrary assignment in the program in a same live range continuation relation group;

second grouping means for referring to the start/end point storage means, for detecting, out of all assignments, an assignment where the instruction position information for an end point of a live range coincides with the instruction position information for a start point of a live range of an arbitrary assignment in the program, and for setting a detected assignment and the arbitrary assignment in the program in a same live range continuation relation group; and writing means for writing into the live range continuation relation group storage means an assignment in the program corresponded to any live range continuation relation groups to which the assignment belongs, the groups being grouped by one of the first grouping means and the second grouping means.

29. The resource assigning apparatus of claim 9, further including live range continuation relation group storage means storing all assignments in the program corresponded to live range continuation relation groups made up of all assignments whose live range ends at start point of a live range of an arbitrary assignment in the program and all assignments whose live range starts at an end point of the arbitrary live range, wherein the unassigned-assigned continuation determination means includes:

a first determination unit for referring to the live range continuation relation group for an unassigned assignment detected by the next assignment interfering assignment detection means and determining whether there are any assigned assignments in the corresponding live range continuation relation group;

a second determination unit for retrieving, when the first determination unit determines that there is no such assigned assignment, another assignment in the corresponding live range continuation relation group, for referring to a corresponding live range continuation relation group for the retrieved assignment and determining whether there are any assigned assignments in the corresponding live range continuation relation group; and a control unit for repeatedly activating the second determination unit until the second determination unit determines that there is an assignment, wherein the profit/loss calculation means includes:

a totalling unit for totalling a live range length of the assignments determined by the unassigned-assigned continuation determination means; and a reciprocal calculation unit for calculating a reciprocal of a total of a live range length of the next assignment and the live range length totalled by the totalling unit and for setting a calculation result as an extent of live range length.

30. The resource assigning apparatus of claim 29, wherein each live range of an assignment is expressed as instruction position information from a start point to an end point for a part of the program spanned by each live range, and the totalling unit totals a number of items of instruction position information and sets a total as an extent of live range length.

31. The resource assigning apparatus of claim 30, wherein a start point and an end point of a live range are expressed as instruction position information and the resource assigning apparatus further includes:

start/end point storage means for storing each assignment in the program corresponded with instruction position information for a start point of a live range and instruction position information for an end point of the live range;

first grouping means for referring to the start/end point storage means, for detecting, out of all assignments, an assignment where the instruction position information for a start point of a live range coincides with the instruction position information for an end point of a live range of an arbitrary assignment in the program, and for setting a detected assignment and the arbitrary assignment in the program in a same live range continuation relation group;

second grouping means for referring to the start/end point storage means, for detecting, out of all assignments, an assignment where the instruction position information for an end point of a live range coincides with the instruction position information for a start point of a live range of an arbitrary assignment in the program, and for setting a detected assignment and the arbitrary assignment in the program in a same live range continuation relation group; and writing means for writing into the live range continuation relation group storage means an assignment in the program corresponded to any live range continuation relation groups to which the assignment belongs, the groups being grouped by one of the first grouping means and the second grouping means.

32. The resource assigning apparatus of claim 9, further including live range continuation relation group storage means storing all assignments in the program corresponded to live range continuation relation groups made up of all assignments whose live range ends at start point of a live range of an arbitrary assignment in the program and all assignments whose live range starts at an end point of the arbitrary live range, wherein the unassigned-unassigned continuation determination means includes:

a first determination unit for referring to the live range continuation relation group for an unassigned assignment detected by the next assignment interfering assignment detection means and determining whether there are any unassigned assignments detected by either assigned assignment interference detection means in the corresponding live range continuation relation group;

a second determination unit for retrieving, when the first determination unit determines that there is no such assigned assignment, another assignment in the corresponding live range continuation relation group, for referring to a corresponding live range continuation relation group for the retrieved assignment and determining whether there are any unassigned assignments detected by the either assigned assignment interference detection means in the corresponding live range continuation relation group; and a control unit for repeatedly activating the second determination unit until the second determination unit determines that there is an assignment, wherein the profit/loss calculation means includes:

a totalling unit for totalling a live range length of the assignments determined by the unassigned-unassigned continuation determination means: and a reciprocal calculation unit for calculating a reciprocal of a total of a live range length of the next assignment and the live range length totalled by the totalling unit and for setting a calculation result as an extent of live range length.

33. The resource assigning apparatus of claim 32, wherein each live range of an assignment is expressed as instruction position information from a start point to an end point for a part of the program spanned by each live range, and the totalling unit totals a number of items of instruction position information and sets a total as an extent of live range length.

34. The resource assigning apparatus of claim 33, wherein a start point and an end point of a live range are expressed as instruction position information and the resource assigning apparatus further includes:

start/end point storage means for storing each assignment in the program corresponded with instruction position information for a start point of a live range and instruction position information for an end point of the live range;

first grouping means for referring to the start/end point storage means, for detecting, out of all assignments, an assignment where the instruction position information for a start point of a live range coincides with the instruction position information for an end point of a live range of an arbitrary assignment in the program, and for setting a detected assignment and the arbitrary assignment in the program in a same live range continuation relation group;

second grouping means for referring to the start/end point storage means, for detecting, out of all assignments, an assignment where the instruction position information for an end point of a live range coincides with the instruction position information for a start point of a live range of an arbitrary assignment in the program, and for setting a detected assignment and the arbitrary assignment in the program in a same live range continuation relation group; and writing means for writing into the live range continuation relation group storage means an assignment in the program corresponded to any live range continuation relation groups to which the assignment belongs, the groups being grouped by one of the first grouping means and the second grouping means.

35. A resource assigning apparatus to be used by a compiler which compiles a program written in a high-level language into a machine language program, wherein the resource assigning apparatus generates a plurality of assignments, each of which is a combination of a variable in the program written in the high-level language and a live range, sets each generated assignment a priority level and assigns the generated assignments in order to resource elements of hardware resources such as registers and memory, the resource assigning apparatus comprising:

priority level setting means for detecting for each assignment in the program at least one of a frequency of use and a loop-nesting depth level from every part of the program and setting a priority level of each assignment based on a detection result;

profit/loss value calculation means for calculating, for each resource element, a profit/loss value which shows a degree of suitability of a resource element for a next assignment, based on a positional relationship between live ranges of any assignments which have already been assigned and a live range of the next assignment;

assigning means for assigning the next assignment to any of the resource elements based on the size of the profit/loss value calculated for each resource element;

control means for repeatedly activating the profit/loss value calculation means and the assigning means until every assignment has been assigned.

36. The resource assigning apparatus of claim 35, further including:

estimation means for estimating what will happen to a total value, which expresses at least one of a number of execution cycles and a code size of all definition instructions in which the next assignment is defined and use instructions in which the assignment is used, when assigning to resource elements belonging to each resource by calculating estimated values for the total value for pairings of the next assignment and each resource element; and resource element singular/plural determination means for comparing estimated values which are a result of estimating for each resource element and determining whether a plurality of resource elements have a lowest estimated value or whether only one resource element has a lowest estimated value, wherein, when the resource element singular/plural determination means determines that only one resource element has a lowest estimated value, the assigning means assigns the next assignment to the resource element determined to have the lowest estimated value, while when the resource element singular/plural determination means determines that a plurality of resource elements have a lowest estimated value, the assigning means assigns the next assignment to a resource element out of the plurality of resource elements with a lowest estimated value which has a highest profit/loss value.

37. The resource assigning apparatus of claim 36, wherein the estimation means includes:

an instruction pattern output unit for outputting an instruction pattern, which is information which uses an instruction format of machine language instructions and which expresses definition instructions and use instructions of an assignment in a program, for every definition instruction and use instruction of the assignment in the program;

a cost storage unit for storing a cost showing at least one of a number of execution cycles and a code size of definition instructions and use instructions when resource elements of each resource are used as each operand in a machine language instruction, corresponded to each instruction pattern obtained as an output from the instruction pattern output unit; and a cost totalling unit for retrieving a cost from the cost storage unit corresponding to the output instruction pattern, for totalling retrieved costs for each resource element and for setting the totalled costs as estimated values.

38. The resource assigning apparatus of claim 36, wherein the positional relationship determination means further includes:

first assigned assignment interference detection means for detecting an unassigned assignment whose live range interferes with a live range of any assigned assignment;

unassigned-next continuation determination means for determining whether the live range of the unassigned assignment detected by the first assigned assignment interference detection means is continuous with the live range of the next assignment; and a first reduction unit for reducing, when it is determined by the unassigned-next continuation determination means that the live ranges are continuous, a profit/loss value of a resource element which has been assigned an assigned assignment detected as interfering with the unassigned assignment, in accordance with an extent of live range length from the unassigned assignment detected by the first assigned assignment interference detection means to the next assignment.

39. The resource assigning apparatus of claim 38, wherein, when a plurality of unassigned assignments are determined by the first assigned assignment interference detection means, the unassigned-next continuation determination means determines whether a live range of any of the plurality of unassigned assignments determined by the first assigned assignment interference detection means is continuous with the live range of the next assignment.

40. The resource assigning apparatus of claim 39, wherein the positional relationship determination means further includes:

next assignment interfering assignment detection means for detecting, when there is a plurality of resource elements whose profit/loss values calculated by the profit/loss value calculation means are of a same value, any unassigned assignments whose live range interferes with the live range of the next assignment; and unassigned-assigned continuation determination means for determining whether a live range of an assignment detected by the next assignment interfering assignment detection means is continuous with the live range of an assigned assignment, wherein the profit/loss calculation means further includes:

a priority level detection unit for detecting a priority level set for an assignment;

a first extent calculation unit for calculating an extent of live range length from the unassigned assignment detected by the next assignment interfering assignment detection means to the assigned assignment determined by the unassigned-assigned continuation determination means to have a live range which continues with a live range of the detected unassigned assignment; and a second reduction unit for multiplying the priority level detected by the priority level detection unit by the extent of live range length calculated by the first extent calculation unit and for reducing a profit/loss value of a resource element to which the determined assigned assignment is assigned in accordance with a multiplication result.

41. The resource assigning apparatus of claim 40, wherein the positional relationship determination means further includes:

second assigned assignment interference detection means for detecting an unassigned assignment whose live range interferes with a live range of any assigned assignment; and unassigned-unassigned continuation determination means for determining whether a live range of an unassigned assignment detected by the next assignment interfering assignment detection means is continuous with a live range of an unassigned assignment detected by the second assigned assignment interference detection means, and wherein the profit/loss value calculation means further includes:

a second extent calculation unit for calculating an extent of live range length from an unassigned assignment detected by the next assignment interfering assignment detection means to the unassigned assignment detected by the second assigned assignment interference detection means to have a live range which interferes with a live range of an assigned assignment; and a second increase unit for multiplying the priority level detected by the priority level detection unit by the extent of live range length calculated by the second extent calculation unit and for increasing a profit/loss value of a resource element to which the detected assigned assignment is assigned in accordance with a multiplication result.

42. The resource assigning apparatus of claim 35, further including a profit/loss value storage unit for storing each resource element corresponded with an initial value of a profit/loss value, wherein the first and second increase units increase a profit/loss value of each resource element stored in the profit/loss value storage unit and the first and second reduction units reduce a profit/loss value of each resource element stored in the profit/loss value storage unit.

43. The resource assigning apparatus of claim 35, further including prediction means for predicting, when a profit/loss value calculated by the profit/loss value calculation means for resource elements belonging to a plurality of resources have a same value, a resource element which when used for assigning the next assignment allows a most favorable assigning of all unassigned assignments which have a lower priority level than the next assignment, wherein the assigning means assigns the next assignment to the resource element predicted by the prediction means.

44. The resource assigning apparatus of claim 43, wherein the prediction means includes:

first lower order assignment detection means for detecting all unassigned assignments which have a live range which is continuous with the live range of the next assignment and which also have a priority level lower than a priority level of the next assignment.

45. The resource assigning apparatus of claim 44, wherein the prediction means further includes:

second lower order assignment detection means for detecting, when a plurality of resource elements are determined by the first optimal resource element determination means to be most favorable, unassigned assignments which have a live range which interferes
with the live range of next assignment and unassigned
assignments which have a live range which is continuous with a live range of an assignment which has a live
range which interferes with the live range of the next
assignment;

second estimation means for estimating what will happen
to a total value, which expresses at least one of a
number of execution cycles and a code size of all
definition instructions in which each detected assignment is defined and use instructions in which each
assignment is used, when assigning each unassigned
assignment detected by second lower order assignment
detection means to each resource element, by calculating estimated values for the total value for pairings of
each assignment detected by the second lower order
assignment detection means and each resource element;

second live range length calculation means for calculating
a continuous length of live range for each assignment
detected by the second lower order assignment detection means, the length of live range being between an
unassigned assignment whose live range interferes with
the live range of the next assignment and an assignment
which has a live range which is continuous with the live
range of the unassigned assignment whose live range
interferes with the live range of the next assignment;

second weighting means for weighting the estimated
value calculated by the second estimation means for
pairings of each unassigned assignment detected by the
second lower order assignment detection means and
each resource element using the length of live range
calculated for each assignment by the second live range
length calculation means and the priority value of each
assignment;

second totalling means for totalling the estimated values
of each assignment weighted by the second weighting
means for each resource element; and second optimal resource element determination means for
determining that a resource element, which when used
for assigning the next assignment allows a most favorable assigning of all unassigned assignments which
have a lower priority level than the next assignment, is
a resource element which has a highest total value
totalled by the second totalling means.

46. The resource assigning apparatus of claim 45, wherein
the first and second weighting means perform weighting
using an extent of live range length of "1" when the live
range lengths between assignments calculated by a respective one of the first live range length calculation means and
the second live range length calculation means is "0", and
the first and second weighting means calculate a reciprocal
of a live range length and perform weighting using the
calculated reciprocal as an extent of live range length when
the lengths of live range between assignments calculated by
a respective one of the first live range length calculation
means and the second live range length calculation means is
not "0".

47. The resource assigning apparatus of claim 46, further
including cost storage means for storing a plurality of
instruction patterns, each being information which uses an
instruction format of machine language instructions and
which expresses definition instructions and use instructions
of an assignment in a program, and for storing a cost
showing at least one of a number of execution cycles and a
code size of definition instructions and use instructions of an
assignment in the program when resource elements of each
resource are used as each operand in a machine language
instruction, corresponded to each instruction pattern, wherein the first estimation means includes:
a first instruction pattern output unit for retrieving
instruction patterns corresponding to all definition
instructions and use instructions for an unassigned
assignment detected by the first lower order assignment detection means and outputting the retrieved
instruction patterns; and
a first cost totalling unit for retrieving a cost from the
cost storage means corresponding to the output
instruction patterns, for totalling the retrieved costs
for each resource element and setting the totalled
costs as estimated values, wherein the second estimation means includes:
a second instruction pattern output unit for retrieving
instruction patterns corresponding to all definition
instructions and use instructions for an unassigned
assignment detected by the second lower order
assignment detection means and outputting the
retrieved instruction patterns; and
a second cost totalling unit for retrieving a cost from the
cost storage means corresponding to the output
instruction patterns, for totalling the retrieved costs
for each resource element and setting the totalled
costs as estimated values.

48. A resource assigning apparatus to be used by a
compiler which compiles a program written in a high-level
language into a machine language program, wherein the
resource assigning apparatus assigns a plurality of
assignments, which are a combination of a variable in the
program written in the high-level language and a live range,
in order to resource elements of hardware resources such as
registers and memory, the resource assigning apparatus
comprising:

assignment storage means for storing assignments in the
program, each assignment being corresponded to a
priority level;

first resource element assigning means for retrieving an
assignment with a highest priority level in the assignment storage means and assigning the assignment with
the highest priority level to any of the resource elements;

assignment retrieval means for retrieving from the assignment storage means an assignment which has a priority
level which comes in order directly after a priority level
of an assignment which has just been assigned;

following assignment interfering assignment detection
means for detecting any assignments with a live range
which interferes with a live range of the assignment
retrieved by the assignment retrieval means;

resource element detection means for detecting resource
elements which have been assigned assignments
detected by the following assignment interfering
assignment detection means;

assignment-resource element detection means for detecting all assignments which have been assigned to any
resource element which has not been detected by the
resource element detection means;

profit continuation assigned assignment determination
means for determining every assignment which has a
live range which is continuous with a live range of the
assignment retrieved by the assignment retrieval
means, out of the assigned assignments detected by the
assignment-resource element detection means;

first profit/loss value calculation means for calculating a profit/loss value, which is a value showing appropriateness of assigning a next assignment to a resource element to which an assignment has already been assigned, based on an extent of live range length from an assignment determined by the profit continuation assigned assignment determination means to the assignment retrieved by the assignment retrieval means, for each resource element assigned an assignment determined by the profit continuation assigned assignment determination means;

totalling means for totalling the calculated profit/loss values for each resource element determined by the assignment-resource element detection means;

second resource element assigning means for assigning the assignment retrieved by the assignment retrieval means to a resource element with a highest total value totalled by the totalling means; and control means for repeatedly activating the assignment retrieval means until every assignment has been assigned.

49. The resource assigning apparatus of claim 48, further including:

first non-interfering non-continuous assigned assignment determination means for determining assignments whose live range is not continuous with a live range of an assignment retrieved by the assignment retrieval means nor interferes with the live range of the assignment retrieved by the assignment retrieval means, out of the assigned assignments detected by the assignment-resource element detection means;

profit continuation unassigned assignment determination means for detecting an assignment whose live range is continuous with a live range of the assignment retrieved by the assignment retrieval means and which is an unassigned assignment whose live range interferes with a live range of the assignment determined by the first non-interfering non-continuous assigned assignment determination means;

second profit/loss value calculation means for calculating a profit/loss value of a resource element assigned an assigned assignment detected by the first non-interfering non-continuous assigned assignment determination means, based on an extent of live range length from an unassigned assignment detected by the profit continuation unassigned assignment determination means to the assignment retrieved by the assignment retrieval means; and first subtraction means for subtracting a profit/loss value calculated by the second profit/loss value calculation means from the profit/loss value for an appropriate resource element totalled by the totalling means, wherein the second assigning means assigns the assignment retrieved by the assignment retrieval means to a resource element with a highest profit/loss value after a profit/loss calculated by the second profit/loss value has been subtracted by the first subtraction means.

50. The resource assigning apparatus of claim 49, further including:

interfering assignment continuation assigned assignment determination means for determining assignments whose live range is continuous with an assignment retrieved by the following assignment interfering assignment detection means, out of assigned assignments detected by the assignment-resource element detection means;

third profit/loss calculation means for calculating a profit/loss value of a resource element assigned an assigned assignment determined by the interfering assignment continuation assigned assignment determination means, based on an extent of live range length from an assigned assignment detected by the interfering assignment continuation assigned assignment determination means to an assignment detected by the following assignment interfering assignment detection means; and second subtraction means for subtracting a profit/loss value calculated by the third profit/loss value calculation means from the profit/loss value for an appropriate resource element totalled by the totalling means, wherein the second assigning means assigns the assignment retrieved by the assignment retrieval means to a resource element with a highest total value after a profit/loss calculated by the third profit/loss value has been subtracted by the second subtraction means.

51. The resource assigning apparatus of claim 50, further including:

second non-interfering non-continuous assigned assignment determination means for determining assignments whose live range is not continuous with a live range of an assignment detected by the following assignment interfering assignment detection means nor interferes with the live range of the assignment detected by the following assignment interfering assignment detection means, out of the assigned assignments detected by the assignment-resource element detection means;

interfering assignment continuation unassigned assignment determination means for determining assignments whose live range is continuous with a live range of an assignment detected by the following assignment interfering assignment detection means and which are unassigned assignments whose live range interferes with a live range of an assigned assignment determined by the second non-interfering non-continuous assigned assignment determination means;

fourth profit/loss calculation means for calculating a profit/loss value of a resource element assigned an assigned assignment determined by the second non-interfering non-continuous assigned assignment determination means, based on an extent of live range length from an assignment determined by the interfering assignment continuation unassigned assignment determination means to an assignment detected by the following assignment interfering assignment detection means; and first addition means for adding a profit/loss value calculated by the fourth profit/loss value calculation means from the profit/loss value for an appropriate resource element totalled by the totalling means, wherein the second assigning means assigns the assignment retrieved by the assignment retrieval means to a resource element with a highest total value after a profit/loss calculated by the fourth profit/loss value has been added by the second addition means.

* * * * *